United States Patent [19]

Komissarchik et al.

[11] Patent Number: 5,799,276

[45] Date of Patent: Aug. 25, 1998

[54] KNOWLEDGE-BASED SPEECH RECOGNITION SYSTEM AND METHODS HAVING FRAME LENGTH COMPUTED BASED UPON ESTIMATED PITCH PERIOD OF VOCALIC INTERVALS

[75] Inventors: Edward Komissarchik, Mill Valley, Calif.; Vladimir Arlazarov, Moscow, Russian Federation; Dimitri Bogdanov, Tiburon, Calif.; Yuri Finkelstein, Tiburon, Calif.; Andrey Ivanov, Tiburon, Calif.; Jacob Kaminsky, Moscow, Russian Federation; Julia Komissarchik, Mill Valley, Calif.; Olga Krivnova, Moscow, Russian Federation; Mikhail Kronrod, Larkspur, Calif.; Mikhail Malkovsky, Moscow, Russian Federation; Maxim Paklin, Tiburon, Calif.; Alexander Rozanov, Moscow, Russian Federation; Vladimir Segal, San Francisco, Calif.; Nina Zinovieva, Tiburon, Calif.

[73] Assignee: Accent Incorporated, Mill Valley, Calif.

[21] Appl. No.: 554,862

[22] Filed: Nov. 7, 1995

[51] Int. Cl.$^6$ .................................................. G10L 5/06
[52] U.S. Cl. .......................... 704/251; 704/208; 704/207; 704/231; 704/257
[58] Field of Search .................... 395/2.16–2.19, 395/2.4, 2.44, 2.48, 2.49, 2.52, 2.54, 2.66, 2.6

[56] References Cited

U.S. PATENT DOCUMENTS

| | | | |
|---|---|---|---|
| 3,700,815 | 10/1972 | Doddington et al. | 395/2.55 |
| 4,718,094 | 1/1988 | Bahl et al. | 381/43 |
| 4,748,670 | 5/1988 | Bahl et al. | 381/43 |
| 4,837,831 | 6/1989 | Gillick et al. | 395/2.54 |
| 4,903,305 | 2/1990 | Gillick et al. | 395/2.54 |
| 5,027,406 | 6/1991 | Roberts et al. | 381/43 |
| 5,033,087 | 7/1991 | Bahl et al. | 381/43 |
| 5,040,127 | 8/1991 | Gerson | 365/513.5 |
| 5,170,432 | 12/1992 | Hackbarth et al. | 395/2.63 |

(List continued on next page.)

OTHER PUBLICATIONS

Cohen, Michael Harris "Phonological Structures for Speech Recognition", PhD Dissertation for Department of Electrical Engineering and Computer Science, University of California at Berkeley, Apr. 1989.

Cole, Ronald and Fantz, Mark, "Spoken Letter Recognition", pp. 385–390.

Hanson, Helen M. et al., "A System for Finding Speech Formants and modulations via Energy Separation", Jul. 3, 1993.

Mori, de R., *Nato Asi Series*, vol. F45, "Knowledge-Based Computer Recognition of Speech" pp. 271–290, 1988.

Neuburg, Edward, *Darpa*, "Speech Tutorial" pp. 53–71, Feb. 1989.

(List continued on next page.)

*Primary Examiner*—Allen R. MacDonald
*Assistant Examiner*—Alphonso A. Collins
*Attorney, Agent, or Firm*—Fish & Neave; Nicola A. Pisano

[57] ABSTRACT

Knowledge based speech recognition apparatus and methods are provided for translating an input speech signal to text. The speech recognition apparatus captures an input speech signal, segments it based on the detection of pitch period, and generates a series of hypothesized acoustic feature vectors for the input speech signal that characterizes the signal in terms of primary acoustic events, detectable vowel sounds and other acoustic features. The apparatus and methods employ a largely speaker-independent dictionary based upon the application of phonological and phonetic/acoustic rules to generate acoustic event transcriptions against which the series of hypothesized acoustic feature vectors are compared to select word choices. Local and global syntactic analysis of the word choices is provided to enhance the recognition capability of the methods and apparatus.

52 Claims, 10 Drawing Sheets

U.S. PATENT DOCUMENTS

| | | | |
|---|---|---|---|
| 5,202,952 | 4/1993 | Gillick et al. | 395/2 |
| 5,384,892 | 1/1995 | Strong | 395/2.52 |
| 5,390,279 | 2/1995 | Strong | 395/2 |
| 5,526,463 | 6/1996 | Gillick et al. | 395/2.6 |

OTHER PUBLICATIONS

Oppenheim, Alan U. and Schafer, Ronald W., *Discrete–Time Signal Processing*, pp. 444–450 and 723–727, 1989.

Quinnell, Richard A., *EDN*, "Speech Reconition, No Longer A Dream But Still A Challenge", pp. 41–46, Jan. 19, 1995.

Rabiner, L.R. and Young, B.H., *Nato Asi Series*, vol. F75, "Hidden Markov Models for Speech Recognition–Strengths and Limitations", 1992.

Zue, Victor W., *Knowledge–Based Approaches*, "The Use of Speech Knowledge in Automatic Speech Recognition", pp. 200–213, 1985.

Zue, Victor, et al., *The MIT Summit Speech Recognition System; A Progress Report*, Proceedings, Speech & Natural Language Workshop, pp. 179–189, Oct. 1989, DARPA, published by Morgan–Kaufmann Publishers, Inc., San Mateo, CA.

Zue, Victor, et al., *Recent Progress on the Summit System*, Proceedings, Speech & Natural Language Workshop, pp. 380–384, Jun. 1990, DARPA, published by Morgan–Kaufmann Publishers, Inc., San Mateo, CA.

Zue, Victor, *The Summit Speech Recognition System: Phonological Modelling and Lexical Access*, ICASSP–90, vol. II, 1990 IEEE International Conference on Acoustics, Speech & Signal Processing, pp. 49–52, Apr. 27–30, 1993, Minneapolis, Conference Proceedings.

Rabiner et al. "Fundamentals of Speech Recognition." Prentice Hall, pp. 469–479, 1993.

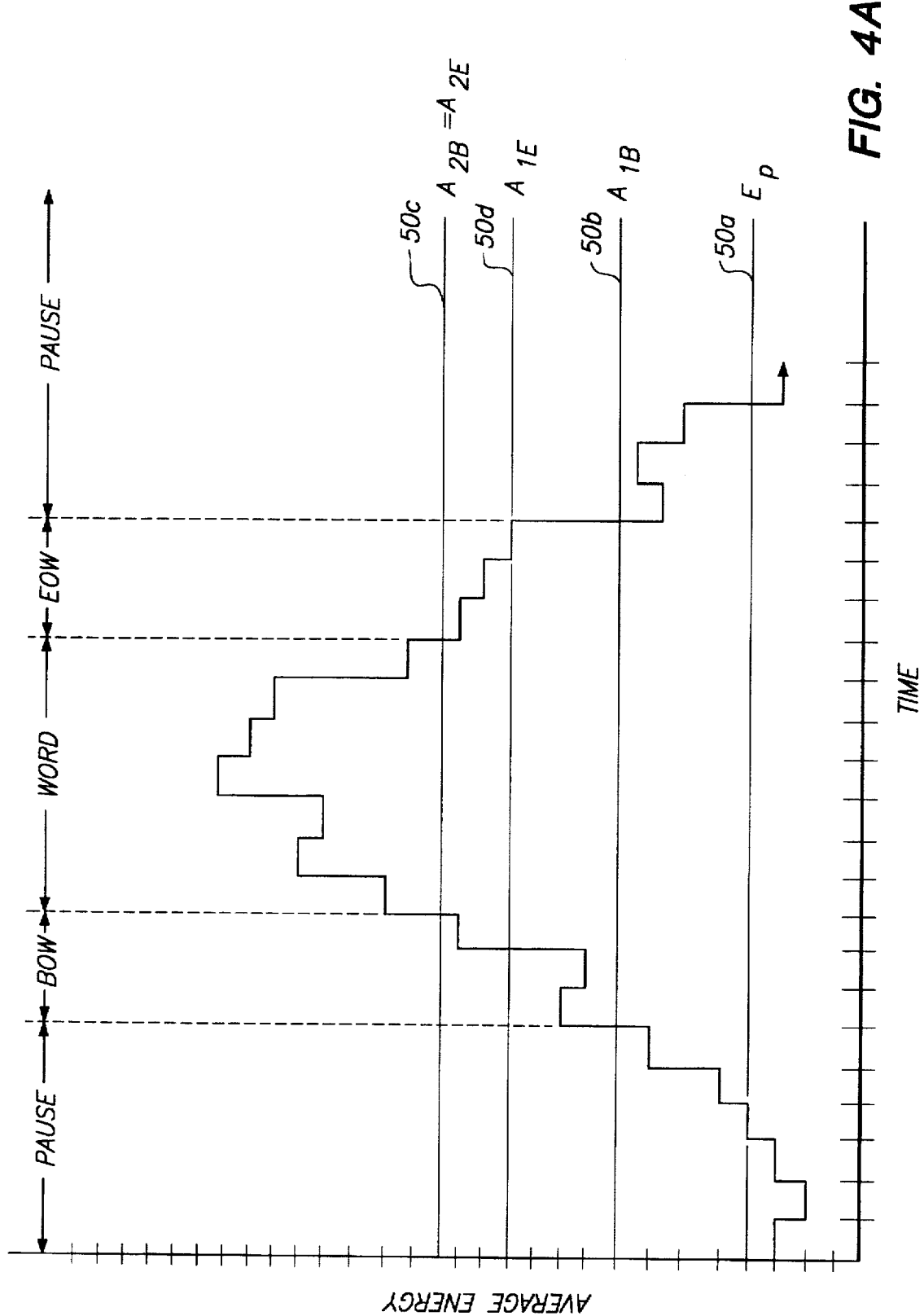

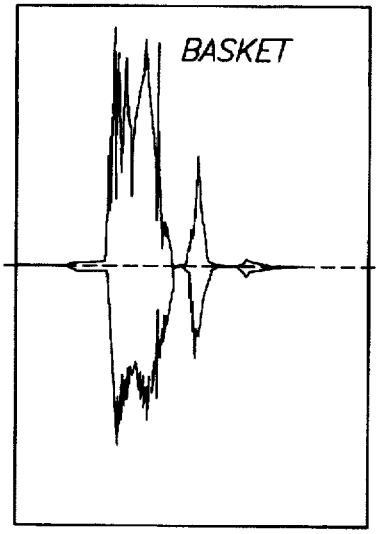
WAVEFORM FOR "BASKET"
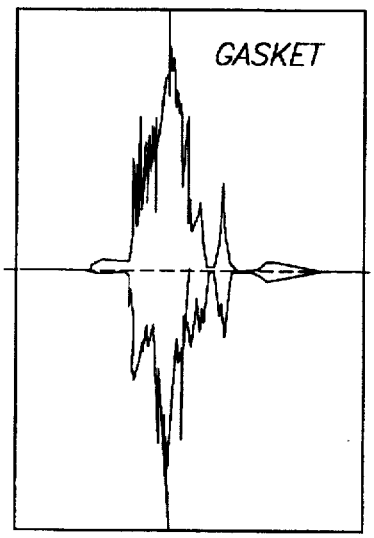
WAVEFORM FOR "GASKET"
FIG. 5A
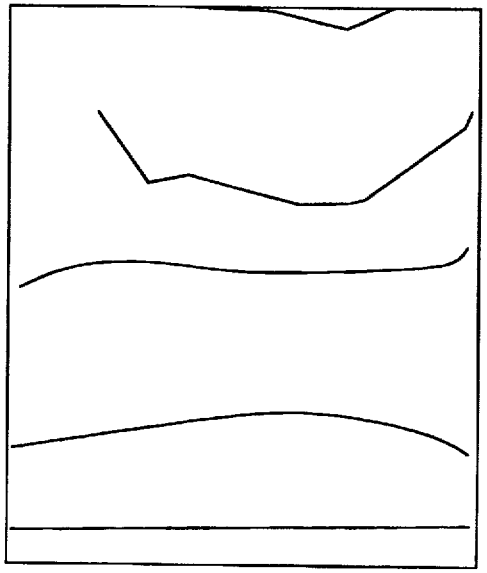
PICTURE OF FORMANT TRACKS OF /a/ IN "BASKET"
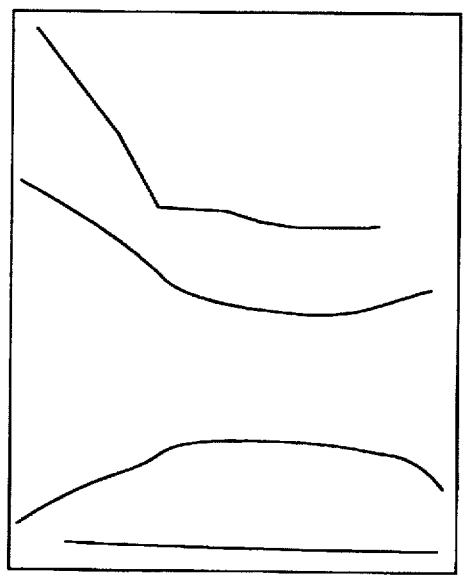
PICTURE OF FORMANT TRACKS OF /a/ IN "GASKET"

| OrthoWord | CloudPhonWord | CloudDynPron |
|---|---|---|
| a | .AH1. | .AH1. |
| a | .EY1. | .EY1. |
| abandon | .AH0 B AE1 N DX ah0 N. | .AH0 B AE1 N DX ah0 N. |
| abandoned | .AH0 B AE1 N DX ah0 N D. | .AH0 B AE1 N DX ah0 N D. |
| abandoned | .AH0 B AE1 N DX ah0 N D. | .AH0 B AE1 N DX ah0 N T. |
| abandoning | .AH0 B AE1 N DX ah0 N IH0 NG. | .AH0 B AE1 N DX ah0 N IH0 NG. |
| abandons | .AH0 B AE1 N DX ah0 N Z. | .AH0 B AE1 N DX ah0 N d Z. |
| abandons | .AH0 B AE1 N DX ah0 N Z. | .AH0 B AE1 N DX ah0 N d S. |
| abandons | .AH0 B AE1 N DX ah0 N Z. | .AH0 B AE1 N DX ah0 N t S. |
| abbreviatio | .AH0 B R IY2 V IY0 EY1 SH ah0 N. | .AH0 B R IY2 V IY0 EY1 SH ah0 N. |
| abbreviatio | .AH0 B R IY2 V IY0 EY1 SH ah0 N Z. | .AH0 B R IY2 V IY0 EY1 SH ah0 N d Z. |
| abbreviatio | .AH0 B R IY2 V IY0 EY1 SH ah0 N Z. | .AH0 B R IY2 V IY0 EY1 SH ah0 N d S. |
| abbreviatio | .AH0 B R IY2 V IY0 EY1 SH ah0 N Z. | .AH0 B R IY2 V IY0 EY1 SH ah0 N t S. |
| abdomen | .AE0 B D OW1 M ah0 N. | .AE0 B D OW1 M ah0 N. |
| abdomen | .AE1 B D ah0 M ah0 N. | .AE1 B D ah0 M ah0 N. |
| abdomen's | .AE1 B D ah0 M ah0 N Z. | .AE1 B D ah0 M ah0 N t S. |
| abdomen's | .AE0 B D OW1 M ah0 N Z. | .AE0 B D OW1 M ah0 N d Z. |
| abdomen's | .AE0 B D OW1 M ah0 N Z. | .AE0 B D OW1 M ah0 N d S. |
| abdomen's | .AE0 B D OW1 M ah0 N Z. | .AE0 B D OW1 M ah0 N t S. |
| abdomen's | .AE1 B D ah0 M ah0 N Z. | .AE1 B D ah0 M ah0 N d Z. |
| abdomen's | .AE1 B D ah0 M ah0 N Z. | .AE1 B D ah0 M ah0 N d S. |
| abdomens | .AE0 B D OW1 M ah0 N Z. | .AE0 B D OW1 M ah0 N d Z. |
| abdomens | .AE0 B D OW1 M ah0 N Z. | .AE0 B D OW1 M ah0 N d S. |
| abdomens | .AE0 B D OW1 M ah0 N Z. | .AE0 B D OW1 M ah0 N t S. |
| abdomens | .AE1 B D ah0 M ah0 N Z. | .AE1 B D ah0 M ah0 N d Z. |
| abdomens | .AE1 B D ah0 M ah0 N Z. | .AE1 B D ah0 M ah0 N d S. |
| abdomens | .AE1 B D ah0 M ah0 N Z. | .AE1 B D ah0 M ah0 N t S. |
| abilities | .AH0 B IH1 L ah0 TX IY0 Z. | .AH0 B IH1 L ah0 TX IY0 S. |
| abilities | .AH0 B IH1 L ih0 TX IY0 Z. | .AH0 B IH1 L ih0 TX IY0 Z. |
| abilities | .AH0 B IH1 L ah0 TX IY0 Z. | .AH0 B IH1 L ah0 TX IY0 Z. |
| abilities | .AH0 B IH1 L ih0 TX IY0 Z. | .AH0 B IH1 L ih0 TX IY0 S. |
| ability | .AH0 B IH1 L ah0 TX IY0. | .AH0 B IH1 L ah0 TX IY0. |
| ability | .AH0 B IH1 L ih0 TX IY0. | .AH0 B IH1 L ih0 TX IY0. |
| able | .EY1 B ah0 L. | .EY1 B ah0 L. |
| abolish | .AH0 B AA1 L IH0 SH. | .AH0 B AA1 L IH0 SH. |

FIG 7A

| ORTHOGRAPHIC WORD | PHONETIC TRANSCRIPTION | ACOUSTIC TRANSCRIPTION |
|---|---|---|
| a | .AH1. <br> .EY1. | A <br> IE |
| abandon | .AHO B AE1 N DX ahO N. | V GP BN E M p bn v md |
| abandoned | .AHO B AE1 N DX ahO N D. | V GP BN E M p bn v M gnv |
| abandoning | .AHO B AE1 N DX ahO N IHO NG. | V GP BN E M p bn v M V md |
| abandons | .AHO B AE1 N DX ahO N Z. | V GP BN E M p bn v MG @ |
| abbreviation | .AHO B R IY2 V IYO EY1 SH ahO N. | V GP bn R IE GN IE C v md |
| abbreviations | .AHO B R IY2 V IYO EY1 SH ahO N Z. | V GP bn R IE GN IE C v MG @ |
| abdomen | .AE1 B D ahO M ahO N. <br> .AEO B D OW1 M ahO N. | E GP bn v M v md <br> V GP bn OU M v md |
| abdomen's | .AE1 B D ahO M ahO N Z. <br> .AEO B D OW1 M ahO N Z. | E GP bn v M v MG @ <br> V GP bn OU M v MG @ |
| abdomens | .AE1 B D ahO M ahO N Z. <br> .AEO B D OW1 M ahO N Z. | E GP bn v M v MG @ <br> V GP bn OU M v MG @ |
| abilities | .AHO B IH1 L ihO TX IYO Z. <br> .AHO B IH1 L ahO TX IYO Z. | V GP BN V w v GP V Z |
| ability | .AHO B IH1 L ihO TX IYO. <br> .AHO B IH1 L ahO TX IYO. | V GP BN V w v GP V |
| able | .EY1 B ahO L. | IE GP bn V |
| abolish | .AHO B AA1 L IHO SH. | V GP BN AO w v C |

FIG. 7B

ABSOLUTE          [AE1 B S ah0 L UW2 T]

Converted to RAT symbols:
    . v_1_E b_d_B d_s_S v_o_v b_1_L v_2_UW d_t_T .
Apply rule 10 to [UW2]:
    . v_1_E b_d_B d_s_S v_o_v b_1_L v_2_OU d_t_T .
Apply rule 400 to [B S]:
    . v_1_E GP @ v_o_v b_1_L v_2_OU d_t_T .
Apply rule 451 to [T]:
    . v_1_E GP @ v_o_v b_1_L v_2_OU p-& .
Apply rule 464 to [L]:
    . v_1_E GP @ v_o_v w v_2_OU p-& .
Apply rule 472 to [ah0]:
    . v_1_E GP @ v w v_2_OU p-& .
Apply rule 478 to [AE1]:
    . E GP @ v w v_2_OU p-& .
Apply rule 496 to [UW2]:
    . E GP @ v w OU p-& .

AGREEMENT         [AH0 G R IY1 M ah0 N T]

Converted to RAT symbols:
    . v_o_V g_d_G r_r_r v_1_I b_m_M v_o_v d_m_N d_t_T .
Apply rule 12 to [R]:
    . v_o_V g_d_G r_r_R v_1_I b_m_M v_o_v d_m_N d_t_T .
Apply rule 215 to [M]:
    . v_o_V g_d_G r_r_R v_1_I M v_o_v d_m_N d_t_T .
Apply rule 239 to [N T]:
    . v_o_V g_d_G r_r_R v_1_I M v_o_v MP & .
Apply rule 406 to [G]:
    . v_o_V GP bn r_r_R v_1_I M v_o_v MP & .
Apply rule 472 to [ah0]:
    . v_o_V GP bn r_r_R v_1_I M v MP & .
Apply rule 473 to [AH0]:
    . V GP bn r_r_R v_1_I M v MP & .
Apply rule 476 to [IY1]:
    . V GP bn r_r_R I M v MP & .
Apply rule 504 to [R]:
    . V GP bn R I M v MP & .

FIG. 7C

KNOWLEDGE-BASED SPEECH RECOGNITION SYSTEM AND METHODS HAVING FRAME LENGTH COMPUTED BASED UPON ESTIMATED PITCH PERIOD OF VOCALIC INTERVALS

FIELD OF THE INVENTION

The present invention relates to a largely speaker independent speech recognition system that employs linguistic and phonetic rules to analyze a spoken utterance and select a word or series of words corresponding to that utterance from a dictionary.

BACKGROUND OF THE INVENTION

Speech recognition systems are known in which a spoken utterance is analyzed to determine the most likely word equivalent of the utterance. Historically, three different types of speech recognition systems have been the subject of development: dynamic time warping based systems, statistical analysis using Hidden Markov Modeling ("HMM") based systems, and knowledge-based systems. The first two techniques, especially HMM, have been the subject of considerable interest, and form the main recognition engines in commercially available products. See, for example, Quinnell, "Speech Recognition: No Longer A Dream But Still A Challenge," EDN, Vol. 40, No. 2, pp. 41–46 (Jan. 19 1995), which is incorporated herein by reference in its entirety.

Dynamic time warping ("DTW") attempts to match the acoustic properties of an input signal to a template by temporally adjusting the time scale of the input signal. Such systems require considerable "training", in which a user speaks short phrases or even words which are then stored as templates, thus making them speaker-dependent. Because the system matches an entire utterance, rather than constituent words or sub-parts of words, DTW systems are limited to applications having small vocabularies. DTW systems do not involve analysis of the input signal using linguistic or phonetic knowledge.

HMM systems employ a statistical process to match a sequence of several millisecond-long slices (so called "frames") of an utterance to the phones of template words maintained in a dictionary. As discussed in the Quinnell article, HMM systems have been the subject of considerable development, with commercial embodiments of discrete speech recognition systems being sold under license, for example, from Dragon Systems, Inc., Newton, Mass. HMM systems have several drawbacks, which relate to the limitations of HMM models to accurately model phonemes. For example, when the assumptions regarding the nature of speech as a Markov model are correct for a given sample of speech, the model may provide high accuracy. However, in those instances of speech where the next phoneme in a word depends upon more than just the previous state of the system, for example, when the beginning phoneme of a word foreshadows a later phoneme in the word, e.g., the word "file," then a Markov model provides only a rough description of the speech.

Another important disadvantage of previously known HMM commercial products is the need to "train" the system to create templates of phones and words, which makes the resulting system speaker-dependent. "Training" of an HMM system requires that a user speak a number of "training" words, which typically include all of the phonemes or phones (the two will be used interchangeably hereinafter) in the language in all possible contexts. These training words (or subparts of words) are then used as "template" for calculating probabilities associated with the state-transitions of the statistical model. During speech recognition processing, spoken words are then statistically matched against the phones modeled during training, so that whichever word obtains the overall best score compared to a template is offered as the "correct" word choice. More recent systems claim to be speaker independent, but with an accuracy rate lower than speaker-dependent systems.

A further disadvantage of HMM systems, caused by the statistical nature of the matching process, is that the system has no "self-awareness" when it has selected an improper word choice. For example, the statistical nature of the HMM modeling process may cause low probability word transitions to be discarded, even though the low probability transitions may include the correct word. Since HMM methodology does not provide for the ability to assess whether a word choice is reasonable in terms of compliance with phonetic or linguistic rules, such a system cannot "know" when it is wrong, and cannot alert the user of that situation.

Many HMM systems employ a system of statistically derived word orders, referred to as "bigrams" and "trigrams," to evaluate and rank potential word sequences corresponding to a speech segment. Because the bigrams and trigrams are developed on a statistical basis, the resulting HMM system has an affinity or preference for word sequences occurring within the corpora of words from which the statistical model was developed. Thus, for example, a system having bigrams or trigrams developed based on the word sequences found in the New York Times may have a difficult time accurately recognizing the text from a children's book. Moreover, the statistical nature of such systems provides no means for "fine-tuning" such a system once it has been built. In other words, an HMM system operates like a "black box"—and provides no mechanism for discarding obviously incorrect word choices.

The third type of speech recognition systems—knowledge-based systems—have been a subject primarily of academic interest, and involve the application of acoustic, phonetic and natural language processing ("NLP") information theory to the speech recognition process. While knowledge-based speech recognition systems have been the subject of academic research for some time, no commercial embodiments of such systems are known to exist. Indeed, prior to the present invention, interest in knowledge-based systems had waned to the point that they are not even mentioned in the above Quinnell article.

The lack of interest in knowledge-based systems is due partly to a number of factors, including the sheer effort required to codify sufficient phonetic and NLP knowledge into rule form to provide a workable system, and the commercial success and accuracy of HMM-based systems. In short, until the present invention, no one was willing to undertake the immense effort required to develop a knowledge-based system, given the prospect that after years of development such a system might not perform even as well as existing HMM systems.

The prior art includes several attempts to employ knowledge-based systems in discrete and continuous speech recognition systems, yet these treatments have remained mostly theoretical, and have not been able to approach the accuracy of HMM systems. An example of a knowledge-based speech recognition system is proposed, for example, in Zue, "The Use of Speech Knowledge in Automatic Speech Recognition," reprinted at pp. 200–213 of READ- INGS IN SPEECH RECOGNITION, edited by A. Waibel and K. F. Lee, Morgan-Kaufmann Publishers, Inc., San Mateo, Calif. 1990. That article describes a system in which acoustic cues are extracted from an input signal (utterance), after which the utterance is classified into broad phonetic categories. It is suggested that constraints imposed by the language on possible sound patterns reduce the number of word candidates, thereby simplifying lexical access. It is also suggested in this hypothetical system to employ a detailed analysis of fine phonetic distinctions to refine the word choice.

In "The MIT Summit Speech Recognition System: A Progress Report," by V. Zue et al., at pp. 179-189 of PROCEEDINGS OF THE SPEECH AND NATURAL LANGUAGE WORKSHOP, OCTOBER 1989, DARPA, published by Morgan-Kaufmann Publishers, San Mateo, Calif. 1989, a system is described as having a first component that transforms an input speech signal into an acoustic-phonetic description, a second component that expands a set of baseforms into a lexical network, and a third component that provides natural language constraints. A drawback of this system, however, is its continued reliance upon word bigrams developed on the DARPA database, so that the overall system continues to manifest an affinity for word sequences representative of those contained in the DARPA database.

Another example of an attempt at implementing a knowledge-based acoustic feature extraction system (just one part of a recognition system) is described in De Mori, "Knowledge-Based Computer Recognition of Speech," NATO ASI Series, Vol. E 45, Syntactic and Structural Pattern Recognition, Springer Verlag (1988), pp. 271-290. That reference describes a hypothetical system in which acoustic cues provided from acoustic, phonetic and syllable system modules ("experts") are input to a "classifier" that determines the corresponding word choice. The topic addressed in the paper is that of characterizing incoming utterances using, for example, linear predictive coding (LPC) and Fast Fourier Transform techniques to derive a number of primary acoustic cues. The primary acoustic cues are then analyzed by a rule set of permissible relations between different types of acoustic cues.

Yet another example of a knowledge-based system for recognizing spoken letters is described in Cole and Fanty, "Spoken Letter Recognition," pp. 385-390 of PROCEEDINGS OF THE SPEECH AND NATURAL LANGUAGE WORKSHOP, JUNE 1990, DARPA, published by Morgan-Kaufmann Publishers, San Mateo, Calif. 1990. That reference describes a speech recognition system designed to recognize the 26 letters of the alphabet using speech knowledge and neural classification. In particular, several waveform properties of an input spoken utterance, including those obtained by spectral analysis and pitch period extraction, are computed and used to segment the utterance into a series of acoustic events. A neural network is then employed to classify the acoustic features of the waveform to select the letter choices most likely corresponding to the spoken utterance. The article describes a system attaining high accuracy in recognizing spoken letters, but is directed specifically towards recognizing a small vocabulary (i.e., the alphabet), rather than being suitable for a large vocabulary dictation task.

The prior art also includes attempts at incorporating some aspects of knowledge-based rulemaking into HMM systems. For example, in Cohen, Phonological Structures for Speech Recognition, Ph.D. dissertation, Computer Science Division, Dept. Of Elect. Engrg., University of California, Berkeley (April 1989), incorporated herein by reference in its entirety, "allophonic networks" are developed based upon phonological rules developed by an expert phonetician. These networks replace a single phonetic transcription of a word in a dictionary with a plurality of phonetic transcriptions of phonologically permissible variants of the word (e.g., economics starting with |iy| or |eh|). The drawback of such an approach, however, is that a great deal of training data is required to compute the state-transition probabilities for the HMM model, as well as variability introduced by inaccuracies in the segmentation of the training data (see Cohen dissertation at pp. 130-131). Moreover, the application of phonological rules does not provide a complete set of all the possible acoustic event variations likely to occur in a word as actually spoken.

An illustration of the deficiencies of prior art HMM speech recognition systems is provided, for example, by the "TriplePlay Plus" language coaching software marketed by Syracuse Language Systems, Inc., Syracuse, N.Y. This software, which may be run on a multimedia-capable personal computer, employs an HMM based speech recognition system (developed by Dragon Systems) that attempts to coach a speaker by pronouncing a word, and then inviting the speaker to repeat the word into a microphone. The spoken utterance is then analyzed by HMM techniques to determine whether the utterance is sufficiently close to the word read out by the computer. If the word meets some criterion of "closeness", the computer responds with a congratulatory tone. If the criterion is not met, the computer "beeps" and encourages the user to try again.

HMM systems such as TriplePlay Plus have virtually no ability to make fine phonetic distinctions between the utterances repeated by the user. Thus, for example, in response to the computer-generated phrase "I have some", the system provides a congratulatory tone when the speaker says any of "I have some", "I have one" or "I have none." It is therefore observed that the probabilistic HMM techniques employed in TriplePlay Plus appear to be incapable of distinguishing between the fricative /s/, the nasal /n/ and the glide /w/.

An example of a discrete word HMM-based speech to text transcription system is Dragon Dictate offered by Dragon Systems, currently the market leader. As each word is recognized by the system, a series of ranked choices is presented amongst which the user may select the correct word. Because the accuracy level of commercially available systems is generally only about 90% or less (and significantly less with speaker independent systems), the user must carefully review the text as it is being generated (or afterwards proofread every word of the document, if error correction is deferred until the transcription is completed). Such systems have the obvious drawbacks of being either annoying during use (due to the need to constantly pick from ranked word choices) or requiring the user to carefully proofread the entire document. And because the system has no "self-awareness", it doesn't know when to alert the user that an incorrect word choice has been made.

In view of the foregoing, it would be desirable to provide a natural language speech recognition system that incorporates knowledge of acoustics, phonetics, syntax and the semantics of the selected language.

It would further be desirable to provide a speech recognition system and methods capable of recognition accuracy levels comparable or exceeding those achievable using state-of-the-art HMM-based speech recognition systems without requiring training.

It would further be desirable to provide a speech recognition system and methods which are largely speaker independent, and which are capable of recognizing most variations in pronunciation that would be understood by a native speaker of the language.

It would further be desirable to provide a speech recognition system and methods that present an intuitive and easy to master user interface. For example, it would be desirable for the speech recognition system to permit direct speech to text transcription of spoken utterances with sufficiently high accuracy that only words about which the system was uncertain could be flagged (e.g., underlined, bold-faced, or displayed in reverse video) to alert the user to review those words. Thus, instead of requiring user intervention for virtually every word selection, the system of the present invention might provide suitable highlighting of only those words for which the system's confidence in its choice falls below a certain threshold.

SUMMARY OF THE INVENTION

In view of the foregoing, it is an object of the present invention to provide a natural language speech recognition system that incorporates knowledge of acoustics, phonetics, syntax and the semantics of a selected language. In particular, it is an object of this invention to provide a system to analyze a speaker's utterance employing knowledge of acoustics, phonetics, syntax and the semantics of a selected language, and to select with high confidence the word corresponding to the spoken utterance from a large vocabulary.

It is another object of this invention to provide a speech recognition system and methods capable of recognition accuracy levels comparable or exceeding those achievable using state-of-the-art HMM-based speech recognition systems without much training.

It is a further object of this invention to provide a speech recognition system and methods which are largely speaker independent, and which are capable of recognizing most variations in pronunciation that would be understood by a native speaker of the language.

It is yet another object of the present invention to provide a speech recognition system and methods that present an intuitive and easy to master user interface. Thus, the user interface of the present invention permits direct speech to text transcription of spoken utterances with sufficiently high accuracy that only words about which the system is uncertain are flagged (e.g., underlined or bold-faced) for user review, much like spell-checking functions commonly used with written word processing programs. Thus, instead of requiring user intervention for virtually every word selection, as in prior art systems, the system of the present invention provides suitable highlighting of only those words for which the system's confidence in its choice falls below a certain threshold.

These and other objects of the invention are accomplished in accordance with the principles of the invention by providing a speech recognition system and methods that represent significant advances over prior art knowledge-based methods.

For example, the speech recognition methods of the present invention include novel ways of segmenting the utterance to permit more accurate extraction of pitch periods can be made than heretofore possible with prior art segmenting techniques. These improved segmentation techniques provide not only better pitch period extraction for vocalic components of the utterance, but reduce parasitic effects encountered during spectral and formant analysis.

The speech recognition methods of the present invention also advance the state of the art in the methods of formant analysis, for example, by tracking both amplitude and phase properties of the speech signal. The availability of accurate formant tracking permits fine phonetic distinctions between vocal phones with a robustness not achievable using prior art methods.

The speech recognition methods of the present invention also provide rule sets for developing both legally permissible allophone representations of a set of "baseform" phonetic expressions contained in a dictionary, and rule sets for developing acoustic feature vectors corresponding to the permissible allophonic pronunciations the dictionary baseforms that account for the acoustic events likely to occur in the spoken utterance.

The lexical access methods of the present invention, based on acoustic feature vectors, also provide a three-way logic technique not previously implemented in knowledge-based systems. This method accounts for variations in the acoustic events detected potentially present in the utterance (for example, due to reduction, deletion and substitution of phones), thus making the system of the present invention largely speaker independent.

The linguistic methods of the present invention provide grammatical and lexical control of the utterance recognition results not heretofore realized. Recognition of an utterance is controlled primarily by using grammatical, rather than lexical restrictions, thereby making the present invention largely independent of the domain of the input utterances, a capability not been possible with previously known knowledge-based recognition methods. In addition, the grammatical analysis is applied to word garlands, i.e., to more complex objects than the word strings that are the objects of previously known analysis techniques.

The grammatical analysis techniques of the present invention enable two levels of processing: a local level and a global level, thereby permitting more accurate control of recognition results than heretofore attainable. Local grammatical analysis provides preliminary filtering of the word garlands and their transformation into word strings, using tables of triplets and quadruplets of syntactic classes, which is a more general technique than bigrams and trigrams of concrete lexemes used in the previously known methods. Global grammatical analysis grades the resulting word strings by their preferability and specifies the ones that are more plausible as representations of the input utterance, using an ATN-type grammar and a dependency co-occurrence dictionary arranged within an object-oriented paradigm. This analysis strategy makes it possible to introduce not only grammatical, but also semantic control of the recognition results, which has not been implemented in previously known knowledge-based speech recognition systems. To choose the best of the plausible strings, a special meta-level is introduced that deals with a multi-criterion choice problem, thus improving over previously known techniques in that the best string does not necessarily have to be a grammatical one.

These and other advances in speech recognition methodologies enable the system of the present invention to analyze and parse out a spoken utterance, and to select, through the application of acoustic, phonological, semantic and syntatic rules, the word or words that a native speaker of the language would most likely associate with the utterance.

Further features of the invention, its nature and various advantages will be more apparent from the accompanying drawings and the following detailed description of the preferred embodiments.

BRIEF DESCRIPTION OF THE DRAWINGS

FIG. 4A is an illustration of the application of the rough split segmentation criteria to an input speech segment;

FIG. 5A shows, respectively, illustrative waveforms and spectrograms for the utterances "basket" and "gasket", showing the location of characteristic features determined by the formant analysis methods of the present invention;

FIG. 7A is a table showing the phonological rule set applied to the baseform vocabulary to generate the cloud of phonetic transcriptions corresponding to baseform orthographic words;

FIG. 7B is a table showing the phonetic/acoustic rule set applied to the cloud of phonetic transcriptions to extract the features specified in the acoustic event transcription cloud;

FIG. 7C is an example of the application of the phonetic/acoustic rule set to generate the acoustic words corresponding to selected phonetic transcriptions.

DETAILED DESCRIPTION OF THE INVENTION

The present invention is directed to a speech recognition system and methods for converting an input acoustic wave into written (orthographic) text corresponding to the words of the spoken utterance, or machine understandable commands, with high accuracy and little user intervention.

Figure 1:
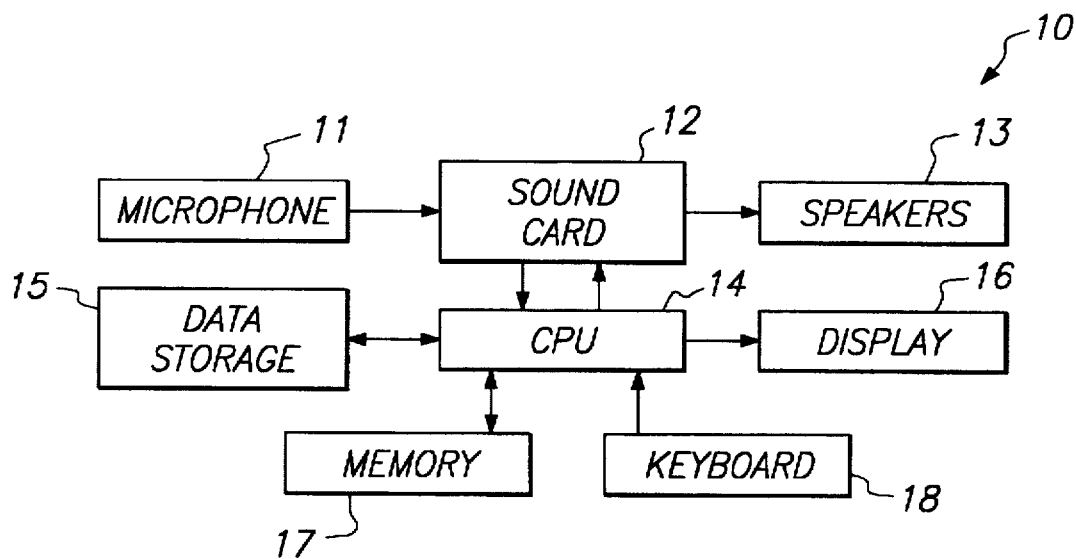
FIG. 1 is an overview block diagram of the components of a speech recognition system constructed in accordance with the present invention.

In overview, referring to FIG. 1, system 10 constructed in accordance with the present invention includes main processor 14 interconnected to sound card 12, microphone 11, speakers 13, data storage device 15, display 16, memory 17 and keyboard 18. System 10 may comprise, for example, a multimedia-capable personal computer, comprising, for example, a Pentium® 90 MHz MPU-based (or comparable) personal computer preferably having 16 Mbytes of RAM of memory 17 on the processor board, and a 16-bit sound card 12 (such as the Sound Blaster® card available from Creative Labs, Milpitas, Calif.). Integrated multi-media systems of this kind are available, for example, as the Legend and Force series of multi-media computers offered by Packard-Bell, Sacramento, Calif. Data storage device 15 may comprise a hard drive, a CD-ROM, or both, while keyboard 18 may include a pointing device (i.e., a mouse) as well as a standard keyboard. During operation of system 10 to perform speech recognition, machine-readable programmed instructions are stored in memory 17.

The knowledge-based speech recognition system and methods of the present invention include a series of method steps which provide real-time analysis and transcription of spoken utterances. In a preferred embodiment of the speech recognition methods of the present invention, utterances spoken into microphone 11 of system 10 are converted directly to orthographic (i.e. properly spelled) text corresponding to the utterances. As illustratively shown in FIG. 2, the spoken text 21 corresponding to the utterances is presented on display device 16 of system 10 in sentence-by-sentence format essentially in real-time.

Figure 2:
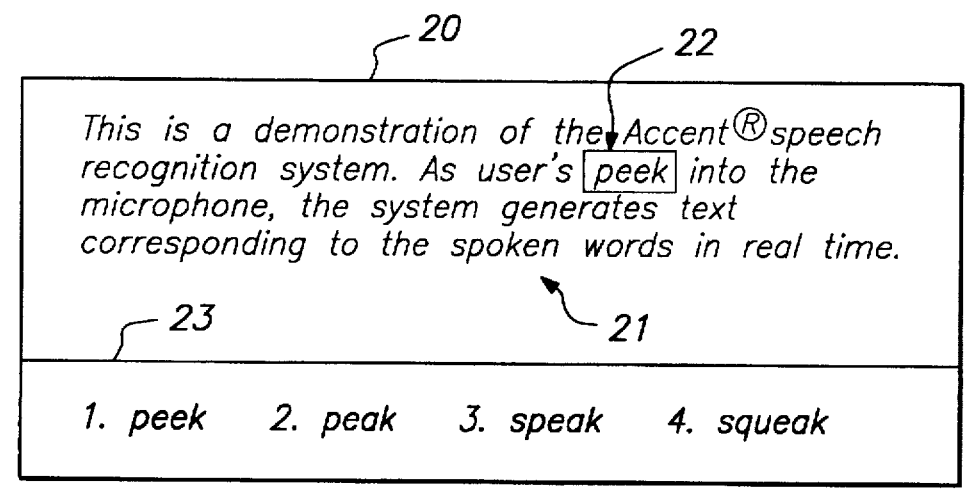
FIG. 2 is an illustrative screen display of a user interface employed in the speech recognition system of the present invention.

In a preferred embodiment of the invention, those words for which the recognition system cannot select a word choice with a confidence level exceeding a preset threshold are flagged for the user's consideration during review. Thus, for illustration purposes, the word "peek" in FIG. 2 is highlighted, and alternative word choices are presented in information bar 23, which may appear, for example, along the bottom of the screen of display 16. Because the speech recognition system of the present invention is expected to provide recognition accuracy in a range of 95% or better, it is expected that a user will have to consider relatively few flagged words when editing the machine generated text.

In addition, the speech recognition system of the present invention may be employed not only for direct speech to text translation, but may also be employed to issue machine understandable commands to system 10, or to provide appropriate punctuation in the generated text. For example, system 10 may recognize and act upon a predefined set of command words, such as "open file" and "close file." Also, for example, the speech to text system may include the ability to detect where punctuation marks should occur in the speech and automatically insert "period", "colon", etc., so as to insert a ",", "." or ";" in the appropriate location in the transcription.

OVERVIEW

Figure 3:
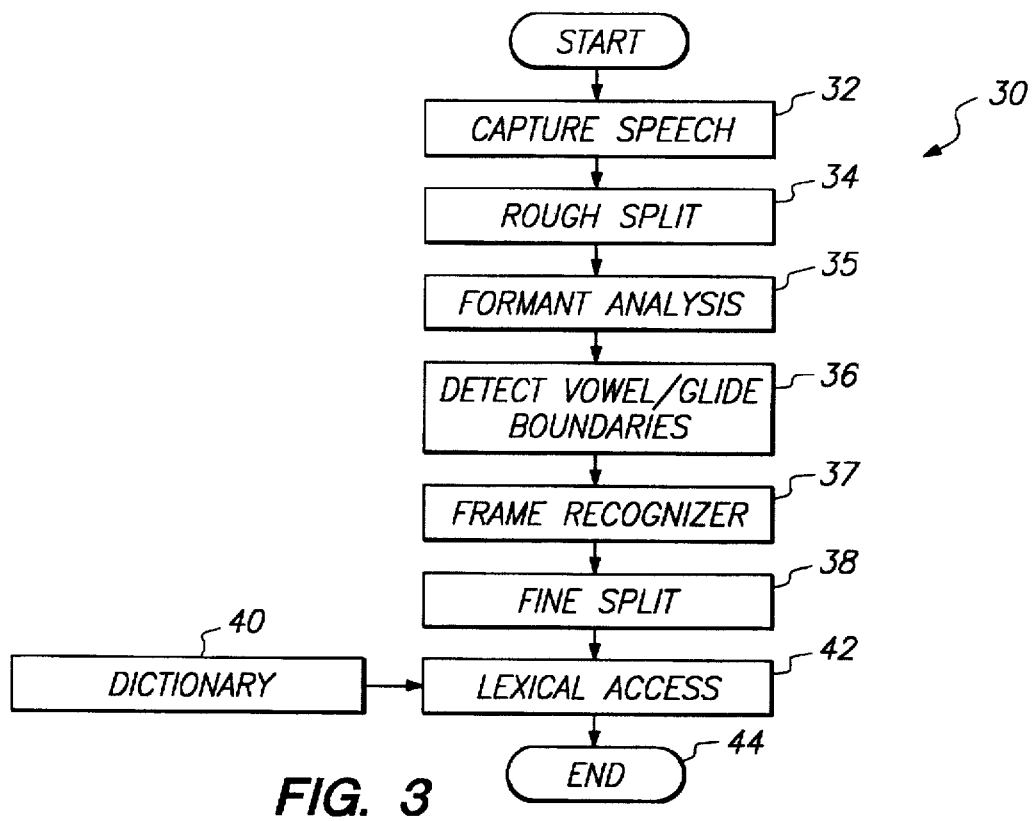
FIG. 3 is an overview flow diagram of the speech recognition method steps of the present invention.

Referring now to FIG. 3, an overview of the steps of the speech recognition methods are described. These steps are first described briefly to show the interrelation of the steps, with each of the steps explained in greater detail in the sections provided hereinafter.

Recognition method 30 of the present invention begins with the step of speech capture 32 that is initiated when a user speaks an utterance or series of utterances into microphone 11 (referred to hereinafter as an "input signal"). Sound card 12, for example, a 16-bit sound card such as the Sound Blaster® card, sold by Creative Labs, Inc., Milpitas, Calif., provides digital sampling of the input signal at 22,050 Hz, thus converting the input signal into a series of 45 msec-long samples (1 msec 1×10−6 second). The digitized signal is then stored temporarily in a buffer while succeeding operations are performed.

At step 34, the input signal is segmented in a series of operations to detect the word boundaries and inter- and intra-word pauses. The non-pause segments are then further divided into a series of frames. Unlike previously known methods, which divide the input signal into fixed length frames (see, e.g., page 273 of the above mentioned De Mori article), the methods of the present invention determine frame lengths in an iterative fashion appropriate to the acoustic and phonemic nature of the input signal. Thus the length of the frame is variable within different portions of the utterance.

Pitch periods are iteratively computed to determine the lengths of vocal segments, and those segments in which no pitch period can be found are labelled as either pauses or non-vocalic (i.e., noise). Non-vocalic segments, that is, segments that contain energy spectra above a certain threshold corresponding to background noise, are divided into 3 millisecond intervals.

For each frame, a number of parameters are calculated, including the instant Fast Fourier Transform ("FFT") spectrum, values of frequency-band normalized spectrum, and weighting functions. Based on these weighting functions a posterior probability of being classified as noise, pause, vocal or vocal pause is determined for each frame.

Based on the frame parameters and nature of the frames as vocal or non-vocal, the frames within the words of the input signal are classified as central or peripheral. Central frames are those that strongly manifest canonical properties of the acoustic class they were classified by; peripheral frames are those that exhibit properties of a corresponding class to a lesser degree. After the central frame is identified, neighboring frames of the same class which were classified as peripheral are combined with the central frame to create a larger segment that is labeled as vocal, noise, pause, or vocal pause.

Following this segmentation step, each vocal segment is further analyzed to detect local disturbances in the average spectrum, to detect characteristic total energy changes in the time course and to further partition the vocal segments as vowels and glides. In addition, bursts are detected after non-vocal and vocal pauses based on characteristic slopes of total and high energy near the very beginning of the noise segment that follows a pause. All these segments together constitute a so-called "Rough Split" of the input signal.

Following step 34, vocalic segments are analyzed to extract and determine the behavior of the formants, at step 35. Formants are characteristic resonant frequencies produced during the enunciation of vocal speech segments by various skull cavities because of different positions of the speech organs (e.g., glottis, velum, tongue, lips, and nasal passages) of the vocal tract. Since the formants are detectable properties of the physical events that take place in the vocal tract, they can be modeled to rule out phonemes or their sequences that are not considered consistent with the events indicated by formant analysis.

During formant analysis step 35, the benefit of the iterative pitch extraction undertaken during the rough split step becomes apparent. In particular, because the formant track extraction relies upon use of Fourier transforms, the care taken to determine the pitch period with high accuracy reduces the distortion of resulting spectrum and formant values.

In step 35, the spectrum for each frame of the input signal is computed using Fast Fourier Transformation, and smoothed both in frequency and temporal directions. For each frame in the smoothed spectrum, local maxima are identified and several of the most representative of the identified local maxima are chosen. During this stage some of those maxima are declared to be points that belong to one of the formants and some are declared to be alternative points. A multi-pass process is undertaken to connect the points of adjacent frames into formant "tracks" by considering their locations with respect to each other, previously assigned types of the points, and the amplitude and/or phase of the spectrum values in the adjacent frames.

Upon completion of the step 35, a formant track is defined in two forms: as a set of points with frequency and amplitude coordinates for each frame and as an interpolation polyline. Each track is also characterized by the median frequency of the track elements, the formant number to which the track is assigned, and a measure of the reliability of the track. These formant tracks are used during the lexical access phase, step 42, as described below, to rule out words having phoneme sequences inconsistent with the computed formant tracks. In addition, the formant tracks are used in the verification stage, described below.

For glide-vowel and vowel-glide transition the boundary between two adjacent phonemes is difficult to detect. In these cases a special procedure based on formant behaviour is used at step 36 to detect vowel/glide boundaries, and the segmentation points generated by this procedure are added to the pool of points created by the previous steps.

At step 37, a frame recognizer is employed to assign, for each frame in the utterance, a list of phoneme labels ordered with respect to the likelihood of the frame being a part of the corresponding phoneme. A frame by frame analysis is performed based on the results of the frame recognizer, in which transitions between phonemes are detected. This frame-by-frame analysis therefore is applied for verification and improvement of phonetic boundaries within vocal segments.

At step 38, the "fine split" of the segmented input is made. The fine split step involves examining the segmentation points obtained during "rough split" step 34, the segmentation points constructed during analysis of the formant behavior, step 35, and points created during vowel/glide detection step 36 and frame by frame analysis step 37, to detect fine phonemic distinctions.

During the fine split step a set S of all segmentation points is considered. Closely situated points are replaced with a single point, some of the points are discarded and points that separate highly different segements (from an acoustic point of view) are marked as robust. Based on this updated set S of segmentation points, a dendrogram is constructed. The best n paths in the dendrogram are identified and, based on those paths, the best n hypotheses of the fine split are constructed.

The output of fine split step 38 is one or more hypotheses of the phoneme boundaries (indicated by the frame numbers) corresponding to the series of acoustic events that comprise the phonemes of the input signal, with certain unique phonemes identified by their spectral characteristics. A phoneme recognizer is applied at step 38 to every phoneme segment, to recognize and assign a set of phonemic hypotheses with corresponding recognition likelihood values. The resulting fine split phonemic hypotheses of the segment are referred to hereinafter as "phoneme garlands". The phonetic types assigned to the segments during the fine split step determine what type of recognition mechanism is applied to the segment and reduce the number of possible hypotheses. Therefore, step 38 also begins the process of phoneme recognition by locating and positively identifying phonemic segments that have unique and well-defined characteristics.

The sequences of phoneme split segments and their garlands are later matched with the phonetic words of a dictionary using a matching procedure. As a result of matching procedure some utterances may have only one word hypothesis generated, while other utterances may have multiple word hypotheses that take into account various phonologically permissible variants of the words, e.g., potential reduction (reduced stress) or deletion (complete omission) of one or more phonemes.

Still referring to FIG. 3, dictionary 40 comprises the vocabulary in which the speech recognition system searches for words corresponding to the utterances in the input signal. In a preferred embodiment of system 10 and method 30 for use with North American English, vocabulary 18 contains an active vocabulary of approximately 30,000 to 60,000 words, with a total vocabulary of 100,000 words (roughly half of the words in a standard dictionary, e.g., Webster's II New Riverside University Dictionary). Words in the active vocabulary preferably are resident in memory 17 during operation of system 10, while words in the backup dictionary preferably reside in data storage 15 until accessed, when, for example, no satisfactory recognition can be made with the words in the active vocabulary.

Dictionary 40 is arranged as a series of indexes that contain orthographic (i.e. properly spelled), phonetical, acoustical, and grammatical information about each word. For each word in dictionary 40, all permissible grammatical forms of the word are provided. Thus, nouns are given in singular nominative, singular genitive, plural nominative and plural genitive; verbs are given in bare infinitive, s-form, ing-form, past tense, and past participle; adjective and adverbs are given in absolute, inflected comparative (e.g., "-ed") and inflected superlative (e.g., "-est") degrees. Words belonging to other word classes are also given in all existing forms. In addition to above information, dictionary 40 also includes for each word a number of entries related to grammatical features of the word, for example, the syntactic class of the word (e.g., as a noun, adjective, common verb, modal verb, copula, adverb, etc.), numeric weights of the relative lexical and grammatical frequencies of the word, etc.

In a preferred embodiment of system 10 and method 30, the entries in dictionary 40 are initially generated from the orthographic and phonetic baseform words, and the complete dictionary is then maintained as a static part of the overall system 10. However, because the structure of the dictionary is important to a proper understanding of how the lexical access step is performed, the method of generating the information associated with the dictionary entries is briefly described below.

Each word in the dictionary (and all of its various grammatical forms) is represented by a phonetic baseform (referred to as a "phonetic word") taken, for example, from the Longman Dictionary of American English. The phonetic baseform contains the phonetic transcription of the word in accordance with the International Phonetic Alphabet, as further modified to conform to the phonetic alphabet provided hereinabove.

Each phonetic word is then expanded into as many legally permissible phonetic variants as would be understood by a native speaker. Phonetic assimilations, elisions, and other phonetic variations, which are considered permissible in deliberately clear speech, are automatically generated in accordance with certain phonological rules developed by applicants. The expanded variants of the baseform are referred to as "phonetic transcriptions," with the variants for a particular word forming a "phonetic cloud" of permissible phonetic transcriptions corresponding to each baseform phonetic word. For example, the word "abandons," which has a phonetic baseform of [ah0 b ae1 n dx ah0 n z], may be represented by the phonetic variants: [ah0 b ae1 n dx ah0 n d z], [ah0 b ae1 n dx ah0 n d s] and [ah0 b ae1 n dx ah0 n t s].

Once the phonetic cloud has been generated, certain rules (referred to as "rough rules" because they are used to match words against the "rough split" of the input signal) describing the interrelation of acoustic events are applied to the words of the phonetic cloud to generate "vocabulary acoustic event transcriptions" corresponding to one or more of the phonetic transcriptions. These rules convert the phonetic transcriptions of one or more variants of a word into a representation which describes a word as a lattice of acoustic events. The primary acoustic events are: Noise (for most fricative consonants); Pause (for unvoiced closures of stops); Voice (for vowels and most sonorant consonants); Gap (for vocal segments of low energy corresponding to voiced closures of stops, flaps, and some sonorant consonants especially nasals); and Burst (for release of stops).

In addition, certain other features such as glides, nasals, s-noise, sh-noise, etc., are detectable acoustic events and are included into the appropriate acoustic event transcriptions as well. For example, all of the phonetic transcriptions of the word "abandons" shown above may be represented by the series of events: "vowel—gap or pause—burst or noise (that may be omitted)—E vowel—nasal or pause—burst or noise (that may be omitted)—vowel (that may be omitted)—nasal or gap—S that may be noise or burst."

Once a vocabulary acoustic event transcription is assigned to every word in the dictionary, the acoustic event transcriptions are grouped into sets, referred to as "orbits", according to prevalence of certain features in the acoustic event transcriptions. Thus, while two words may have very different phonetic transcriptions, if they have similar acoustic event transcriptions, they will be classified into the same orbit. Many words may have certain phonemes omitted and therefore have different acoustic transcriptions but yet remain as admissible pronunciations; therefore most of them are classified into a number of different orbits. For a vocabulary of approximately 70,000 words, approximately 11,000 orbits may be identified.

Still referring to FIG. 3, lexical access step 42 (i.e., matching the input signal to the vocabulary words) is described. The initial phase of lexical access employs as its inputs (1) a vector including: the rough acoustic events transcription of the input signal and the frame spectral characteristics computed during rough split step 34, the formant tracks generated during step 35, certain positively identified phonemes such as fricative noises, retroflex /r/ and the phoneme garland hypotheses from fine split step 38 and (2) the orbits defined by similar vocabulary acoustic event transcriptions.

In this initial lexical access stage, the rough acoustic event representation of the input signal is compared to one or more orbits formed by features based on vocabulary acoustic event transcriptions using three-way logic. The logic is "three-way" because for every feature in the rough word corresponding to the input signal, a determination is made that either "Yes"—the feature is present in the dictionary acoustic event transcription; "No"—the feature is not present in the dictionary acoustic event transcription; or "Don't Know"—it is uncertain whether the feature in the input signal is present or not. Only the words in those orbits for which the rough acoustic transcription matches the vocabulary acoustic event transcription (i.e., either Yes or Don't Know) are considered in the next stage of lexical access; words in orbits for which there is no match are not considered further. It is expected that in a preferred embodiment of the invention, the first phase of lexical access will reduce the number of possible word choices by about two orders of magnitude (i.e., from 100,000 words to about 1000).

To reduce the number of candidate words to be recognized by finer mechanisms, a procedure of mapping the "rough"

transcription of the word to the sequence of detected acoustic events is applied. This procedure is identical to the procedure for mapping the word pronunciation to the result of phoneme recognition, described below and differs from the latter only by the objects being compared with each other, and the penalty matrix. However, each "rough" transcription usually corresponds to a whole group (consisting, on the average, of 8 to 10 elements) of pronunciations so-called "sub-orbits" of the orbits. A threshold for the "rough" mapping penalty is established, such that those passed-through-the-sieve pronunciations whose "rough" transcriptions, when mapped to the sequence of detected acoustic events (and penalized if above the established threshold), are not thereafter considered. Thus use of a threshold provides an efficient operation (in terms of performance speed) capable of reducing the number of candidate words approximately by half.

In order to determine the weights of a mapping of a phonetic word (taken from the dictionary) and the sequence of recognized phonemes, a special table of penalties is employed. This table determines the price of matching any two phonemes. The table of penalties is created automatically based on the vectors of features of each phoneme and the distance between them.

As a result of the word mapping, the candidate word list is reduced by at least another order of magnitude for some words in the utterance, while only several choices remain for other words. The output of the word mapping is thus a string of words ("word garland") with one or more word choices specified for each word of the garland.

The next step of the recognition process is the verification of the word mappings. The goal of the verification step is to estimate the correctness of the mappings. There are five independent techniques employed in this evaluation: 1) an estimator of the mapping with respect to the comparative duration of the mapped phonemes and their energy parameters; 2) an estimator of the presence of a burst at the beginning of the word; 3) a formant analysis based on triphon statistics; 4) a formant analysis based on the behavior of the formants; and 5) a phoneme per frame image mechanism.

The first technique estimates the correctness of the mappings by evaluating the absolute and relative lengths of the intervals of the input signal that correspond to the consonants and evaluating the length and the total energy of the intervals of the input signal that correspond to the stressed and unstressed vowels.

The second technique gives the likelihood of the presence of a burst at the beginning of the word by performing an additional fine analysis of the input signal at the beginning of the word.

In the third and forth techniques employ a common triphon construction scheme. For each dictionary phoneme from the mapping a corresponding set of formant pictures and a set of acoustic phonemes is constructed (The formant picture is a set of three formant tracks corresponding to F1, F2, F3). The notion of a phonemic-formant (or "PF") PF duo is introduced, where the PF duo is a possible pair of an acoustic phoneme and a formant picture that both correspond to a dictionary phoneme. A directed n-graph G is constructed to find all possible triplets of PF duos corresponding to the consecutive phonemes. Such triplets, together with the formant picture of the middle phoneme, is defined as a triphone.

The third technique estimates each triphone using a statistical approach involving a table of formant values for diphons and triphons for consonant-vowel/glide-consonant contexts.

The fourth technique estimates formant behavior for each triphone and uses special methods for particular phonemes and diphones. This technique extracts characteristic points for each formant which describe the shape of formant and deals with peculiarities particular to that phoneme, triphone or diphone.

The fifth technique gives an estimation of a correspondence of a word hypothesis and the utterance being recognized using a special phoneme per frame image. This grayscale image is analyzed and clusters in the image are detected. For every mapping a best path from the bottom left corner to the top right corner of the image is determined using a dynamic programming scheme. The weight of the path is determined as the sum of the grayscale levels of the points on the path. If certain conditions are not satisfied for the path, penalties are imposed on the weight on the path. The weight of the path corresponding to a mapping is defined as an estimation weight of that mapping.

Every technique gives its own estimation weight for each of the mappings. The resulting total estimation weight is a function of the five weights given by the individual techniques and the weight that was assigned to the mapping during its creation. The function is chosen in accordance with the quality of estimation of each of the techniques; the parameters used in the function are determined based upon statistics of the how well the techniques perform when employed on a large set of testing material.

The word garlands are reordered with respect to the resulting estimation weights and given as input to the grammatical subsystem. The word garland is then subjected to grammatical analysis. The main purpose of this step is to take into account the grammatical and lexical properties of the words in the garlands in order to transform the garlands into a set of word strings as tentative representations of the utterance and to form a complex plausibility estimate for each of these strings. The grammatical and lexical properties considered in the grammatical analysis are: 1) the grammatical features of words and collocations; 2) the grammatical structure of each string as a whole and/or of the phrases that the string might contain; 3) the grammatical "events" found to be present in the strings, i.e. the occurrence in them of certain grammatical phenomena, such as ellipsis, anaphora, deviant forms, lack of agreement, etc.; and 4) the frequency of words, collocations and lexical pairs.

The grammatical analysis is based on a natural language knowledge base (NLKB) specifically designed for this purpose. The general scheme of the grammatical analysis envisages two levels of processing: local grammatical analysis provides preliminary filtering of the word garlands along with their transformation into word strings; and global grammatical analysis grades these strings by their preferability and chooses the ones that are more plausible as representations of the utterance of the input signal. To choose the best of the plausible strings, a special meta-level is introduced dealing with the multi-criterion choice problem (the criteria of which are described below). An important distinctive feature of the solution of this problem by the techniques employed is that the best string does not necessarily have to be a grammatical one.

The natural language knowledge base used in the analysis process includes a number of grammatical dictionaries, corpora of admissible and inadmissible sequences of syntactic classes, a grammar table, and a dependency co-occurrence dictionary.

The grammatical dictionaries employed are: the grammatical dictionary of separate words; the grammatical dictionary of phrasal verbs, (e.g. "get back". "give up" or "bring home to"); the grammatical dictionary of collocations (e.g. "enter key". "except for". "Microsoft Word". etc.); the grammatical dictionary of the so-called "segments", i.e. sequences of words merged into one phonetic word (e.g. "I'd". "aren't" or "boy's"). Entries in any of the grammatical dictionaries contain the symbols of syntactic classes assigned to the entry units (Noun. Verb. Conjunction. etc.), more particular grammatical features of these units (Number. Person. Transitivity, etc.), their semantic features (Human, PhysObject, InfoObject, etc.), and a frequency tag.

Admissible and inadmissible sequences of syntactic classes are used to describe local syntactic relations in the local grammatical analysis step. Their corpora include three tables of admissible triplets, each triplet provided in them with certain grammatical features to be used in the analysis, and a table of inadmissible quadruplets, the so-called "anti-quadruplets".

The grammar table and the dependency co-occurrence dictionary are used by the global grammatical analysis step. The grammar table constitutes a table-like representation of a formal augmented transition network ("ATN")-type grammar which determines grammatical compatibility of distantly located parts of the sentence and finds all admissible variants of the sentence's syntactic structure. The dependency co-occurrence dictionary contains entries both for lexical and for various types of grammatical items, specifying for each of such items its predictions for the structural elements (dependents and/or governors) that may be co-occurrent with the corresponding text item in a sentence.

Local grammatical analysis of the word garland associates grammatical features with the candidate word choices in the garland using triplet tables. There is a separate triplet table for each of the three main sentence types: declarative, imperative and interrogative. Each line in the triplet table includes a triplet of syntactic classes (e.g. Verb-Subordinate_Conjunction-Noun), an operator (the so-called "demon") that checks the admissibility of this triplet, the triplet frequency tag, and its "grammatical events" marker. This information is used to reject those of the candidate strings which are considered to be absolutely inadmissible, and to weight the remaining strings. The output of the local grammatical analysis is a set of word strings, each string individually ranked and weighted based on locally applied grammatical rules.

A global grammatical analysis step follows the local grammatical analysis step and takes as its input the candidate word strings produced by the local analysis. Global grammatical analysis establishes the non-local syntactical relations structure of each string using the grammar table and the dependency co-occurrence dictionary. The grammar table is an ATN comprising descriptions of structural phrases possible in a sentence and a set of operators providing access to the dependency co-occurrence dictionary. This table is used in two kinds of analysis procedures: a top-down procedure and a combined top-down and bottom-up procedure of a special type, a so-called "cascade analysis".

The syntactical relations structure associated with a word string in the course of its global analysis is used as a basis for the grammatical descriptor of the string, this descriptor comprising information on the properties of its structure as a whole, as well as of the structure of the phrases it might contain. The grammatical descriptor is used to verify certain non-local contextual requirements, as well as to weight the plausibility of the word string as a representation of the input utterance.

The meta-level uses the results of all the previous steps of processing the input utterance to choose the best of the candidate word strings for its representation. It has to deal with a multi-criterion choice problem, the criteria involved being of three types: criteria resulting from the recognizer's weighting of various word choices; criteria based on the results of the local grammatical analysis of the word garlands; and criteria based on the grammatical descriptors of the candidate word strings constructed by the global analysis. An important asset of the meta-level procedures employed in the present invention is that the best string chosen does not necessarily have to be a full and grammatical sentence. More precisely, the analyzer can accept both non-sentential strings, like newspapers headings, and ungrammatical expressions (often found in spontaneous speech).

At the conclusion of the grammatical analysis step, it is expected that in most cases all words of the sentence will be defined with a confidence level exceeding a predetermined threshold value. This sentence will therefore be presented to the user as the correct spelling of the input signal utterance. As shown illustratively in FIG. 2, those words for which the confidence level falls below the predetermined threshold are presented on the screen of display 16 in a flagged format (e.g., reverse video) to attract the user's attention. At the completion of the step 42, system 10 resumes an idle mode (shown by end block 44), where it awaits further input from the user via microphone The following provides a detailed description of each of the steps set forth in the above Overview, with reference to FIGS. 4–8. For the reader's convenience, the detailed description is organized in accordance with the following outline:

1. Speech Capture
2. Rough Split
   2.1 Detect Word Boundaries
   2.2 Pitch Period Extraction
   2.3 Construct Frames
   2.4 Building of the Segments
   2.5 Assign Segment Labels
   2.6 Segmentation of the Vocal Intervals
3. Formant Analysis
   3.1 Calculate Smoothed Spectrum
   3.2 Locate and Classify Characteristic Points
   3.3 Generation of Formant Tracks
4. Phonemic Boundaries Generated by Analysis of Formants Behavior
5. Frame Recognizer
   5.1 Creation of the Oracle
   5.2 Recognition Stage
6. Frame By Frame Analysis
7. Fine Split
   7.1 Preprocessing of the Segmentation Points
   7.2 Phoneme Recognizer
   7.2.A Creation of the Oracle
   7.3 Construction of the Dendrogram
   7.4 Construction of All Paths in Dendrogram
8. The Speech Dictionary
   8.1 Select Baseform Dictionary
   8.2 Ascribe Grammatical Features to Vocabulary
   8.3 Generate Phonetic Word Vocabulary
   8.4 Generate Acoustic Event Transcriptions
   8.5 Classify Acoustic Words into Orbits
   8.5.A Set Of Features
   8.6 Construction of Dictionary
9. Lexical Access
   9.0.A Calculation of Acoustic Features
   9.1 Comparison of Input Speech Signal to Orbits 9.2 Matching Dictionary Words To Recognition Results
9.3 Select K-Best Word Hypotheses
 9.3.A Creation of the Oracle
 9.3.B Recognition Stage
 9.3.C Using Results of K-Best Recognizer
10. Verification
 10.1 Estimator of the Mapping
 10.2 Estimator of the Presence of Bursts
 10.3 Formant Analysis Based on Triphons
  10.3.A Triphon Construction Scheme
  10.3.B Statistical Approach
 10.4 Formant Analysis Based on Formants Behavior
 10.5 PFI Mechanism for Mapping Verification
11. Grammar
 11.1.A Grammatical Dictionaries
 11.1.B Local Analysis Tables
 11.1.C Global Analysis Grammar Tables
 11.1.D Dependency Co-occurence Dictionary
 11.1 Local Grammatical Analysis
 11.2 Global Grammatical Analysis
 11.3 Meta-level
12. Output

1. SPEECH CAPTURE

Speech capture step 32 is initiated when a user speaks an utterance or series of utterances (input signal) into microphone 11 (referred to hereinafter as an "input signal"). Sound card 12, for example, a 16-bit sound card such as the Sound Blaster® card, sold by Creative Labs, Inc., Milpitas, Calif., typically provides digital sampling of the input signal at 22,050 Hz. The input signal is thus converted into a series of 45 msec-long samples. The digitized signal is then stored temporarily in a buffer that holds about 2 seconds of speech, either on the sound card or in memory 17, while succeeding operations are performed.

2. ROUGH SPLIT

2.1. Detect Word Boundaries

Figure 4:
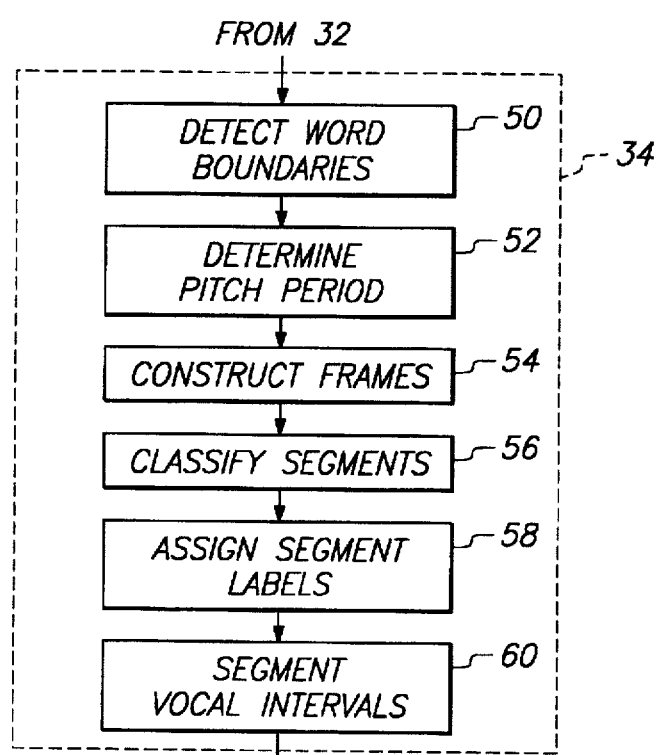
FIG. 4 is an illustrative flow diagram of the rough split segmentation method steps of the speech recognition system of the present invention.

Referring to FIG. 4, the first phase of "rough split" step 34 is step 50 of detecting word boundaries by segmenting the digitized input signal into individual words. This is accomplished by analyzing the energy of the input signal on 15 msec intervals, and based on applicants' empirically derived rules, establishing energy levels that are representative of background noise (between and within words), the beginning of a word, the main content of a word, and the end of a word.

Referring to FIG. 4A, step 50 involves first computing the average energy (in dB) of the input signal at 15 msec intervals for the portion of the input signal in memory (e.g., a speech sample of 2 seconds). These values are saved in an array {Ei}. A histogram of the energy distribution is then constructed by dividing the difference between the maximum and minimum values of {Ei} in the speech sample into 30 equal segments. The maximum in the histogram in the lower 20 dB is recognized as background noise level Ep (50a in FIG. 4A).

Applicants have empirically developed two thresholds to characterize the beginnings of words: A1B=Ep+5 and A2B=Ep+12, and two thresholds to characterize the endings of words: A1E=Ep+9 and A2E=Ep+12 (see FIG. 4A). Rough word boundaries are determined by comparing values of the elements in the array {Ei} with the corresponding thresholds, and assigning (or changing) states in accordance with the following rules:

(a) PAUSE—this state signifies background noise, and this state occurs so long as Ei<A1B. Once the threshold A1B is exceeded, the signal is considered to have passed to state (b);

(b) BOW—this state signifies the beginning of a word, and exists so long as A1B<Ei<A2B. If Ei<A1B, the signal is again characterized as in state (a). When threshold A2B is exceeded, the signal is deemed to have changed to state (c).

(c) WORD—this state signifies the main acoustic content of a word and occurs as long as A2B<Ei and this state occurs for time interval t less than a certain threshold duration T, or as long as A2E<Ei. If for t>T, Ei<A2E, the signal is deemed to have passed to state (d).

(d) EOW—this state signifies end of word and occurs so long as A1E<Ei<A2E. When A2E<Ei, the state returns to state (c); if Ei<A1E, the signal is considered to have dropped to background noise, and returns to state (a).

FIG. 4A provides an illustration of how these thresholds interact, with corresponding segments of a speech sample labeled accordingly. The input signal is represented as a sequence PAUSE—BOW—WORD—EOW—PAUSE—BOW—etc. The points of transition between PAUSE—BOW and EOW—PAUSE are considered as rough boundaries of the word.

Following the assignment of the rough boundaries an average spectrum between the words is calculated (the pause spectrum), and the word boundaries are adjusted by the finer analysis of the spectrum in the boundary regions. The adjustment uses the fact that three phonemes "F", "TH", "HH" could be inadvertently excluded from a word by the rough boundaries segmentation, since energy level for those phonemes only differs only slightly from energy level of a pause. However, the phonemes "F" and "TH" in a spectrum frequency band above 6 kHz have an energy level significantly higher then a pause energy level in the same frequency band, and the phoneme "HH" in the spectrum frequency band 2–5 kHz has an energy level significantly higher than a pause energy level in the same frequency band. As a result, these phonemes can be detected by analyzing certain frequency bands; and if several consecutive frames immediately outside of the rough boundary all have a property of "F" and "TH" or property of "HH", the word boundaries are readjusted to include those frames in the word. This boundary correction step may lead to widening of some word boundaries to include weak noises like "F" or "HH".

2.2. Pitch Period Extraction

Upon completion of the step of defining rough word boundaries in step 50, the next phase of analysis involves analyzing the BOW, WORD and EOW portions of the input signal to find pitch periods indicative of vocal segments.

The input signal is first smoothed by filtering with a low pass filter having a band pass equal to a rough estimation of the pitch period. For the first word in a utterance this estimate is taken from the well-known range of pitch periods for male and female voices (eg. for female voices 170–280 Hz and male voices from 80–140 Hz). For each next word in the input signal the estimate is taken as the mean pitch period of the previous word in the utterance. Intervals of the input signal are then iteratively selected and compared to other intervals of the input signal to determine whether the spectral characteristics of the signal over those intervals are sufficiently similar to reflect a periodic structure. If the intervals are deemed sufficiently similar, additional similar intervals are searched for until intervals displaying non-periodic structure are encountered. Intervals deemed to be periodic are labeled as "vocal" segments, while non-periodic portions of the signal are labeled "non-vocal."

In particular, the input to the pitch period analysis step is the input signal waveform, adjusted to have a zero mean value amplitude. This signal is filtered with a filter having a transfer characteristic of $1-z^{-1}$, and passed through a low-pass IIR Chebyshev Type 1, 3rd order filter having a pass band equal to a rough pitch estimation. The input signal is then passed through the filter inverted in time (i.e., from right to left) to avoid phase shift which could otherwise be introduced by single-pass filtration of the signal. This method is described, for example, in R. W. Hamming, DIGITAL FILTERS, Prentice-Hall, 1983.

The filtered input signal is then analyzed to determine whether portions of the signal display periodic structure indicative of vocal sounds. This analysis involves comparing different intervals of the signal $I_i$, where each interval $I_i$ is described by an amplitude spectrum $\{s_i^j\}$, $0<j<127$ (where each value of $s_i^j$ corresponds to the amplitude within approximately 87 Hz wide frequency increments between 0–11,025 Hz, the Nyquist frequency). A "resemblance" function is defined for comparing the "resemblance" between two segments of the input signal $I_1$, $I_2$ as follows:

$$M(I_1,I_2) = 1 - \sqrt{\frac{\left(\sum_{j=0}^{127} s_1^j \cdot s_2^j\right)^2}{\left(\sum_{j=0}^{127} s_1^j \cdot s_1^j\right) \cdot \left(\sum_{j=0}^{127} s_2^j \cdot s_2^j\right)}}$$

wherein the numerator is the scalar product of vectors $\{s_1^j\}$ and $\{s_2^j\}$ and the denominator is the product of the length of the respective vectors $\{s_1^j\}$ and $\{s_2^j\}$. The resemblance function defined above corresponds to the cosine of an angle between two vectors.

Accordingly, two intervals $I_1$, $I_2$ of the input signal are considered to resemble one another if the following conditions are met:

a) the lengths of $I_1$ and $I_2$ differ by no more than 10%;

b) $M(I_1, I_2)<0.16$;

c) the gravity centers of both intervals are at frequencies below 3500 Hz; and d) the difference between the gravity centers is no more than 1500 Hz.

With the foregoing criteria and formula in mind, applicants have developed the following iteratively applied procedure for extracting the pitch within a segment of the input signal [x,y]:

(1) Select an initial (or next) starting point by partitioning the segment [x,y] into up to a maximum of 9 equal length intervals. For each interval find the global energy maximum; the time coordinate for that maximum is considered to be the starting point.

(2) Find, to the left and to the right of the starting point, sets of points $N_{left}$ and $N_{right}$ consisting of local maximum points in the intervals $[S-P_{max}, S-P_{min}]$ and $[S+P_{min}, S+P_{max}]$, respectively. $P_{min}$ is the minimal possible pitch period, which generally corresponds to a female voice at 250 Hz (about 100 45 msec samples at a 22,050 Hz digitization rate) and $P_{max}$ is the maximum possible pitch period, which generally corresponds to a male voice at 110 Hz (about 200 samples). For each pair of points $B_j$ (for beginning of period) from $N_{left}$ and $E_j$ (for end of period) from $N_{right}$, compute the measure of resemblance of the intervals $[B_i, S]$ and $[S, E_j]$. Points $B_s$, $E_s$ for which the value of $M([B_i,S], [S,E_j])$ is the least are deemed the boundaries of the starting "resembling" intervals.

(3) Extending the pitch period towards the left from $[B_s, S]$ for the points $B_i$, i=2, 3, (where $B_0=S$ and $B_1=B_s$), locate the local maximum point $B_{i+1}$ at the intersection of intervals $[x, B_i]$ and $[B_i-1.75*(B_{i-1}-B_i), B_i+0.25*(B_{i-1}-B_i)]$, which together with point $B_i$ determines the interval most resembling $[B_i, B_{i-1}]$. If such a point is found, the pitch period is extended to the next interval to the left. Likewise, the pitch period is extended in a similar manner to the right of interval $[S, E_i]$ for the points $E_i$, i=2, 3, ... (where $E_0=S$ and $E_1=E_s$) to locate the local maximum point $E_{i+1}$ at the intersection of intervals $[E_i, y]$ and $[E_i+0.25*(E_i-E_{i-1}), B_i+1.75*(E_i-E_{i-1})]$, thus, together with point $E_i$ determining the interval most resembling $[E, E_{i-1}]$.

(4) If in step (3) at least one point was found to the left of $B_s$, or to the right of $E_s$, the pitch period in the interval $[B_i, E_j]$ is considered to have been determined; otherwise, the pitch period is deemed not to exist, and step (2) is repeated after excluding from the list of starting points those which had been included in the interval $[B_i, E_j]$ during step (3).

As a result of the foregoing steps, the non-PAUSE segments of the input signal are partitioned into vocal segments, in which a pitch period has been found, and non-vocal segments, in which no pitch period could be found. In addition, at the conclusion of this process all vocal segments are divided into frames having lengths determined by the pitch period.

2.3. Construct Frames

Referring still to FIG. 4, "construct frames", step 54, involves further partitioning of the input signal and the calculation of various spectral characteristics. In particular, for those segments of words determined in the preceding step to be non-vocal segments, the energy of the input signal is calculated on 3 msec frames. PAUSES (wave intervals in which total energy does not exceed the background noise) and non-vocalic segments are also partitioned, one at a time, into an integral number of frames of the same length, where the frame length is approximately equal to the word-average pitch period.

Each frame (other than PAUSE frames) is characterized by its spectrum (i.e., energy distribution over the component frequencies) and normalized spectrum. The normalized spectrum is obtained by dividing the spectrum, one frequency component at a time, by the average spectrum of the background noise between the words.

In particular, the average full energy of a frame (in dB) is calculated on a spectrum basis as:

$$T_0 = 10 \log_{10}\left(\sum_{j=0}^{127} (s_i)^2/L\right)$$

where $s_i$ is the coefficient within each 86 Hz frequency increment between 0–11,025 Hz and L is the length of the frame (L<256 samples). The energy $T_k$ is also calculated in 8 preset spectrum zones (0–250, 200–450, 450–1100, 700–1700, 1500–2200, 1900–2800, 2200–5000 and 5000–11025 Hz). Applicants also expect that these zones may also be adjusted slightly for different speakers based on formant analysis performed on a limited set of enrollment words. This readjustment is in turn based on the readjustment of the characteristic formant zones of vowel space.

In particular, the spectrum zones are adjusted to reflect the mean values of the formants for a particular speaker as follows: zones 2–3 are adjusted so that the mean value of the zones corresponds to F1; zones 4–5 are adjusted so that the mean value of the zones corresponds to F2; and zone 6 is adjusted so that the mean value of the zone corresponds to F3. The other zones remain unadjusted.

Frequency-zone normalized energy values are also computed for each frame, for both vertical and horizontal normalization, using the formulae:

$$V_k = 100 * \left( \sum_{i=N_1^k}^{N_2^k} s_i \right) / \sum_{i=0}^{127} s_i$$

and $$H_k = 100 * \left( \sum_{i=N_1^k}^{N_2^k} s_i \right) / \left( \max_{\text{by frames}} \sum_{i=0}^{127} s_i \right)$$

where $N_1^k$ and $N_2^k$ are the first and last coefficients of the k-th zone of the above preset frequency zones; and the denominator of $H_k$ is the full energy maximum within a word.

In addition to the foregoing, weight functions $W_{N1}$, $W_{N2}$, and $W_{V1}$ are also calculated for the frames to be classified as Noise1, Noise2, and Vocal1. These functions are sums of segmented linear approximation of zone energies $T_k$ defined above.

At the completion of step 54, the input signal is segmented into intervals assigned as either pause, vocal or non-vocal, with each interval partitioned into multiple frames for which values of average full energy $T_0$, zone-wise energy $T_k$, vertically normalized energy $V_k$, horizontally normalized energy Hk and weight functions $W_{N1}$, $W_{N2}$ and $W_{V1}$ have been computed.

2.4. Building of the Segments

In step 56, the values $T_0$, $W_{N1}$, $W_{N2}$ and $W_{V1}$ computed for each frame in step 54 are compared to a series of rules to classify the frames as either "central" or "peripheral" frames of types N1, N2, V1. The frame is central if it satisfies the conditions described below for Center-Conditions; the frame is peripheral if it satisfies the conditions described below for Peripheral-Conditions.

The process of presegment classification is performed by finding a next frame for which the corresponding center-condition is complied with, and then moving to the left and to the right from this frame while maintaining compliance with the corresponding periphery-condition. Presegments of the same type do not intersect because the presegments are constructed of non-intersecting segments of several types (Vocal1, Noise1, Noise2, etc.) and then merged together. Boundaries for Vocal1 segments are in addition refined by moving these boundaries to the frames corresponding to the greatest jump in the $W_{V1}$ function.

Center-Conditions

CentralN1: $W_{N1}>40$ and $T_0>100$ in the beginning or end of the word; or $T_0>20$ elsewhere; or $T_0>10$ and $W_{N1}>100$ between vocal presegments.
CentralN2: $W_{N2}>90$ and $T_0>150$.
CentralV1: $W_{V1}>10$.
CentralV2: $W_{N1}<0$ and $W_{N2}<0$.

Periphery Conditions

PeripheralN1: $W_{N1}>0$ and $T_0>30$ in the beginning or end of the word; or $T_0>0$ between vocal presegments.
PeripheralN2: $W_{N2}>0$ and $T_0>50$ in the beginning or end of the word; or $T_0>0$ between vocal segments.
PeripheralV1: $W_{V1}>0$.
PeripheralV2: $W_{N1}<0$ and $W_{N2}<0$.

Once the foregoing presegmentation process is complete, the word is split into segments. If a segment of the word is covered by two presegments of different types, one of the presegments is chosen using a disambiguation procedure in accordance with the following rules:

$N1+N2=N2$ $V1+V2=V1$ $N_i+N_j \cap N_j=N_i$ and the segment then is merged with the other segments of the chosen type of presegment. If a Vocal presegment intersects a Noise presegment and the resulting segment is short (less than 20 milliseconds) then the segment is not merged with any other segment but is instead considered to be a transitional segment of type "Other." When all the intersections are resolved the resulting segments are declared to be of the type of the corresponding presegment. The segments of the word not covered by any presegment are declared to be of type "Empty."

2.5. Assign Segment Labels

Step 58 in FIG. 4, assign segment labels, involves renaming the names of the segmented input signal (output from step 56). The rules for relabeling are the following:

Pause-->T_PAUSE
Vocal1-->T_VOICE
Vocal2-->T_BVOICE
Noise1, Noise2-->T_NOISE
Empty Set-->T_LOW
Others-->T_UNDEF Furthermore, if adjacent segments both have label T_NOISE they are merged into a single segment.

At the conclusion of this relabeling process, the input signal is then analyzed to detect the presence of flaps. A flap refers to any sound produced by a single rapid contact between two organs of articulation (as defined, for example, in D. Crystal, "A Dictionary of Linguistics and Phonetics", Blackwell, 1994), and can only occur between two Vocal segments. Acoustically, a flap is manifested with the presence of a small depression in the energy envelope of the input signal. Because the length of a flap segment may be only 1–2 frames, the boundary of the segment is detected by analyzing the input signal waveform for the following characteristics: (1) the presence of a significant rise of the value of a likelihood function (described below) used in the vocal segmentation on the boundaries between a Vocal and a Flap and a Flap and a Vocal; and (2) the total energy fall and the middle frequency energy fall within the segment compared to the vocal neighbors. Thus, the search for the flap is done inside a set of consecutive vocal segments.

In particular, a Flap segment is detected as follows: The set S of the local extrema in the total energy function within the set of consecutive vocal segments is found. If there are three points (maximum, minimum, maximum) from the set S such that both differences between the energy values at the middle and at the left and at the right points is above 5 dB (i.e. a depression is present) a flap is supposed to be present and its exact boundaries are established. The left boundary lies between the left maximum and minimum, while the right boundary lies between the minimum and right maximum. The boundaries are established in the points coinciding with the maximum of the above-mentioned likelihood function.

A weighting function is then applied between the supposed flap boundaries. The values being weighted are the total energy fall and the middle frequency energy fall. The mean values of both are calculated within the supposed flap segment and on both sides of it, within each of two neighboring segments distance roughly equal in length to the length of the supposed flap. The differences between the value within the flap and the average value of those neighboring segments is found. Each difference is normalized using a sigmoid to the interval [−3,3]. If sum of these three numbers is bigger than 4 the answer is "Yes", if it is less than −4 the answer is "No". Otherwise the answer is "Don't know".

If a "No" or "Don't Know" answer is returned, it is conlcuded that no flap is present. If "Yes" is returned the segment is classified as Flap, the boundaries of the flap segment are refined, and the segment is assigned a label T_FLAP. The maximum point of the "resemblance" function ($M(S_k, S_m)$) of k-th and m-th frame introduced during the discussion of step 52 above) is found. If it is larger than double the deviation, the point is declared to be the boundary of the flap. Otherwise the point of the biggest jump in the total energy (the maximum of the derivative) is found and is declared to be the boundary of the flap.

2.6. Segmentation of the Vocal Intervals

Still referring to FIG. 4, the final step in rough split analysis phase 34, "segment vocal intervals", step 60, is now described. In step 60, vocal segments are analyzed to determine the degree of local disturbance and homogeneity of the segments. In this step the vocal segments are further divided into subsegments of type vocal burst or glide.

The following function is defined as a measure of interval disturbance, using the "resemblance" function $M(S_k, S_m)$ of k-th and m-th frame introduced during the discussion of step 52 above:

Let $F_i$ be the i-th frame of the current segment having spectrum coefficients of $s_i = \{s_i^0, s_i^1, \ldots, s_i^{127}\}$ the frame $F_i$. Let $B_i$ be the coordinate of the beginning of the frame $F_i$ and $L_i$ be the length of the frame, then $B_{i+1} = B_i + L_i$.

Let $I_i$ be the set of frame indices that satisfy the following conditions:

$$\forall k \in I_i, \text{ if } k<i, \text{ then } |B_i - B_k| \leq \epsilon, \text{ if } k \geq i, \text{ then } |B_{i+1} - B_k| \leq \epsilon,$$

where $\epsilon = 30$ msec (a characteristic change time for vocal segments) and k is such that $F_k$ belongs to the current segment.

Let $\mathfrak{S}_i$ is the average spectrum at the point i, that is, $\mathfrak{S} = (S_{k \in I_i} S_i^k) / |I_i|$, where $|I_i|$ is the cardinality of the set $I_i$.

For frame i, define the global disturbance $V_i$, and local disturbance $U_i$ as:

$$V_i = S_{k \in I_i} M(S_k, \mathfrak{S}_i) / |I_i|$$

$$U_i = M(S_i, S_{i+1})$$

where $M(S_i, S_{i+1})$ is defined above.

The arrays of numbers $\{V_i\}$ and $\{U_i\}$ are the initial data for the step of determining segmentation of the vocal intervals. This process involves the following series of steps:

(a) In each array $\{V_i\}$ and $\{U_i\}$, locate the local maxima points that are at the same time global maxima in a neighborhood of $\epsilon_1 = 10$ msec.

(b) If in $\{V_i\}$ two adjacent local maxima are separated by less than $\epsilon_2 = 30$ msec, select only the larger of the two.

(c) In the array $\{V_i\}$, compute the mean and variance. Points with amplitude outside the interval [mean+1.5*variance] are marked with a flag MF1;

(d) In the array $\{V_i\}$, compute the mean and variance for a second time for points not marked with a flag MF1. Points with amplitude outside the interval [mean+1.5*variance] are marked with a flag MF2;

(e) For each local maximum in the array $\{V_i\}$ marked with the flag MF1 or MF2; if in the neighborhood $\epsilon_0 = 25$ msec of the current local maximum there is no maximum in the array $\{U_i\}$ and the current local maximum is marked with the flag MF1, the point is marked with MF_ROB_V, which indicates a robust point for the set $\{V_i\}$; if in the neighborhood $\epsilon_0$ of the current local maximum $\upsilon$ from the set $\{V_i\}$ there is $\bar{\omega}$ a maximum in the array $\{U_i\}$ a weight function W() is applied to $\bar{\omega}$.

Using the same normalization procedure as for detection of flaps (see Section 2.5 above), one of three possible answers ("Good", "bad" and "Don't Know") is rendered. Evaluating $W(\bar{\omega})$ returns one of the three answers: "Good", "Bad" and "Don't Know". If the function returns "Good" or if it returns "Don't Know" and $\upsilon$ is marked with a flag MF1, then mark the frame with a flag MF_ROB_VU. In all other cases the frame is not marked.

(f) For each local maximum in the array $\{Ui\}$ that is not marked with the flag MF_ROB_VU the function W() is applied. If W() returns "Good" then the frame corresponding to the maximum is marked with a flag MF_ROB_U.

The flags MF_ROB_V, MF_ROB_U, MF_ROB_VU signify the manner in which the frame was marked, using set $\{V_i\}$, set $\{U_i\}$ or both.

In accordance with the above-described method, the vocal segments are partitioned into points marked with one of the flags MF_ROB_V, MF_ROB_U, or MF_ROB_VU. Points marked with MF_ROB_VU are the most robust and the points marked with MF_ROB_V are the most non-robust, since at the points marked with MF_ROB_V may result from an accidental spike.

The Bursts are a special type of the vocal segment and require a different method of detection and labeling. The burst is a sudden, short peak of acoustic energy which occurs in the production of certain sounds, as defined in D. Crystal "A Dictionary of Linguistics and Phonetics". Using the acoustic properties of a burst, an unvoiced or voiced closure must be detected immediately preceding a burst. On the border between a burst and an event preceding it, the energy envelope of the input signal waveform should include a drastic rise of energy followed by a gradual decrease.

The algorithm for burst detection described below may be applied after the segments are classified as T_NOISE, T_VOICE, T_BVOICE, T_PAUSE, T_LOW (for definitions, see Section 2.5 above). A burst segment could only be a segment that follows T_PAUSE or T_BVOICE, and could not be a segment that was classified as T_VOICE, because bursts are not periodic. As a result, only segments that are labeled T_LOW or T_NOISE could include bursts.

Since the characteristic time dimensions of a burst are comparable to the size of the frames used in the segmentation process, the burst detection analysis requires the use of significantly smaller time intervals. Accordingly, 3 msec intervals are used for this analysis so that in an area that is suspected to be a burst, energy in the high frequency band and the total energy are both calculated on the 3 msec frames. The total energy is defined as the median value of the square of amplitude of the input signal. Energy in the high frequency band is defined as the median of the square of the signal value in the frequency band higher than 5 kHz.

In particular, to find a burst a function is applied that, given a sequence of frames, returns the frame most likely to be the beginning of a burst and gives a probability of it being a beginning of the burst. This function is calculated as follows. For each two frames, i and i+1, in the target interval, a function f(i,j) is calculated, where j changes its value from 0 to 127 according to Fourier amplitude coefficients. If the value of j-th Fourier amplitude coefficient in the (i+1)th frame is greater than the value of j-th Fourier amplitude coefficient in the i-th frame then f(i,j)=1, otherwise f(i,j)=0. The weighting function W is the sum of squares of lengths of maximal intervals with f(i,j)=1. If W>9000, the frame contains a burst (the answer is "Yes"), if W<1000 the frame contains no burst (the answer is "Yes"), otherwise the answer is "Don't know"). In order not to classify an artifact as a burst a second fundamental property of bursts is sought—the decreasing slope of the energy envelopes (high frequency total) discussed above. The envelopes of both energies are analyzed since some of bursts have a decreasing slope in the total energy envelope and others in the high frequency energy envelope, but not in both.

Using the same normalization procedure as for detection of flaps (see Section 2.5 above), one of three possible answers ("Yes", "No" and "Don't Know") is returned. If the answer is "No", it is concluded that no burst is present. If for both energy envelopes the answer is "Don't Know", the type of the segment remains unchanged but a flag BAD_BURST is attached. If the answer is "Yes" for at least one of the envelopes, the segment is classified as T_BURST.

3. FORMANT ANALYSIS

Figure 5:
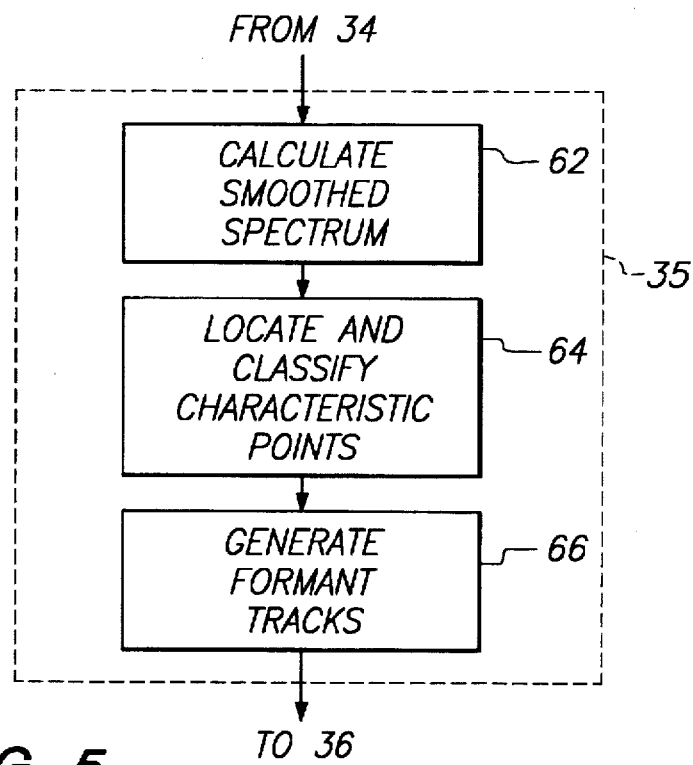
FIG. 5 is an illustrative flow diagram of the formant analysis method steps of the speech recognition system of the present invention.

Referring to FIGS. 3 and 5, formant analysis step 35 is described. In a spectrogram (a visual representation of a speech signal spectrum in a plane (i,j), where j is the number of a frame and i is the number of the frequency in the spectrum, formants appear as horizontal and sloping stripes. These stripes contain substantial information about the speech signal, which is extracted by fitting a line along each formant, generally near the center of it, to generate "formant tracks". FIG. 5A illustrates, for example, the use of formant tracks to distinguish between the words "basket" and "gasket".

Formant tracks contain information about the frequency of each formant within a frame. While in the center of the formant the spectrum amplitude generally reaches a local maximum (along the frame), formant tracks typically cannot be reliably constructed based on such maxima due to noise in the spectrum and the occurrence of many false local maxima. Moreover, adjacent formants sometimes come so close to one another that they practically merge.

In this situation, while a formant may be visually distinguishable in a spectrogram, the necessary local maximum may be absent, and characteristic points must be obtained by alternative methods. In addition, it is important to accurately determine which formant a given formant track belongs to during the initial formant extraction process, because at later stages of the recognition process, this information may no longer be available.

3.1 Calculate Smoothed Spectrum

Referring still to FIG. 5, the initial step in the formant track extraction process is to calculate a smoothed spectrum, step 62. Use of a smoothed spectrum allows more accurate extraction of local maxima and other characteristic points. Accordingly, calculation of the spectrum for the speech signal involves several smoothing stages.

Before the spectrum for the speech signal is calculated, the signal in each frame is multiplied by the well known "Hamming Window", i.e., w[n]=0.54−0.46*cos(x), where x adopts values from −π to +π. The Hamming window and its use is described, for example, at pp. 447–450 and 723–726 of Oppenheim and Schafer, Discrete-Time Signal Processing, Prentice Hall, 1989, which is incorporated herein by reference. Since the spectrum is calculated by means of FFT algorithm, using a signal whose length is a power of 2 (as a rule, 256 or 512) the lacking part of the signal is completed by zeroes.

Once the spectrum has been calculated, a vertical smoothing step is applied in each frame involving convolution of the spectrum amplitude with a filter. This convolution step employs a (1,2,1) filter, and is calculated as:

$$B(i,j)=1*A(i-1,j)+2*A(i,j)+1*A(i+1,j),$$

where A(i,j) is the amplitude of the i-th Fourier coefficient at the j-th frame.

A final stage of smoothing involves horizontal smoothing, wherein spectrum data from several neighboring frames is used. Horizontal smoothing is performed over 5 adjacent frames using a linear combination of linear and parabolic smoothing functions, with smoothing done separately for segments of different type. During the linear smoothing, the value of the function at the point of interest is computed as the arithmetic mean (for central portions of the signal) by:

$$C(i,j)=(B(i,j-2)+B(i,j-1)+B(i,j)+B(i,j+1)+B(i,j+2))/5.$$

At the boundary of a segment, to avoid using data from segments of another type while maintaining the length of the smoothing interval, the above formula is appropriately modified. The first two frames of the segment are computed as:

$$C(i,0)=(3*B(i,0)+2*B(i,1)+B(i,2)-B(i,4))/5$$

$$C(i,1)=(4*B(i,0)+3*B(i,1)+2*B(i,2)+B(i,3))/10.$$

While the last two frames of the segment are computed as:

$$C(i,n-2)=(4*B(i,n-1)+3*B(i,n-2)+2*B(i,n-3)+B(i,n-4))/10.$$

$$C(i,n-1)=(3*B(i,n-1)+2*B(i,n-2)+B(i,n-3)-B(i,n-5))/5.$$

where n is the number of the frames in the segment.

During the parabolic smoothing, a parabola is used which approximates the values of the C(i,*) function at points j−2, j−1, j, j+1 and j+2. Accordingly, the following formulae are used:

$$C(i,j)=(-3*B(i,j-2)+12*B(i,j-1)+17*B(i,j)+12*B(i,j+1)-3*B(i,j+2))/35;$$

$$C(i,0)=(31*B(i,0)+9*B(i,1)-3*B(i,2)-5*B(i,3)+3*B(i,4))/35;$$

$$C(i,1)=(9*B(i,0)+13*B(i,1)+12*B(i,2)+6*B(i,3)-5*B(i,4))/35.$$

$$C(i,n-2)=(9*B(i,n-1)+13*B(i,n-2)+12*B(i,n-3)+6*B(i,n-4)-5*B(i,n-5))/35.$$

$$C(i,n-1)=(31*B(i,n-1)+9*B(i,n-2)-3*B(i,n-3)-5*B(i,n-4)+3*B(i,n-5))/35.$$

3.2 Locate And Classify Characteristic Points

Once the speech signal has been smoothed, the characteristic points, for example, local maxima, are located for each frame at step 64. These characteristic points are used to construct the formant tracks, as seen, for example in FIG. 5A. Sufficient characteristic points are identified to construct accurate tracks, without generating spurious tracks. During this selection process, an approximate evaluation is also undertaken to assign each point to a certain formant. This evaluation is used to guide formant track construction where the track projectory is unclear, in assigning a constructed track to a particular formant, and when evaluating the reliability of the constructed track.

The first stage of extracting the characteristic points involves searching for extrema in the smoothed spectrum amplitude within a frame. Both local maxima and minima are located. The maxima are candidate characteristic points, while the minima play an auxiliary role in this determination. For each extremum, its coordinate i, corresponding to a certain frequency, as well as the amplitude value, are stored. The values of local maxima are limited by a threshold which is determined both by spectrum amplitude in the given frame and by evaluation of signal energy in the whole words being recognized. A local minima is determined as a minimum between two local maxima, such that there is one and only one minimum in the interval between two maxima. The resulting array contains information about minima, for example, in even elements (0,2,4 ... ) and information about maxima in, for example, odd elements (1,3,5 ... ). In accordance with this arrangement, the characteristic search process ends with information about the last minimum, so that the array of characteristic points always contains an odd number of elements.

The next stage involves filtering out "bad" maxima, that is, deletion of some maxima from the array in accordance with certain criteria described hereinbelow. The filtering process is accomplished beginning from the end of the array (i.e., beginning from the higher frequencies) using the values of amplitudes and the coordinates of neighboring minima and maxima, the common maximum of spectrum amplitude in the given frame, and the current calculated amplitude maximum in the frequency range higher than the frequency of the given maximum under examination.

A maximum is deleted if:

1) the frequency is too low (below a 215 Hz threshold);

2) the amplitude is below ⅒ of the maximum amplitude of higher frequencies;

3) the amplitude is below ⅕ of the amplitude of neighboring higher maximum;

4) the amplitude is below 1.5 of the amplitude of neighboring higher maximum, and below ⅕ of the common maximum of the frame amplitude; or 5) the maximum is not the very first maximum (i.e. not the lowest frequency maximum), has an amplitude below 1.5 of the amplitude of the neighboring lower minimum, and below ⅒ of the common maximum of the frame amplitude, and is either located farther than 645 Hz from the neighboring lower maximum or below ⅕ of the amplitude of the neighboring lower maximum. When a maximum is rejected in accordance with the above criteria, it is deleted, and the lower one of the two adjacent minima is assigned the role of the intermediate minimum between the two remaining maxima.

Next, a new array is generated from a limited number of maxima selected from the array, corresponding to the first four formants F1, F2, F3, F4, and the nasal formant FN, if it is present. Space is left in this new array for intermediate characteristic points FNA, F1A, F2A, F3A, where A designates "alternative". Alternative points are the "second best" maxima that could not be discarded since there is a possibility of them being included into the formant tracks later on. In addition "shadow" points occur where two formants come so close to one another that the characteristic point of one of them (usually, the higher one) appears in the "shadow" of the neighboring maximum and cannot be identified as a local maximum. Such shadow points are also considered as alternative points. Once filled, the array contains 9 elements in ascending order: FN, FNA, F1, F1A, F2, F2A, F3, F3A, F4, some of which may be absent.

The process of selecting the elements of the formant track array is accomplished in 4 passes corresponding to the formants F1, F2, F3, F4. At the beginning of each pass the first (by order) maximum is selected, starting from the beginning of the array of maxima when the first formant F1 point is being searched for, or otherwise starting from the maximum that follows the maximum selected for a previous formant. The next maximum is then compared to the currently selected maximum; if the next maximum is considered "better" in accordance with the criteria described below, it becomes the new currently selected maximum, otherwise comparison continues with succeeding maxima. The criteria are as follows:

1) if the search is for an F1 point, and the frequency is over a 1550 Hz threshold, the search is stopped, i.e. the previously selected maximum is used as an F1 point;

2) if the search is for an F1 point, and the frequency is over a 1120 Hz threshold, and a maximum has already been selected, and the nasal formant FN is already defined, the search is stopped, i.e. the previously selected maximum is used as an F1 point;

3) if the search if for an F1 point, and the frequency is over a 947 Hz threshold, and either (a) the amplitude of the new (considered) maximum is less than amplitude of the previously selected one, or (b) the frequency of the previously selected one is over a 516 Hz threshold, and amplitude of the new one is more than 200% of amplitude of the minimum between them, then the new maximum is deemed to belong to the second formant F2 (and will be, accordingly, considered during the next pass) and the search is stopped, i.e. the previously selected maximum is used as an F1 point;

4) if the search is for an F1 point, and the frequency of the previously selected maximum is below a 344 Hz threshold, the previously selected maximum is hypothesized to belong to the nasal formant FN. If the frequency of the new maximum is below a 602 Hz threshold, and its amplitude is less than ⅓ of the amplitude of the previously selected maximum the hypothesis is not confirmed (and the new maximum is deemed false). Otherwise, the prior maximum is assigned to FN and the new maximum is taken as F1;

5) if the search is for an F2 point, the frequency of the new maximum is below a 1723 Hz threshold, and amplitude of the new maximum is larger than the amplitude of the first formant point F1 and larger that 1.5 of amplitude of the previously selected maximum, then the prior maximum is considered an alternative F1A, and the new maximum is taken. This situation of "interformant amplifications" (i.e., when the number of formants is larger than usual) rarely occurs, yet the second formant can be identified without difficulty;

6) if the excess of the new maximum over the preceding minimum is less than quadruple the analogous excess of the previously selected maximum (i.e., the excess of the prior maximum over the minimum preceding that maximum), then the new maximum is rejected as false and the prior maximum is retained;

7) if the frequency of the previously selected maximum is not below a 2800 Hz threshold, while the frequency of the new maximum is over a 3230 Hz threshold, and the excess of the new maximum over the preceding minimum is less than tenfold the analogous excess of the previously selected maximum, then the new maximum is rejected as false, and the prior maximum is retained.

If, at a given moment, a new maximum is selected instead of the previously selected one, the former maximum is classified as an alternative point of the lower formant. For example, if during the search for the third formant F3, a new maximum is selected, the previously selected maximum is classified as F2A. An exception is made during the search for the F1 points, if there is a nasal formant FN.

It occasionally happens that the third formant F3 is very weak (sometimes, hardly visible in a spectrogram), while the fourth formant F4 is very strong. In this instance, when searching for F3, the necessary maximum may be skipped by the algorithms described above, and a maximum may be selected that belongs to F4. Therefore, when searching for F3, if frequency of the selected maximum is over a 3230 Hz threshold, and there has been a maximum skipped (but there has been no maximum previously selected), or if the amplitude of the skipped maximum is larger than that of the previously selected one, the skipped maximum is assigned to the third formant F3, and the new selected maximum is assigned to the next, fourth formant F4.

There is no special pass to search for a nasal formant, rather, the corresponding maximum is found when searching for the first formant. In the presence of a nasal formant and interformant amplifications in the area of the first formant, the latter may be sometimes weakly expressed (hardly exceeding an intense background). In this case the first formant cannot be extracted by the above-described criteria, and the interformant amplification is taken instead. Thus, when searching for the first formant F1, if (a) the frequency of the selected maximum is below a 690 Hz threshold, and (b) the frequency of the following maximum is below a 948 Hz threshold while its amplitude exceeds the amplitude of the previous maxima, but is less than amplitude of the next maximum, and (c) one of FN and FNA is not yet determined, then the found maximum is assigned to the nasal formant FN or, if it has been assigned, to its alternative FNA. The search for the first formant F1 is then repeated.

Once maxima have been assigned to the formants FN, F1–F4, the characteristic points for each frame are again searched for "shadows" of the first three formants F1, F2, F3, that is the characteristic points which are not, generally speaking, local maxima. In this search, the distance to the next formant is considered to ensure that it is no less than 516 Hz; a distance is determined in whose limits the search is performed; and a threshold of ⅙ of the formant amplitude is established. If, shortly after the maximum, the amplitude drops below the threshold, the search is not performed. Otherwise, the search is performed using the following criteria:

(1) Proceeding from the maximum towards higher frequencies, calculate the difference of amplitude in the previous and current points:

dA=A(last)−A(current) and the second difference by three points:

d2A=2*A(current)−A(next)−A(last).

Figure 5B:
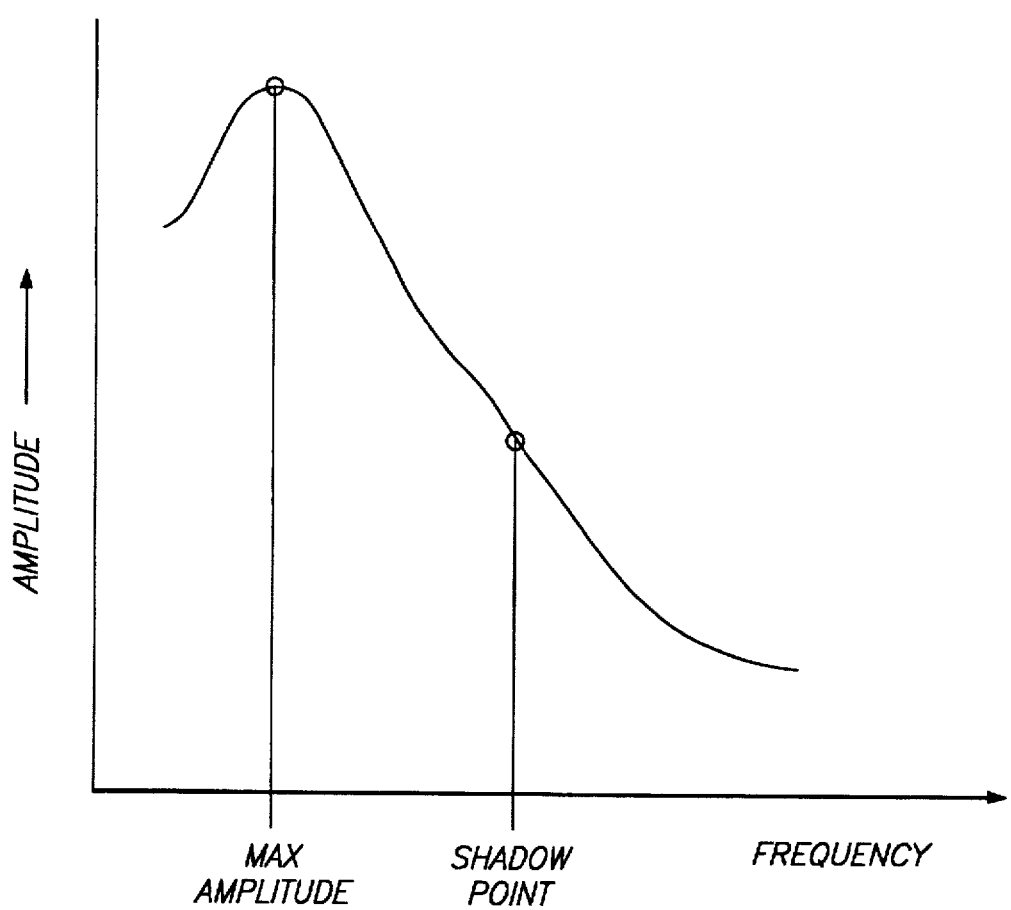
FIG. 5B is a spectrogram at a point in time showing the behavior of the spectrum of two formants F1 and F2.

Generally, the first difference dA is positive, if there is no local maximum at the point, because the amplitude decreases when moving away from the maximum. Referring to FIG. 5B, the second difference d2A behaves by first being positive (moving from lower to higher frequencies), i.e., the function curve is convex, then becoming negative, and then, provided there is a characteristic point, again becoming positive, while the amplitude remains over the threshold.

Thus, for each point for which the amplitude has not yet dropped below the threshold it is noted whether or not the second difference d2A becomes negative. Only after that determination has been made the proper search begins. A linear combination of the first and second differences f=2*d2A−dA is calculated, and if it exceeds a threshold of 0.1, the point is considered as a candidate. Among such points, if any, the point with the largest value of f is selected as a characteristic "shadow" point and assigned to alternative point F1A, F2A, or F3A respectively.

(2) An alternative method, which is a modification of method (1) above, is applied in two cases; when searching for the "shadow" point of the first formant F1, if its frequency is in a range between 430 Hz and 645 Hz (which corresponds to the difficult case of the phoneme /ao/); and when searching for the "shadow" point of the second formant F2, if its frequency is in a range between 1076 Hz and 1851 Hz (which corresponds to the difficult case of phoneme /r/). While applying method (2), the first point with a positive second difference d2A is sought after d2A has become negative at least twice. If no such point is found, the point with the largest second difference d2A is sought. Points are considered both with a positive and slightly negative, close to zero, difference d2A.

A search is then conducted for formant "shadows" in the direction of lower frequencies. This stage is performed only for the second formant F2, because, during sharp rise or drop of the second formant, its characteristic points occasionally cease to be local maxima of the amplitude. The method and criteria applied in this search are analogous to method (2) described above.

3.3 Generation Of Formant Tracks

Once the array of characteristic points have been selected for each frame of the input speech signal, tracks are constructed to fit these points at step 66. For each frame, there are up to nine points (FN, FNA, F1, F1A, F2, F2A, F3, F3A, F4), five of which are "principal" and the remainder of which are alternative points. For each of these nine points, the following information is stored in a data structure: the coordinates of the point, its "type" (number from 0 to 8 determining its position among the nine), the value of the smoothed amplitude in the spectrum, and the value of phase (in degrees from 0 to 360).

Two indices, nLast and nNext, are also generated to assign each point to a list of points associated with each track, and also a variable (track_number) that indicates to which track a point is assigned. In the beginning of the track generation process, there are, of course, no tracks, and the values of these last three variables are zero.

For each track, information is stored containing references to the initial and final element of the track. In addition, during the track generation process, the "type" of the track is evaluated as a median of types of elements belonging to the track. The tracks are generated in several stages, each time by examining the characteristic points over several frames in the speech signal from left to right. During this evaluation process, four types of connections between adjacent frames are possible:

1. Point and point. A separate point is not a track; when two or more points are connected together, the result of the connection is a track.

2. Track and point. The last point of a track is connected with a separate point.

3. Point and track. A separate point is connected with the first point of a track.

4. Track and track. The last point of a track is connected with the first point of a succeeding track. The tracks then merge and the total number of tracks decreases by 1.

The principal difficulty associated with generating formant tracks lies in "drawing" a track along a formant without "jumping" to a neighboring formant. Each pair of points presents a decision whether or not the two points should be connected, given the mutual position of the points and their types as assigned by the foregoing criteria. This task is facilitated once some tracks have been constructed, because evaluating the type of a track is more reliable than that of a separate point, and trend information appears about the track's behavior (for example, that it rises), which cannot be obtained by examining separate points alone.

Accordingly, during a first stage of the track generation process, principal (non-alternative) points of the same type belonging to adjacent frames and "proximate" in frequency, that is, whose frequency either coincides or differs not more than by one pixel. For an the input sampling frequency of 22050 Hz, and using a 512 element FFT, one pixel resolves to approximately 43 Hz. Since during this first pass the process proceeds from left to right, only two types of connections are possible: "point and point" and "track and point". Generally, after the first pass, the majority of points will be assigned to the various tracks.

During a second pass, principal points belonging to adjacent frames are again connected, but this time, "vertical jumps" are allowed within certain limits, described below. However, this procedure is not applied to the initial and final frames of an input speech segment, since the reliability of characteristic point extraction in these frames is generally lower. The permissible dimensions of a jump may vary according to the segment type and formant number. In one preferred embodiment of the method of the present invention, a vocal segment is permitted to include a jump of up to 8 pixels (344 Hz), while the nasal formant FN and first formant F1 are permitted to includes a jump of no more than 2 pixels (86 Hz). For vocal-closure type segments, where the formants do not have steep slopes, a jump of no more than 3 pixels (129 Hz) is allowed.

The height of an allowed jump may also be modified, for example, by being raised in subsequent passes. In some cases the height of an allowed jump may be increased according to the formant number, the frequency value and the behavior of a track (i.e., the presence of a jump at its end, total number of rises and drops on the track, etc.). In addition, the spectrum amplitude is examined to ensure that it remains high enough everywhere on the path between the points to be connected.

Third and fourth passes of the formant track generation process are similar to the first and second passes except for the fact that the alternative points (of FNA, F1A, F2A and F3A types) are also used.

Finally, during a fifth pass, track pairs are connected within which a "horizontal jump" over several frames occurs, so long as the jump does not extend over more than 15 frames horizontally, and results in a vertical jump of no more than over 4 pixels (172 Hz) vertically. To decide whether or not to connect two tracks the following three methods are used:

1. Connection by phase. If the phases of the final elements of the tracks being considered are close to each other (i.e., they do not differ by more than 60 degrees), linear interpolation of phase is performed horizontally. Then, starting from the right element of the first track, a choice is made between the three neighboring elements of the following track. For each of these elements, an estimate is calculated: f=A*cos(dFi), where A is the amplitude and dFi is difference between the phase of the element and the calculated interpolated phase. The element with the best estimate (with maximum value) is chosen. If, as a result of this process, the projection "hits" (to within one pixel) the beginning of a following track, the connection is considered successful.

2. Connection by maxima. This method is similar to the one used to connect points in adjacent frames, but does not consider the phase of the adjacent tracks.

3. Direct connection. This method attempts to connect the ends of tracks with a straight line segment, but not over more than five frames. This method ensures that the amplitude in each point does not fall below a threshold (computed as 0.8 times the minimum of the amplitudes of the end points of the tracks).

If any of the above three methods provides a positive result, the corresponding connection of tracks is accomplished. During this process, additional elements representing these connections are added to the list of points defining each formant track, with each connection being characterized by the same information that is provided for regular elements (coordinates [frame #, frequency], amplitude, phase), except for the type, which is considered undefined.

At the conclusion of step 66, every formant track is represented in two forms: as a list of points (coordinates and amplitude) and as an interpolation polyline drawn along the track. In addition, for each track, a median of its elements' frequencies, a determination of the formant number to which the track is assigned, and evaluation of the track's reliability, are obtained.

The formant number is evaluated as the median of the "type" of elements from which the track is formed. Thus, the formant track can be either of a principal type (FN, F1, F2, F3, F4) corresponding to the nasal formant or the first four formants, or an alternative type (FNA, F1A, F2A, F3A). In the first five cases the formant number is assigned to the track, while in the last four cases the number remains undefined. As will of course be apparent, this procedure could be made more rigid by determining the formant number only for those tracks where the elements of a given type constitute the majority.

The evaluation of track reliability (a "yes/no" evaluation) is computed in a similar manner, but with more stringent conditions. In particular, a track is considered "reliable" if it contains ten or more points, occupies almost the entire length of the vocal segment (it may be one or two points shorter), and if all its points (except, possibly, one or two) belong to the same type.

4.0 PHONEMIC BOUNDARIES GENERATED BY ANALYSIS OF FORMANTS BEHAVIOR

Figure 5C:
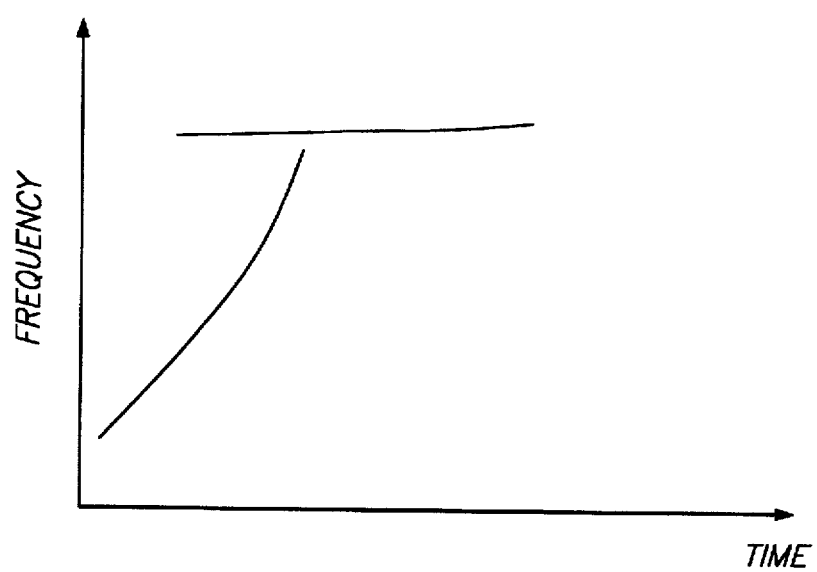
FIG. 5C illustrates the behavior of the second formant for the word "we"

Referring to FIGS. 3 and 5C, step 36 of generating phonemic boundaries for vowel-glide and glide-vowel transition segmentation points (boundaries between phonemes) using analysis of formants behavior is described. To find boundaries for the phonemes—/r (er)/, /w/, /y/, and /l/ adjacent to a vowel certain characteristic behavior of formants tracks on glides and their behavior during transition to some neigboring phoneme is sought, such as in case of the pair (/w/, /iy/) discussed below.

To detect the boundary of phoneme /r (er)/ four thresholds $P_{max}$=2153 Hz, $P_{right}$=1894 Hz, $P_{left}$=1808 Hz, and $P_{min}$=1722 Hz are introduced, assuming a Fourier window a 512 samples and a sampling frequency of 22,050 Hz. If the third formant F3 goes below $P_{min}$ the phoneme /r/ is present. If from any side F3 goes above $P_{max}$ than the phoneme cannot be the phoneme /r/ but is something else. A segmentation point is set where F3 crosses the level of $P_{left}$ from the left or/and crosses the level of $P_{right}$ from the right. The point(s) is marked as robust, meaning that this boundary will be present in all fine splits described hereinafter. If from left side F3 is above $P_{left}$ or from the right side is above $P_{right}$ but is below $P_{max}$, the segmentation point is marked as nonrobust since it is not clear whether it is still a retroflex sound or something else. If the length of vocal segment is relatively small (less than 25 frames) the thresholds relaxed are selected as $P_{min}$=1937 Hz, $P_{left}$=1894 Hz, $P_{right}$=1937 Hz, to account for the fact that there is not enough time for F3 to go sufficiently low.

To detect boundaries for phoneme /w/ several special cases of formants behavior are considered, including cases where the wrong formant has been recovered. One such case is the boundary between /w/ and /iy/. In /w/ segment the second formant F2 is very low (usually, below 1000 Hz), while in /iy/ segment F2 is very high (usually, above 2000 Hz). The set of maxima has the shape as illustrated in FIG. 5C. In this case, F2 is sometimes extracted as the upper horizontal line, and, separately, there is a track going almost vertically. Moreover, horizontal track does not start from the beginning of phoneme /w/. In this case the point corresponding to the top of the vertical line is marked as a robust segmentation point.

In some cases, because of the drastic changes within a phoneme /w/, F2 is not extracted completely. Thus, if F2 does not start at the beginning of the vocal segment but its frequency at the very left end is relatively small (less than 861 Hz), a nonrobust segmentation point is marked at the fourth frame after the beginning of the vocal segment.

Another feature of the phoneme /w/ is a break off of F3 from left. Thus if F3 is extracted but does not start until the fourth frame from the beginning of /w/ and moreover F1 and F2 have sufficiently low values that are close to each other, we declare the fourth frame after the beginning of F3 is marked as a robust segmentation point.

For the phoneme /y/ the following characteristic features are detected. On the left side of /y/ F1 is very low while F2 is extremely high. During left to right movement F2 descreases significantly while F1 increases significantly. If those conditions are fulfilled the end of the increasing part of F1 is marked as a nonrobust segmentation point.

To find the boundary between phoneme /l/ and preceeding vowel two cases of formants behavior at the beginning of /l/ are considered. In the first case F1 has a steep maximum (~100 Hz increase during 5 consecutive frames) while F2 has a quite low value, which is typical for some realizations of the pair (/uw/, /l/). In the second case, typical for the pairs (/ao/, /l/) and (/uw/, /l/), F1 has a nonsteep maximum close to the maximum of F2. If at the same time higher formants break off, or the picture for higher formants is unclear, maximum F1 is marked as a nonrobust segmentation point.

5.0 FRAME RECOGNIZER

Referring still to FIG. 3, classification of the frames of the input signal into likely phonemes is described. At this stage of the speech recognition process, the Fourier spectrum, defined on either pitch synchronous or fixed frames, is calculated for each utterance in the input signal. The frame recognizer employs a knowledge base or "oracle" which is trained on the TIMIT database (DARPA, TIMIT Acoustic-Phonetic Continuous Speech Corpus, National Institute of Standards, 1990), as described below. The frame recognition step, step 37, then involves comparison of the calculated spectral features for the input signal to those contained in the oracle.

5.1 Creation of the Oracle

The TIMIT database, publicly available through the National Institute of Standards, Washington, D.C., contains 6,300 sentences uttered by 630 speakers and containing more than 200,000 phonemes of training data. Each utterance in the corpus has been hand labeled on the sentence, word and phoneme levels.

The oracle for the frame recognizer is created by labelling each frame in the TIMIT database with the phoneme label of the phoneme of which it is a part. A set of 14 features—the first fourteen melcepstral coefficients—is calculated for each frame in the training partition of the corpus. A 50-bin histogram of feature values is constructed for each feature and each phoneme label. Each histogram is then smoothed, to compensate for any insufficienties in the coverage of data in the TIMIT database and is normalized to the (0,1) interval. This process results in a three-dimensional cube with a the first dimension corresponding to the 62 phoneme labels, a second dimension corresponding to the 14 melcepstral features, and a third dimension corresponding to the 50 bins of the histogram.

5.2 Recognition Stage

Application of the frame recognizer consists of assigning a set of phoneme labels, together with their calculated likelihood weights, to every frame in the utterance of the input signal. For each frame to be recognized, the fourteen melcepstral coefficients are calculated. For each feature and for each phoneme label the corresponding value in the histogram is selected. If a feature value is computed as being beyond the scope of the corresponding histogram the result is set to 0. The likelihood weight of a phoneme label is defined as a sum of the histogram bin values for each of the 14 features. The phonemes are sorted in accordance with those values in a decreasing order.

Applicants' approach is different from that usually employed in the recognition mechanisms as typefied, for example, by the above-mentioned Zue et al. article, in which the recognition process involves analyzing an n-dimensional space, where n is the number of melcepstral features. Rather, applicants' system employs a three-dimensional space wherein all melcepstral features correspond to a single dimension. Moreover, unlike the above-mentioned reference, applicants' approach does not assume a Gaussian distribution of the features, since many of the histograms are significantly non-Gaussian.

6.0 FRAME BY FRAME ANALYSIS

Based on the results of the frame recognizer, a frame by frame analysis is performed on the vocal segments of the rough split to generate additional segmentation points for use during the fine split step. In preceding portions of the process, the more "obvious" phoneme boundaries within vocal segments were detected such as the boundaries for the vowel/guide transitions based on formant tracks behavior. The frame by frame analysis finds more subtle boundaries such as the boundary between /r/ and /ao/ in word "rod".

The frame by frame analysis step uses a knowledge base comprising a set of the TIMIT acoustic phonemes. Each frame of the current segment of the input signal is assigned a set of probabilities $P_1$-$P_N$ (N is the total number of the phonemes, sum of all $P_i$ is equal to 1 and $0 \leq P_i \leq 1$ for all I), where $P_i$ corresponds to an estimate of the current frame being part of a given phoneme i.

In the frame by frame analysis, two consecutive windows 50 msec long are considered and for each window an M-dimensional vector of weights is constructed, where, for the current step, M is the number of different classes of phonemes that could be found on a vocal segment. The weight for each to a phoneme class is calculated as a sum of probabilities of the frames of the window being part of each of the phonemes of that class, normalized by the number of frames in the window. This process creates two vectors, one for each of the left and right windows:

$$W^L = \{W_1^L, \ldots, W_M^L\}$$

$$W^R = \{W_1^R, \ldots, W_M^R\}.$$

where $0 \leq w_i^L \leq 1$, $0 \leq w_i^R \leq 1$ are the weights for each of the classes.

Basing upon a statistical analysis of difficult cases for a phonetic segmentizer, a set S of pairs of phoneme classes are defined, which contains pairs like (retroflex_consonant, vowel) or (vowel, glide). For every two consecutive intervals L and R where $w_i^L \geq 0.7$ and $w_j^R \geq 0.7$, if pair (i,j)

belongs to the set S, the point on the boundary between the two intervals is added to the set of segmentation points for the fine split.

7.0 FINE SPLIT

Figure 6:
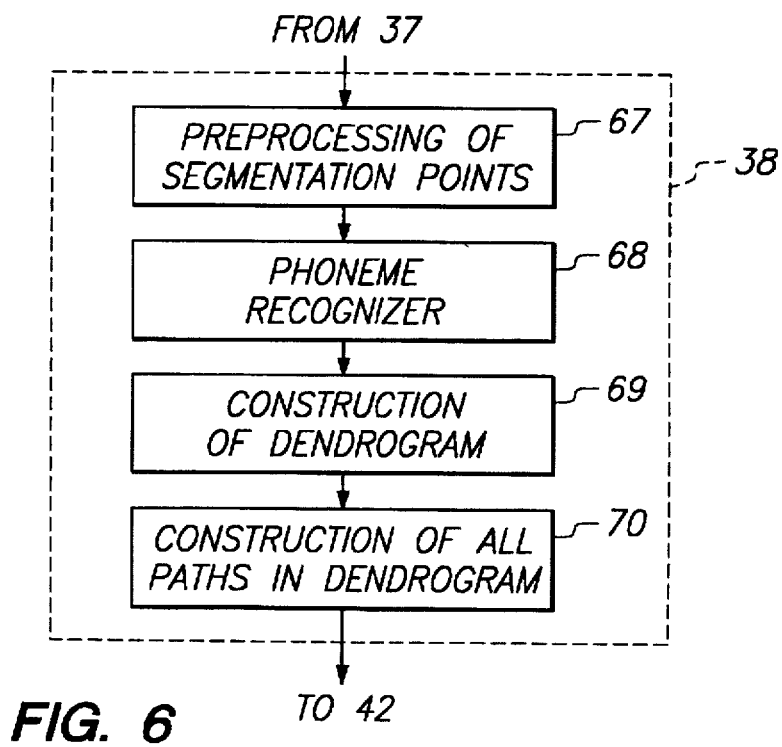
FIG. 6 is an illustrative flow diagram of the fine split method steps of the speech recognition system of the present invention.

Referring now to FIGS. 3 and 6, the fine split, step 38, of the segmented input speech signal is performed. The "fine split" step involves examining the segmentation points constructed during the "rough split" step, the segmentation points constructed during the formants behavior analysis and the points created during the frame by frame analysis to make fine phonetic distinctions. The fine split analysis employs the use of dendrograms for merging those frames having similar acoustic features as described, for example, at page 181 of the above-mentioned V. Zue et al. article, "The MIT SUMMIT SPEECH RECOGNITION SYSTEM: A PROGRESS REPORT", which is incorporated herein by reference.

As a result of the fine split, one or more hypotheses of the phoneme boundaries (indicated by the frame numbers) are assigned to the series of acoustic events that comprise the phonemes of the input signal, with certain unique phonemes identified by their spectral characteristics. While some utterances may have only one hypothesis generated, others may have multiple hypotheses that take into account various phonologically permissible variants of the words. The types assigned during the fine split step determine what type of recognition mechanism is applied to the segment and reduces the number of possible hypotheses. Therefore, step 38 also begins the process of phoneme recognition by locating and positively identifying phonemic segments that have unique and well-defined characteristics.

7.1 Preprocessing of the Segmentation Points

The set S of segmentation points includes the points determined from three sources: the rough split step, the formants analysis step and the frame by frame analysis step. Every point of set S is classified as robust or not using the following criterion: if it is a point taken from the rough split, and does not separate two vocal segments, it is considered robust. Otherwise, it is robust only if two other sources have given the same point. For each robust point P all non-robust points, which are within distance d (d=20 milliseconds) of P and from a different the source than P, are deleted from the set S. Also, in the set S each cluster of nonrobust points of length d=16 msec or less is found and replaced with a single point located at the cluster's center of gravity.

7.2 Phoneme Recognizer

The phoneme recognizer is used during the segmentation process (see Section 7.3 below), and for creation of the phoneme garland after the fine split step. It takes as an input a segment of the utterance, considers it as a single phoneme and assigns a set of phoneme labels together with their likelihood weights.

7.2.A Creation of the Oracle

The oracle for the phoneme recognition is built similarly to the oracle for the frame recognizer, but employs a different set of 141 features (described hereinbelow) for which corresponding feature values are computed for the utterance in the input signal. This oracle, like that for frame recognizer consists of a 3-dimensional cube where the first dimension is the 62 phoneme labels, a second dimension is the 141 feature set, and the third dimension corresponds to the bins of the histogram.

For each phoneme in the input signal, a set of 141 features is calculated, to account for the dynamic as well as static features of the phoneme, including: 14 delta melcepstrum coefficients of the first frame in the phoneme; 14 melcepstrum coefficients for the first third of the phoneme averaged over its frames; 14 melcepstrum coefficients of the second third of the phoneme averaged over its frames; 14 melcepstrum coefficients of the last third of the phoneme averaged over its frames; 14 delta melcepstrum coefficients of the last frame of the phoneme; phoneme duration; 3 types of zero crossings; 14 averaged melcepstrum coefficients over the whole phoneme; 14 averaged delta melcepstrum coefficients over the whole phoneme; 14 averaged delta delta melcepstrum coefficients over the whole phoneme; 2 averaged distances between frames in the phoneme: cepstrum and spectrum distances; average delta energy; average delta delta energy; and 17 distributions of the energy in the different frequency bands.

7.3 Construction of the Dendrogram

A dendrogram paradigm, as described in the above-incorporated paper by V. Zue, is employed to categorize the frames of the input signal. The utterance of the input signal is put at the base of the dendrogram and divided into segments, with each point from the set S creating a split. During the construction of the dendrogram it is desirable to merge as many neighboring segments as possible into cells, where cells contain one or more segments. Each new series of cell merges corresponds to a new level in the dendrogram.

Merging of cells is accomplished as follows:

If the point that separates two neighboring cells/segments is non-robust a series of oracles, described below, is applied. Each oracle calculates the similarities of two cells/segments and returns a "Yes", "No" or "Don't Know" answer. The oracles are applied in an ordered sequence until a "Yes/No" answer is received. If none of the oracles give a "Yes/No" answer, the cells/segments are merged and the new cell is marked as "Uncertain". If there is a "Yes" or "No" answer the cells are merged or not merged accordingly. The oracles used in this merging process are as follows:

1. Melcepstrum difference oracle. Let $\{M(1,1) \ldots M(1,5)\}, \{M(2,1) \ldots M(2,5)\}$ be defined as the medians of the first five melcepstrum coefficients of two current cells/segments. The melcepstrum difference is computed as $$D = \max_j |M(1,j) - M(2,j)|$$

The oracle has two thresholds $T_l=2$ and $Th=5$, where if $D<T_l$ the oracle returns "Yes"; if $D>T_h$ the oracle returns "No"; otherwise the oracle returns a "Don't Know" answer.

2. Amplitude ratio oracle. For each of two current cells/segments the acoustic signal is normalized with respect to the pause level. Let R be the ratio between the medians of absolute amplitude of signals of the two segments. The oracle has one threshold $T=10$, where if $R>T$, the oracle returns "No"; otherwise the oracle returns a "Don't Know" answer.

3. Sum of ratios of energies in spectrum zones oracle. The spectrum is divided into 5 zones. These zones are (in Hz): 100–1000, 750–1600, 1200–2300, 2100–3500, 3500–8000. Let S be the sum of the ratios of the medians of the energy in each of five spectrum zones. The oracle has two thresholds $T_l=1$ and $T_h=8.5$, where if $S<T_l$ oracle returns "Yes"; if $S>T_h$ oracle returns "No"; otherwise oracle returns a "Don't Know" answer.

4. Oracle of comparison of segments based on the results of the phoneme recognizer. The phomene recognizer is applied by looking at each acoustic cell as a phoneme and building a garland of the recognition results based on the calculated likelihood weights. According to the garlands, the vector of phoneme classes is built for each of the two current cells/segments as follows:

Let $p_1, \ldots, p_n$ be the sequence of phoneme hypothesis in the order of likelihood (garland) and let $C_1, \ldots, C_m$ be the phoneme classes that are described in the following Table of the Phoneme Classes:

| The Table of the Phoneme Classes | | |
|---|---|---|
| Class | Factor | Phonemes |
| 1 | 15 | b, d, g, dx, v, dh |
| 2 | 12 | p, t, k |
| 3 | 9 | jh, ch |
| 4 | 9 | t, ch |
| 5 | 12 | s, sh, z |
| 6 | 12 | f, th, hh |
| 7 | 15 | n, m, ng, em, en, eng, nx |
| 8 | 9 | dx, dh |
| 9 | 9 | l, el |
| 10 | 5 | w |
| 11 | 5 | hv |
| 12 | 14 | y, iy, ih, ix |
| 13 | 12 | eh, ey, ae |
| 14 | 15 | ae, aa, aw, ay, ah, ao |
| 15 | 14 | ao, ay, ow, uh |
| 16 | 12 | uh, uw, ux |
| 17 | 12 | r, er, axr |
| 18 | 14 | ax, ix, ax-h |
| 19 | 12 | pcl, tcl, kcl |
| 20 | 12 | bcl, dcl, gcl |
| 21 | 5 | q |

Vector $V=(v1, \ldots, vm)$ is constructed as follows: Beginning with $V$ a null vector, for each $I$, $1 < I < m$ if the phoneme hypothesis $p_i$ is in class $C_j$ then $$v_j = v_j + n - 1$$

Let W be the scalar product of vectors $W_L$ and $W_R$ built during application of the frame recognizer. Let Y be the scalar product of W and a vector F of coordinatewise normalization factors. Let S be the sum of the coordinates of vector Y. The oracle has two thresholds $T_l = 0.2$ and $T_h = 0.34$, where if $S < T_l$ the oracle returns "Yes"; if $S > T_h$ oracle returns "No"; otherwise oracle returns a "Don't Know" answer.

7.4 Construction of All Paths in the Dendrogram

After construction of the dendrogram, all of the paths in it are found. A path in the dendrogram is defined as a sequence of cells (from the same or different levels in the dendrogram) that cover whole utterance without overlaps. The paths are found using an exhaustive search. The weight of a path is defined as the maximum of the heights of the cells (their level in the dendrogram) in the path divided by the number of cells in the path, where the height of the cell is the number of segments that it contains. The paths are sorted in decreasing order according to their weights. Based on the n first paths, n fine splits are generated, where for a preferred embodiment n=3. These fine splits represent the hypotheses of the phoneme boundaries in the spoken utterance.

8.0 THE SPEECH RECOGNITION DICTIONARY

Figure 7:
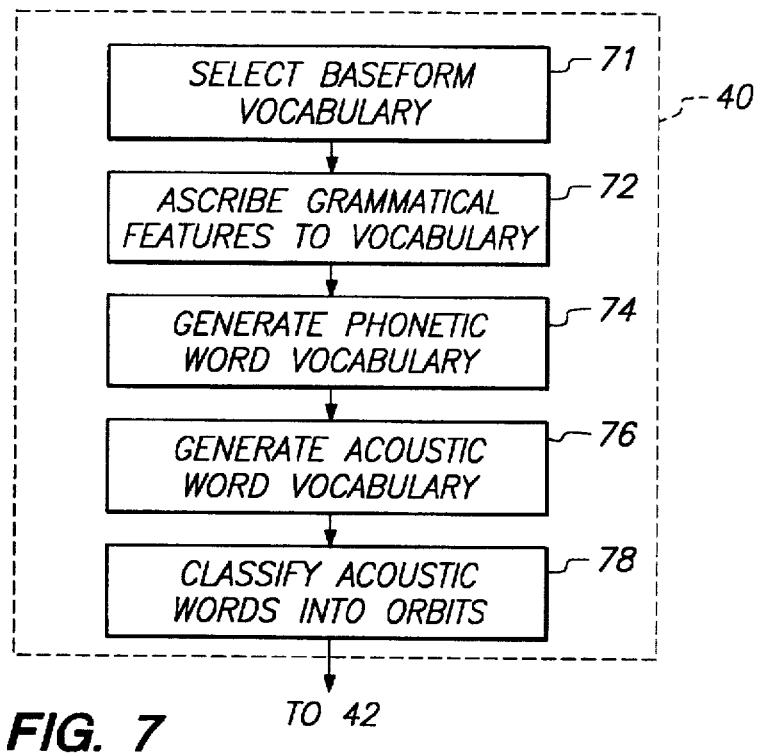
FIG. 7 is an illustrative flow diagram of the dictionary generation method steps of the speech recognition system of the present invention.

Referring now to FIGS. 3 and 7, dictionary 40 employed in the speech recognition apparatus and method of the present invention is described. The dictionary comprises a series of entries for each word that is understood by the speech recognition system, with entries corresponding to orthographic (i.e., spelled), phonetic, acoustic and semantic and syntatic information about each word.

The entries in dictionary 40 are initially generated from orthographic and phonetic baseform words, and the complete dictionary is then maintained as a static part of the overall system 10. Because knowledge of the structure of the dictionary is essential to understanding of how the lexical access step is performed, the method of generating the information associated with the dictionary entries is described below.

8.1 Select Baseform Vocabulary

Referring to FIG. 7, the initial step in dictionary generation is to select the active vocabulary of the speech recognition system, step 71. In a preferred embodiment of the speech recognition system and methods of the present invention for use with North American English, dictionary 40 contains an active vocabulary of approximately 30,000 to 60,000 words, with a total vocabulary of 100,000 words (roughly half of the words in a standard dictionary, e.g., Webster's II New Riverside University Dictionary). Words in the active vocabulary preferably are resident in memory 17 (see FIG. 1) during operation of system 10, while words in the backup dictionary preferably reside in data storage 15.

Each word in dictionary 40 includes all permissible forms of that word. For example, nouns are given in singular nominative, singular genitive, plural nominative and plural genitive; verbs are given in bare infinitive, s-form, ing-form, past tense, and past participle; adjectives and adverbs are given in absolute, inflected comparative (e.g., "-er") and inflected superlative (e.g., "-est") degrees. Words belonging to other word classes are also given in all existing forms.

Each word in the dictionary (and all of its various forms) is represented by a phonetic baseform (referred to as a "phonetic word") taken, for example, from the Longman Dictionary of American English. The phonetic baseform contains the phonetic transcription of the word in accordance with the International Phonetic Alphabet, as further modified to conform to the phonetic alphabet provided hereinabove.

8.2 Ascribe Grammatical Features To Vocabulary

At step 72 of FIG. 7, grammatical features are ascribed to each word in the dictionary. In a preferred embodiment of the present invention, every grammatical word has a six features associated with it, which are encoded by integers 0–6. Feature numbers 0 and 4–5 are universal for all words, while grammatical features encoded for features 1–3 are not universal, but instead depend upon the syntactic class of the word.

In particular, feature 0 characterizes the syntactic class of a word (noun, adjective, common verb, modal verb, copula, adverb, etc.). In a preferred embodiment of the present invention, 28 syntactic classes are accommodated in the dictionary. Features 1–3 characterize, for example, nouns as animate/inanimate, count/uncount, verbs as transitive/intransitive, etc., and give some other syntactic and semantic information.

Feature 4 characterizes the relative lexical frequency of a word, while feature 5 characterizes the relative grammatical frequency of a word. These two features associate each word with one of four frequency clusters (0,1,2,3, where 0 stands for the most rare, and 3 for the most frequent words), which are used to adjust the weight of words in a word hypothesis lattice produced by the recognizer, discussed hereinbelow.

8.3 Generate Phonetic Word Vocabulary

At step 74, each phonetic word in the phonetic baseform vocabulary is expanded into as many legally permissible phonetic variants as are generally understood by a native speaker. Phonetic assimilations, elisions, and other phonetic variations, which are considered permissible in deliberately clear speech, are automatically generated in accordance with certain phonological rules developed by applicants, described hereinbelow. These rules allow, for example, for dropping of /r/ in certain positions, flapping of /t/, /d/ and /n/, elision of /t/ between /n/ and an unstressed vowel, de-voicing of vowel-final consonants, etc.

The expanded variants of the baseform are referred to as "phonetic transcriptions," with the variants for a particular word forming a "phonetic cloud" of permissible phonetic transcriptions corresponding to each baseform phonetic word. For example, the word "abandons," which has a phonetic baseform of [ah0 b ae1 n dx ah0 n z], may be represented by the phonetic variants: [ah0 b ae1 n dx ah0 n d z], [ah0 b ae1 n dx ah0 n d s] and [ah0 b ae1 n dx ah0 n t s].

Expansion of the phonetic baseforms to create the phonetic clouds for each word occurs by the successive substitution of permissible phonetic variants for the phones existing in the phonetic baseforms. During the first phase of the expansion process, the following rules are applied, that is, the phone(s) in the right hand column are substituted for the phone(s) found in the left hand column (in the following rules, an uppercase spelling of a phone in the right hand column indicates that it may be stressed, while a lowercase spelling indicates in the variant the phone may be reduced or omitted):

| | | |
|---|---|---|
| ER0 vow | ----> | ah0 R vow |
| ER1 vow | ----> | ER1 R vow |
| ER2 vow | ----> | ER2 R vow |
| AH0 R | ----> | ah0 R |
| AH0 L | ----> | ah0 L |
| AH0 M | ----> | ah0 M |
| AH0 N | ----> | ah0 N |
| IH0 R | ----> | ih0 R |
| IH0 L | ----> | ih0 L |
| IH0 M | ----> | ih0 M |
| IH0 N | ----> | ih0 N |
| L AH0 TX | ----> | L ah0 TX |
| L IH0 TX | ----> | L ih0 TX |
| L AH0 DX | ----> | L ah0 DX |
| L IH0 DX | ----> | L ih0 DX |
| R AH0 TX | ----> | R ah0 TX |
| R IH0 TX | ----> | R ih0 TX |
| R AH0 DX | ----> | R ah0 DX |
| R IH0 DX | ----> | R ih0 DX |

For the above rules, the resulting phonetic transcriptions are added as separate permissible phonetic transcriptions of the original baseforms, with the original baseform transcriptions retained in the dictionary.

For example, referring to FIG. 7A, selected words as they might appear in a dictionary constructed in accordance with the methods of the present invention is shown. The word "accuracy" has a baseform phonetic transcription of [AE1 K Y ER0 AH0 S IY0], and after application of the rule "ER0--->ah0 R vow" has as a permissible phonetic variant the phonetic transcription [AE1 K Y ah0 R AH0 S IY0] (see FIG. 7A, third entry).

For the following rules, also applied in the first stage, the variant is retained as the baseform phonetic transcription and the original baseform phonetic word is discarded:

| | | |
|---|---|---|
| L T vow0 | ----> | L TX vow0 |
| R T vow0 | ----> | R TX vow0 |
| N T vow0 | ----> | N TX vow0 |
| vow T vow0 | ----> | vow TX vow0 |
| L D vow0 | ----> | L DX vow0 |
| R D vow0 | ----> | R DX vow0 |
| N D vow0 | ----> | N DX vow0 |
| vow D vow0 | ----> | vow DX vow0 |

An example of the application of the rule "N T vow0--->N TX vow0" is shown by the word "accented" in FIG. 7A, where the baseform phonetic transcription is [AE1 K S EH0 N TX IH0 D].

In a second stage of expanding the phonetic transcriptions (both the baseforms and those generated as a result of the first stage), the following rules are applied:

| Only at the end of a word | | |
|---|---|---|
| B | ----> | P |
| D | ----> | T |
| G | ----> | K |
| K T S | ----> | K t S |
| JH | ----> | CH |
| V | ----> | F |
| DH | ----> | TH |
| S T S | ----> | S |
| TH S | ----> | T S |
| Z | ----> | S |
| ZH | ----> | SH |
| Anywhere | | |
| F T L | ----> | F t L |
| N S | ----> | N t S |
| N Z | ----> | N d Z |
| N T S | ----> | N t S |
| N D Z | ----> | N d Z |
| N D F | ----> | N d F |
| N T L | ----> | N t L |
| N D L | ----> | N d L |
| N D R | ----> | N d R |
| S T L | ----> | S t L |
| Anywhere | | |
| M B vow0 | ----> | M b vow0 |
| N D vow0 | ----> | N d vow0 |
| N T vow0 | ----> | N t vow0 |
| NG vow0 | ----> | NG g vow0 |
| T B | ----> | t B |
| vow TH vow0 | ----> | vow DH vow0 |
| R vow 0 | ----> | vow0 R* |
| AW vow | ----> | AW w vow |
| OW vow | ----> | OW w vow |
| JH | ----> | D ZH |
| CH | ----> | T SH |
| S CH | ----> | SH CH |
| S M | ----> | S epi M* |
| S N | ----> | s epi N* |
| S L | ----> | S epi L* |
| S T P | ----> | S t P |
| SH M | ----> | SH epi M* |
| SH N | ----> | SH epi N* |
| N B | ----> | M B |
| N K | ----> | NG K |
| N M | ----> | M M |
| N D B | ----> | N d B |
| N D M | ----> | N d M |
| N D HH | ----> | N d HH |
| vow1 N P | ----> | vow1 n P |
| vow1 N T | ----> | vow1 n T |
| vow1 N K | ----> | vow1 n K |
| vow1 M P | ----> | vow1 m P |
| vow1 M K | ----> | vow1 m K |
| vow1 NG P | ----> | vow1 ng P |
| vow1 NG T | ----> | vow1 ng T |
| vow1 NG K | ----> | vow1 ng K |
| vow R AH0 vow | ----> | vow ER0 vow |
| vow R IH0 vbw | ----> | vow ER0 vow |
| vow ER0 vow | ----> | vow R AH0 vow |
| AA R vow | ----> | AA r Vow |
| AO R vow | ----> | AO r vow |
| IY R vow | ----> | IY AH0 Vow |
| IH1 R vow | ----> | IH1 AH0 vow |
| EH R vow | ----> | EH AH0 vow |
| AY R vow | ----> | AY AH0 vow |
| AW R vow | ----> | AW AH0 vow |
| UH R vow | ----> | UH AH0 vow |
| B S | ----> | P S |
| D S | ----> | T S |
| G S | ----> | K S |
| V S | ----> | F S |
| DH S | ----> | TH S |

-continued

| Anywhere | | |
|---|---|---|
| B T | -----> | P T |
| G T | -----> | K T |
| JH T | -----> | CH T |
| Z T | -----> | S T |
| V T | -----> | F T |
| DH T | -----> | TH T |

Anywhere two adjacent phones are identical

| X X | -----> | X |

Examples of application of the above rules are shown in FIG. 7A for the following sample cases: application of the rule "D--->T" appears in the second phonetic transcription entry for the word "abroad"; application of the rule "K T S--->K t S" appears in the phonetic transcription for "acts"; application of the rule "N Z--->N d Z" appears in the first phonetic transcription of the word "abandons"; application of the rules "vow ER0 vow--->vow R AH0 vow" and "X X--->X" appears in the second phonetic transcription for the word "accurate"; and application of the rule "B S--->P S" appears in the second phonetic transcription of the word "absent."

At the conclusion of step 74, each of the words in the dictionary has been expanded to form a "cloud" of one or more phonetic transcriptions corresponding to an orthographic word within the dictionary.

8.4 Generate Vocabulary Acoustic Event Transcription

The next step, step 76, in dictionary generation is to associate one or more "acoustic transcriptions" or "acoustic words" with the phonetic words obtained in step 74. This is accomplished by the successive application of certain "rough rules" that convert the phonetic transcriptions of one or more variants of a word into a series of acoustic events that can be detected in the input speech signal.

Initially, applicants sought to transcribe words in terms of broad phonetic classes based on the manner-of articulation features, which could be easily detected in the input speech signal. It was hypothesized that description of the waveform in terms of elementary acoustical events such as: Noise (for most fricative consonants); Pause (for unvoiced closures of stops); Voice (for vowels and most sonorant consonants); Gap (for vocal segments of low energy corresponding to voiced closures of stops, flaps, and some sonorant consonants); and Burst (for release of stops) would provide an easy interpretation of manner of articulation features.

However, applicants observed that in attempting to create a phonetic transcription in terms of a single series of acoustic events two major drawbacks are encountered: (a) the same manner of articulation in deliberately clear speech may be represented in different ways (e.g., a final voiced stop may be pronounced as an unvoiced stop, with an unvoiced closure and burst or even noise in release, or it may be pronounced as an voiced stop with gap and burst, and sometimes it may even be followed by a nonphonemic vocal segment); and (b) the description of the words in terms of elementary events alone is insufficient to reduce the lattice of hypothesized words to the appropriate number.

Accordingly, applicants have developed a more sophisticated system in which the "alphabet" of elementary acoustic events has been extended to include more complex acoustic features (not only related to the features of manner of articulation) that can be easily detected during preliminary acoustic parsing. In addition, rules for the generation of optional pronunciation variants were introduced into the system. These rules are based on the knowledge about possible pronunciation of a phone due to its phonemic quality and the context in which it occurs in the transcription.

The augmented "alphabet" of detectable (in specific contexts) acoustic events includes not only the primary events, described above, but in addition the following: S-noise (for /s/-noise and sometimes for /t/-release); Z-noise (for /z/ or /s/-noise); SH-noise (for /sh/, /ch/ and /jh/-phonemes in certain contexts); Nasals (for nasal consonants /n/, /m/, etc.); and Retroflex (for /r/ and retroflexed vowels). Certain groups of vowels close to each other from the point of view of their pronunciation are also included into the alphabet of Rough transcriptions.

The set of rough rules provided hereinafter is applied to the phonetic transcriptions that make up the phonetic clouds for each word in the dictionary, and permit in some cases one or more phonetic variants to be described in terms of the same acoustic transcription. Likewise, it is possible that application of the rough rules may generate more than one acoustic event transcription for a single phonetic transcription. The rough rules enable automatic transliteration from the phonetic transcriptions into rough acoustic transcriptions ("RAT") that (a) represent possible sequences of rough acoustic events and (b) are intended to cover as much as possible the optional pronunciations of a given sequence of phonemes.

The rough rules are context-dependent, with the contexts expressed as a certain function over phones, distinctive features and specification of stress. The rules are also acyclic. Each rule is allowed to apply at only one time, and that time it applies to every phonetic transcription where its context is fulfilled. As will therefore be apparent, the order in which the rough rules apply is strictly specified, even though some groups of rules can be specified to apply in parallel.

The following key is provided for understanding the acoustic transcriptions resulting from application of the rough rules set forth in the description provided below.

| Symbol | Corresponding Acoustic Feature |
|---|---|
| V | vocal segment |
| P | pause |
| N | noise |
| B | burst |
| G | gap |
| W | glide |
| M | nasal |
| D | final vocal burst |
| S | S-noise |
| C | SH-noise Z S-noise or Z-noise |
| T | S-noise or S-burst |
| t | S-noise or S-burst which may disappear |
| % | SH-noise or SH-burst |
| J | Retroflex vowel |
| R | R |
| I | I-vowel |
| IE | I or E-vowel |
| E | E-vowel |
| A | A-vowel |
| AO | A or O-vowel |
| O | O-vowel |
| OU | O or U-vowel |
| AU | AU-vowel |
| IU | UX-vowel |
| AI | AI-vowel |
| OI | OI-vowel |

Compound Elements

Any sequence XY is decomposed like X or Y or XY

43
Complex Elements

| | |
|---|---|
| GNV may be any of G | GB GD PB PN |
| GTV may be any of G | GT GD PT |
| VGN may be any of G | GP GN GB B N |
| PbP may be any of P | PBP |
| GBN may be any of G | B N |

Simple, complex and compound elements can be represented by lower and upper case letters. The upper case letters mean that the corresponding acoustic events must be present in the pronunciation of the word. The lower case letters mean that the corresponding acoustic events can be absent in pronunciation of the word. Some of the lower case letters are connected with an underscore, which means that the connected events must be both present or both absent from the pronunciation of a word.

The first group of rules is context-independent, and serves only to rename each phoneme from the current phonetic transcription to enable the use of new names in the formulation of context-dependent rules (the new name is referred to as a RAT symbol). Each new name consists of three elements. This renaming scheme is designed to easily describe group vs. individual contexts and apply rules to group vs. individual phonemes.

For vowels the first element indicates that the phone is a vowel, the second element indicates the stress specification, and the third element indicates the name of a group to which the vowel belongs:

| Phone | RAT Symbol | Phone | RAT Symbol |
|---|---|---|---|
| ih0 | v_0_v | AW1 | v_1_AU |
| ah0 | v_0_v | AY1 | v_1_AI |
| IY0 | v_0_V | AO1 | v_1_O |
| IH0 | v_0_V | OY1 | v_1_OI |
| EH0 | v_0_V | OW1 | v_1_OU |
| EY0 | v_0_V | UH1 | v_1_UH |
| AE0 | v_0_V | UW1 | v_1_UW |
| AA0 | v_0_V | ER1 | v_1_VR |
| AW0 | v_0_V | IY2 | v_2_IE |
| AY0 | v_0_V | IH2 | v_2_IE |
| AH0 | v_0_V | EH2 | v_2_E |
| AO0 | v_0_V | EY2 | v_2_IE |
| OY0 | v_0_V | AE2 | v_2_E |
| OW0 | v_0_V | AH2 | v_2_A |
| UH0 | v_0_V | AA2 | v_2_AO |
| UW0 | v_0_V | AW2 | v_2_AU |
| ER0 | v_0_Vr | AY2 | v_2_AI |
| IY1 | v_1_I | AO2 | v_2_O |
| IH1 | v_1_IE | OY2 | v_2_OI |
| EH1 | v_1_E | OW2 | v_2_OU |
| EY1 | v_1_IE | UH2 | v_2_UH |
| AE1 | v_1_E | UW2 | v_2_UW |
| AH1 | v_1_A | ER2 | v_2_VR |
| AA1 | v_1_AO | | |

For consonants the first element indicates the place-of-articulation features, the second element indicates the manner-of-articulation features, and the third element indicates the name of phoneme:

| Phone | RAT Symbol | Phone | RAT Symbol |
|---|---|---|---|
| B | b_d_B | ZH | d_z_ZH |
| D | d_d_D | F | b_s_F |
| G | g_d_G | TH | d_z_TH |
| P | b_t_P | V | b_s_V |

44
-continued

| Phone | RAT Symbol | Phone | RAT Symbol |
|---|---|---|---|
| T | d_t_T | DH | d_z_DH |
| TX | d_t_TX | M | b_m_M |
| DX | d_d_DX | N | d_m_N |
| K | g_t_K | NG | g_m_NG |
| JH | d_j_JH | L | b_l_L |
| CH | d_c_CH | R | r_r_r |
| S | d_s_S | W | b_l_W |
| SH | d_s_SH | Y | y_l_Y |
| Z | d_z_Z | HH | h_s_HH |

Place of Articulation b—labial
d—coronal (dental, alveolar, postaveolar)
g—velar
y—palatal
r—retroflex

Manner of Articulation d—voiced stop
t—unvoiced stop
j—voiced affricate
c—unvoiced affricate
z—voiced fricative
s—unvoiced fricative
m—nasal
l—glide
r—retroflex The symbol in the left-hand side of the derivation rules is used as a short-hand notation for the three features: place_of_articulation, manner_of_articulation and individual_name_of_a_phoneme, so that when working with individual phonemes, the individual_name_of_a phoneme may be used with the whole triple assumed.

The second group of rough rules deals with the vowels, indicating those contexts in which the vowel quality is hardly detectable. The contexts in this case are described by the place-of-articulation part of the names of adjacent consonants. The result of applying these rules is a define a set of possible vowel interpretations which are less "specific" (i.e., permit more vagueness in the vowel pronunciation) then would occur if the vowel were properly pronounced:

| | | |
|---|---|---|
| 1 | /*/v_1_I, v_1_IE, v_1_E/./ | =/#/v_1_V/#/ |
| 2 | /*/v_2_I, v_2_IE, v_2_E/./ | =/#/v_2_V/#/ |
| 3 | /y_*_*/v_1_UW, v_1_UH/*/ | =/#/v_1_IU/#/ |
| 4 | /y_*_*/v_2_UW, v_2_UH/*/ | =/#/v_2_IU/#/ |
| 5 | /d_*_*/v_1_UW, v_1_UH/*/ | =/#/v_1_IU/#/ |
| 6 | /d_*_*/v_2_UW, v_2_UH/*/ | =/#/v_2_IU/#/ |
| 7 | /r_r_r/v_1_UW, v_1_UH/*/ | =/#/v_1_IU/#/ |
| 8 | /r_r_r/v_2_UW, v_2_UH/*/ | =/#/v_2_IU/#/ |
| 9 | /*/ v_1_UW, v_1_UH/*/ | =/#/v_1_OU/#/ |
| 10 | /*/ v_2_UW, v_2_UH/*/ | =/#/v_2_OU/#/ |

In the foregoing rules (as well as the further rules described hereinafter), the symbol "*" denotes any phone when used as "/*/" and any element value when used as part of a phone description. For example, the phone /d_*_*/ could correspond to the phones /D/, /T/, /TX/, /DX/, /S/, etc. The symbol /#/ appearing in an acoustic transcription means that the corresponding phone from the pre-rule application group is carried forward to the acoustic transcription (recall, that the vowels /IU/ and /OU/ are among those that can be detected in the input speech signal. The symbol /./ means that the adjacent phone (to either the left or right) is at the beginning (to the right) or end (to the left) of a word. The acoustic events that must be detected in an utterance are represented in uppercase, while those acoustic events that may be detected (but not necessarily must be) are represented by lowercase letters.

The next group of the rules is applied to the complex (containing more than two consonants) consonant clusters. The contexts are described by the stress-specification part of the vowel phoneme RAT symbols, where vowels are present. As a result of the application of these rules, possible sets of acoustic events detectable in the case of each cluster are generated.

Rules for R

| Equations | Phones | Acoustic |
|---|---|---|
| 11 | /v__*__*/r/v__*__*/ | =/#/r__r__R/#/ |
| 12 | /*/r/v__1__*,v__2__*/ | =/#/r__r__R/#/ |
| 13 | /*/r,R/R, r/ | =/#/r__r__R// |

Rules for Clusters Beginning with N

| | Phones | Acoustic Equations |
|---|---|---|
| 14 | N CH R | =MP % R |
| 15 | N CH r | =MP % r |
| 16 | N CH T . | =MP % p-t . |
| 17 | N CH T | =MP % p-t |
| 18 | N D B | =MG b |
| 19 | N D CH | =MG p % |
| 20 | N D F | =MP BN |
| 21 | N D L | =MG |
| 22 | N D M | =MG b m |
| 23 | N D P | =MG P bn |
| 24 | N D R | =MG R |
| 25 | N D r | =MG r |
| 26 | N D TH . | =MG BN . |
| 27 | N D TH | =MG BN |
| 28 | N D W | =MG |
| 29 | N D Y | =MG |
| 30 | N D Z . | =MG b Z . |
| 31 | N D Z | =MG b Z |
| 32 | N DX R | =MG b R |
| 33 | N DX r | =MG b r |
| 34 | N F R | =MP NB R |
| 35 | N F r | =MP NB r |
| 36 | N F Y | =MP NB |
| 37 | N G R | =MG b r |
| 38 | N JH D | =M p % g t v . |
| 39 | N JH D | =M p % g b |
| 40 | N JH R | =M p % R |
| 41 | N JH r | =M p % r |
| 42 | N K L . | =MP b V . |
| 43 | N K L | =MP b |
| 44 | N K R | =MP bn R |
| 45 | N K r | =MP bn r |
| 46 | N K W | =MP b |
| 47 | N P L | =MP b |
| 48 | N S F | =MP T np |
| 49 | N S L . | =MP T V . |
| 50 | N S L | =MP T |
| 51 | N S M | =MP T m |
| 52 | N S P L | =MP T P |
| 53 | N S R | =MP T R |
| 54 | N S r | =MP T r |
| 55 | N S T . | =MP T p-t . |
| 56 | N S T | =MP T p-t |
| 57 | N T D | =MP bn |
| 58 | N T M | =MP bn |
| 59 | N T L | =MP bn |
| 60 | N T R | =MP B % R |
| 61 | N T r | =MP B % r |
| 62 | N T S . | =MP T. |
| 63 | N T S | =MP T |
| 64 | N TH S . | =MP T. |
| 65 | N TH S | =MP T |
| 66 | N TX R | =MP R |
| 67 | N TX r | =MP r |
| 68 | N Z D . | =MG Z g t v . |
| 69 | N Z D | =MG Z g b |
| 70 | N Z L | =MC Z |

Rules for Clusters Beginning with M

| | Phones | Acoustic Equations |
|---|---|---|
| 71 | M B L | =M b GV . |
| 72 | M B L | =M b |
| 73 | M B R | =M b R |
| 74 | M B r | =M b r |
| 75 | M B Y | =M b |
| 76 | M F R | =M NP R |
| 77 | M F r | =M NP r |
| 78 | M P K | =MP BN |
| 79 | M P L | =MP b |
| 80 | M P R | =MP b R |
| 81 | M P r | =MP b r |
| 82 | M P S . | =MP T . |
| 83 | M P S | =MP T |
| 84 | M P S T . | =MP T p-t . |
| 85 | M P S T | =MP T p-t |
| 86 | M P T . | =MP b p-t . |
| 87 | M P T | =MP b p-t |
| 88 | M P T S . | =MP b T . |
| 89 | M P T S | =MP b T |
| 90 | M P Y | =MP b |
| 91 | M S T | =MP T p-t |

Rules for Clusters Beginning with NG

| | Phones | Acoustic Equations |
|---|---|---|
| 92 | NG G L | =MG b |
| 93 | NG G R | =MG b R |
| 94 | NG G r | =MG b r |
| 95 | NG G W | =MG b |
| 96 | NG G Y | =MG b |
| 97 | NG K CH | =MP p % |
| 98 | NG K F | =MP BN |
| 99 | NG K L | =MP b |
| 100 | NG K R | =MP b R |
| 101 | NG K r | =MP b r |
| 102 | NG K S | =MP b T |
| 103 | NG K SH | =MP b % |
| 104 | NG K T . | =MP b p-t . |
| 105 | NG K T | =MP b p-t |
| 106 | NG K T S . | =MP b p T . |
| 107 | NG K T S | =MP b p T |
| 108 | NG K TH . | =MP b PN . |
| 109 | NG K TH | =MP b PN |
| 110 | NG K TH S . | =MP b p T . |
| 111 | NG K TH S | =MP b p T |
| 112 | NG K W | =MP b |
| 113 | NG S T | =MP T p-t |
| 114 | NG TH S . | =MP T . |
| 115 | NG TH S | =MP T |

Rules for Clusters Beginning with S

|  | Phones | Acoustic Equations |
|---|---|---|
| 116 | S G R | =S GP b R |
| 117 | S G r | =S GP b r |
| 118 | S K S . | =S GP b T . |
| 119 | S K S | =S GP b T |
| 120 | S K T . | =S GP b p-t . |
| 121 | S K T | =S GP b p-t |
| 122 | S K W | =S GP b g |
| 123 | S K R | =S GP b R |
| 124 | S K r | =S GP b r |
| 125 | S P S . | =S P T . |
| 126 | S P S | =S P T |
| 127 | S P L | =S P b |
| 128 | S P R | =S P b R |
| 129 | S P r | =S P b r |
| 130 | S P T . | =S p-b p-t . |
| 131 | S P T | =S p-b p-t |
| 132 | S T B | =S p-t G b |
| 133 | S T K | =S p-t GP bn |
| 134 | S T L | =S p-t |
| 135 | S T M | =S p-t MG |
| 136 | S T P | =S p-t P b |
| 137 | S T R | =S p-t R |
| 138 | S T r | =S p-t r |
| 139 | S K R | =S GP bn R |
| 140 | S K r | =S GP bn r |
| 141 | S K W | =S GP bn |
| 142 | S P L | =S p bn |
| 143 | S P R | =S P bn R |
| 144 | S P r | =S P bn r |
| 145 | S T R | =S P %t R |
| 146 | S T r | =S P %t r |

Rules for Clusters Beginning with F

|  | Phones | Acoustic Equations |
|---|---|---|
| 147 | F S P R | =p S P b R |
| 148 | F S P r | =p S P b r |
| 149 | F T S . | =NP T . |
| 150 | F T S | =NP T |
| 151 | F T S M | =NP T MG |
| 152 | F T W | =NP bn |

Rules for Clusters Beginning with Z

|  | Phones | Acoustic Equations |
|---|---|---|
| 153 | Z S T | =ZS p-t |

Rules for Clusters Beginning with DH

|  | Phones | Acoustic Equations |
|---|---|---|
| 154 | DH D R | =GP bn R |
| 155 | DH D r | =GP bn r |

Rules for Clusters Beginning with TH

|  | Phones | Acoustic Equations |
|---|---|---|
| 156 | TH B R | =NP G b R |
| 157 | TH B r | =NP G b r |
| 158 | TH D R | =NP G b R |
| 159 | TH D r | =NP G b r |
| 160 | TH K W | =NP gb |

Rules for clusters beginning with P

|  | Phones | Acoustic Equations |
|---|---|---|
| 161 | P CH R | =P bn p % R |
| 162 | P CH r | =P bn p % r |
| 163 | P F R | =P BN R |
| 164 | P F r | =P BN r |
| 165 | P S T R | =P b T p-t R |
| 166 | P S T r | =P b T p-t r |
| 167 | P TH S . | =PbP T . |
| 168 | P TH S | =PbP T |

Rules for clusters beginning with T

|  | Phones | Acoustic Equations |
|---|---|---|
| 169 | T P R | =P bn R |
| 170 | T P r | =P bn r |
| 171 | T S R | =p T R |
| 172 | T S r | =p T r |
| 173 | T S T | =p T p-t |

Rules for clusters beginning with K

|  | Phones | Acoustic Equations |
|---|---|---|
| 174 | K CH R | =GP b p % R |
| 175 | K CH r | =GP b p % r |
| 176 | K G R | =GP bn g R |
| 177 | K G R | =GP bn g r |
| 178 | K S CH | =GP b T p % |
| 179 | K S K L | =GP b T GP b |
| 180 | K S K Y | =GP b T GP b |
| 181 | K S M | =GP b T MG b |
| 182 | K S P L | =GP b T P b |
| 183 | K S P R | =GP b T P b R |
| 184 | K S P r | =GP b T P b r |
| 185 | K S T . | =GP b T p-t . |
| 186 | K S T | =GP b T p-t |
| 187 | K S T R | =GP b T p %t R |
| 188 | K S T r | =GP b T p %t r |
| 189 | K S T S . | =GP b T p T . |
| 190 | K S T S | =GP b T p T |
| 191 | K S TH . | =GP b T p-bn . |
| 192 | K S TH | =GP b T p-bn |
| 193 | K T R | =GP b p %t R |
| 194 | K T r | =GP b p %t r |
| 195 | K Y R | =GP bn V R |
| 196 | K Y r | =GP bn V r |

Rules for clusters beginning with B

|  | Phones | Acoustic Equations |
|---|---|---|
| 197 | B M R | =GM R |
| 198 | B M r | =GM t |
| 199 | B S T | =GP T p-t |

-continued

| | Phones | Acoustic Equations |
|---|---|---|
| 200 | B T R | =GP %t R |
| 201 | B T r | =GP %t r |

Rules for clusters beginning with D

| | Phones | Acoustic Equations |
|---|---|---|
| 203 | D S P R | =GP T P R |
| 204 | D S P r | =GP T P r |
| 205 | D S T | =GP T p-t |
| 206 | D TH S | =GP bn S |
| 207 | D Z M | =g T MG b |

Rules for clusters beginning with G

| | Phones | Acoustic Equations |
|---|---|---|
| 208 | G N R | =GM R |
| 209 | G N r | =GM r |
| 210 | G S T | =GP T p-t |
| 211 | G Y R | =GP b V R |
| 212 | G Y r | =GP b V r |
| 213 | G ZH R | =GP % R |
| 214 | G ZH r | =GP % r |

Rules for nasals

| | Phones | Acoustic Equations |
|---|---|---|
| 215 | /v_*_*/*_m_*/v_*_*/ | =/#/M/#/ |
| 216 | /*/*_m_*/*_m_*/ | =/#/M/#/ |
| 217 | /*_m_*/B/v_*_*/ | =/M/ p bn/#/ |
| 218 | /*_m_*/*_d_*/v_1_*, v_2_*/ | =/M/ p BN/#/ |
| 219 | /*_m_*/*_d_*/v_0_*/ | =/M/ p bn/#/ |
| 220 | /*_m_*/B/./ | =/M/gnv/#/ |
| 221 | /*_m_*/*_d_*/./ | =/M/ gnv/#/ |
| 222 | /*_m_*/DX/*/ | =/MG/b/#/ |
| 223 | /*_m_*/TX/*/ | =/MP/t/#/ |
| 224 | /*_m_*/CH, SH/*/ | =/MP/%/#/ |
| 225 | /*_m_*/JH, ZH/*/ | =/MG/%/#/ |
| 226 | /*_m_*/S/*/ | =/MP/T/#/ |
| 227 | /*_m_*/Z/*/ | =/MG/T/#/ |
| 228 | /*_m_*/TH/*/ | =/MP/bn/#/ |
| 229 | /*_m_*/DH/*/ | =/MG/bn/#/ |
| 230 | /*_m_*/F/./ | =/MG/p-n/#/ |
| 231 | /*_m_*/F/*/ | =/MG/PN/ |
| 232 | /*_m_*/HH/*/ | =/MP/n/#/ |
| 233 | /*_m_*/b_s_V/*/ | =/MG/n/#/ |
| 234 | /*_m_*/P/v_*_*/ | =/MP/bn/#/ |
| 235 | /*_m_*/K/v_1_*, v_2_*/ | =/MP/BN/#/ |
| 236 | /*_m_*/K/v_0_*/ | =/MP/bn/#/ |
| 237 | /*_m_*/T/v_1_*, v_2_*/ | =/MP/t/#/ |
| 238 | /*_m_*/T/v_0_*/ | =/MP/bn/#/ |
| 239 | /*_m_*/T/./ | =/MP/t/#/ |
| 240 | /*_m_*/P, K/./ | =/MP/bn/#/ |
| 241 | /*_m_*/*_1_*/v_*_*/ | =/MG//#/ |
| 242 | /*/*_m_*/R, r/ | =/#/MG/#/ |
| 243 | /*_m_*/*_1_*/./ | =/m/GV/#/ |

The fourth group of the rules is applied to simple (containing only two elements) consonant clusters. In this case, the consonant clusters are described not as solid units within vocal context, but with one consonant hypothesized as the root of the rule, while the other is considered as left or right context. The consonants in this set of rules are described mostly by manner-of-articulation part of their RAT symbol names:

Rules for S, Z

| | Phones | Acoustic Equations |
|---|---|---|
| 244 | /S, Z/*_m_*/v_*_*/ | =/Z/PM b/#/ |
| 245 | /S, Z/*_d_*/v_*_*/ | =/Z/PG bn/#/ |
| 246 | /S, Z/*_m_*/./ | =/Z/md/#/ |
| 247 | /S, Z/*_d_*/./ | =/Z/gnv/#/ |
| 248 | /*/S, Z/SH, ZH/ | =/#/ZC// |
| 249 | /*/S, Z/CH, JH/ | =/#/ZC/p-%/ |
| 250 | /S, Z/TH/./ | =/Z/p-n/#/ |
| 251 | /S, Z/DH/./ | =/Z/gnv/#/ |
| 252 | /S, Z/TH, DH/*/ | =/Z/pn/#/ |
| 253 | /S, Z/F/./ | =Z/p-n/#/ |
| 254 | /S, Z/b_s_V/./ | =Z/gnv/#/ |
| 255 | /S, Z/HH, F/*/ | =/Z/pn/# |
| 256 | /S, Z/b_s_V/*/ | =/Z/GN/#/ |
| 257 | /S, Z/P/v_*_*/ | =/Z/P bn/#/ |
| 258 | /S, Z/T/v_*_*/ | =/Z/p-t/#/ |
| 259 | /S, Z/K/v_*_*/ | =/Z/GP bn/#/ |
| 260 | /S, Z/P/./ | =/Z/p-bn/#/ |
| 261 | /S, Z/T/./ | =/Z/p-t/#/ |
| 262 | /S, Z/K/./ | =/Z/GP bn/#/ |
| 263 | /S, Z/L, W/v_*_*/ | =/Z/gp/#/ |
| 264 | /S, Z/L/./ | =/Z/GV/#/ |
| 265 | /*/S, Z/R,r/ | =/#/ZC/#/ |
| 266 | /S, Z/Y/v_*_*/ | =/ZC//#/ |

Rules for SH, ZH

| | Phones | Acoustic Equations |
|---|---|---|
| 267 | /SH, ZH/*_m_*/v_*_*/ | =/C/PM b/#/ |
| 268 | /SH, ZH/*_d_*/v_*_*/ | =/C/PG bn/#/ |
| 269 | /SH, ZH/*_m_*/./ | =/C/md/#/ |
| 270 | /SH, ZH/*_d_*/./ | =/C/gnv/#/ |
| 271 | /*/SH, ZH/S, Z/ | =/#/CZ// |
| 272 | /SH, ZH/TH/./ | =/C/p-n/#/ |
| 273 | /SH, ZH/DH/./ | =/C/gnv/#/ |
| 274 | /SH, ZH/TH, DH/*/ | =/C/pn/#/ |
| 275 | /SH, ZH/F/./ | =/C/p-n/#/ |
| 276 | /SH, ZH/b_s_V/./ | =/C/gnv/#/ |
| 277 | /SH, ZH/HH, F/*/ | =/C/pn/#/ |
| 278 | /SH, ZH/b_s_V/*/ | =/C/GN/#/ |
| 279 | /SH, ZH/P/v_*_*/ | =/C/P bn/#/ |
| 280 | /SH, ZH/T/v_*_*/ | =/C/p-t/#/ |
| 281 | /SH, ZH/K/v_*_*/ | =/C/GP bn/#/ |
| 282 | /SH, ZH/P/./ | =/C/p-bn/#/ |
| 283 | /SH, ZH/T/./ | =/C/p-t/#/ |
| 284 | /SH, ZH/K/./ | =/C/gp bn/#/ |
| 285 | /SH, ZH/L, W/v_*_*/ | =/C/pg/#/ |
| 286 | /SH, ZH/L/./ | =/C/GV/#/ |
| 287 | /*/SH, ZH/R,r/ | =/#/C/#/ |
| 288 | /SH, ZH/Y/v_*_*/ | =/C//#/ |

Rules for TH, DH

| | Phones | Acoustic Equations |
|---|---|---|
| 289 | /TH/*_m_*/v_*_*/ | =/PN/GM b/#/ |
| 290 | /TH/*_d_*/v_*_*/ | =/PN/PG bn/#/ |
| 291 | /TH/*_m_*/./ | =/PN/md/#/ |
| 292 | /TH/*_d_*/./ | =//GNV/#/ |
| 293 | /DH/*_m_*/v_*_*/ | =/GP bn/GM/#/ |
| 294 | /DH/*_d_*/v_*_*/ | =/GP/bn/#/ |
| 295 | /DH/*_m_*/./ | =/G/md/#/ |
| 296 | /DH/*_d_*/./ | =//GNV/#/ |
| 297 | /*/TH, DH/S, Z/ | =/#/gp/ T/ |
| 298 | /TH/F/./ | =/N/p-n/#/ |
| 299 | /DH/b_s_V/./ | =/G/gnv/#/ |
| 300 | /TH/F/./ | =/N/p-n/#/ |
| 301 | /DH/b_s_V/./ | =/G/gnv/#/ |
| 302 | /TH/HH, F/*/ | =/N/pn/#/ |

51

-continued

| Phones | Acoustic Equations |
| --- | --- |
| 303 /DH/HH, F/*/ | =/G/pn/#/ |
| 304 /TH/b_s_V/*/ | =/PN/G/#/ |
| 305 /DH/b_s_V/*/ | =/GN/G/#/ |
| 306 /TH, DH/P/v_*_*/ | =/n/P bn/#/ |
| 307 /TH, DH/T/v_*_*/ | =/n/P t/#/ |
| 308 /TH, DH/K/v_*_*/ | =/n/GP bn/#/ |
| 309 /TH, DH/P/./ | =/PN/p-bn/#/ |
| 310 /TH, DH/T/./ | =PN/p-t/#/ |
| 311 /TH, DH/K/./ | =/PN/gp bn/#/ |
| 312 /./TH/L, W/ | =/#NG// |
| 313 /./DH/L, W/ | =/#/VGN// |
| 314 /*/TH/L, W/ | =/#/PN// |
| 315 /*/DH/L, W/ | =/#/GN// |
| 316 /TH, DH/L/./ | =/PN/GV/#/ |
| 317 /./TH/R,r/ | =/#/BN/#/ |
| 318 /./DH/R,r/ | =/#/VGN/#/ |
| 319 /*/TH/R,r/ | =/#/PN/#/ |
| 320 /*/DH/R,r/ | =/#/GN/#/ |
| 321 /./TH/Y/ | =/#/n// |
| 322 /./DH/Y/ | =/#/VGN// |
| 323 /*/TH/Y/ | =/#/PN// |
| 324 /*/DH/Y/ | =/#/GN// |

Rules for F

| Phones | Acoustic Equations |
| --- | --- |
| 325 /F/*_m_*/v_*_*/ | =/PN/GM b/#/ |
| 326 /F/*_d_*/v_*_*/ | =/PN/PG bn/#/ |
| 327 /F/*_m_*/./ | =/PN/md/#/ |
| 328 /F/*_d_*/./ | =/PN/gnv/#/ |
| 329 /*/F/S, Z/ | =/#//T/ |
| 330 /F/TH, DH/*/ | =/p/N/#/ |
| 331 /F/HH/*/ | =//NP/#/ |
| 332 /F/b_s_V/*/ | =/p/NG/#/ |
| 333 /F/P/v_*_*/ | =/n/P bn/#/ |
| 334 /F/T/v_*_*/ | =/n/P t/#/ |
| 335 /F/t/v_*_*/ | =/N/p-t/#/ |
| 336 /F/K/v_*_*/ | =/n/GP bn/#/ |
| 337 /F/P/./ | =/N/p-bn/#/ |
| 338 /F/T/./ | =/PN/P t/#/ |
| 339 /F/K/./ | =/N/GP bn/#/ |
| 340 /F/L, W/v_*_*/ | =/PN/pg/#/ |
| 341 /F/L/./ | =/PN/GV/#/ |
| 342 /./F/./ | =/p/N/#/ |
| 343 /*/F/R,r/ | =/#/PN/#/ |
| 344 /F/Y/v_*_*/ | =/PN//#/ |

Rules for V

| Phones | Acoustic Equations |
| --- | --- |
| 345 /b_s_V/D/./ | =/NG/gtv/#/ |
| 346 /b_s_V/Z/./ | =/gp/T/#/ |
| 347 /b_s_V/D/*/ | =/NG/p- t/#/ |
| 348 /b_s_V/Z/*/ | =/gp/T/#/ |
| 349 /b_s_V/*_m_*/*/ | =/n/MG/#/ |
| 350 /*/b_s_V/L, W/ | =/#//#/ |
| 351 /b_s_V/L/./ | =/n/GV/#/ |
| 352 /b_s_V/Y/*/ | =//NG/#/ |
| 353 /*/b_s_V/R,r/ | =/#//#/ |

52

Rules for P,T,K

| Phones | Acoustic Equations |
| --- | --- |
| 354 /P, T/*_m_*/v_*_*/ | =/P b/MG/#/ |
| 355 /P, T, K/*_d_*/v_*_*/ | =//PG bn/#/ |
| 356 /P, T/*_m_*/*/ | =/P b/vm/#/ |
| 357 /P, T/*_d_*/*/ | =//GNV/#/ |
| 358 /*_t_*/*_t_*/*/ | =//#/#/ |
| 359 /*/P, T/SH, ZH/ | =/#/P/%/ |
| 360 /*/P, T, K/CH, JH/ | =/#/P/%/ |
| 361 /P, T/TH/./ | =/P/N/#/ |
| 362 /P, T/TH, DH/*/ | =/P/bn/#/ |
| 363 /P, T/F/./ | =/P/BN/#/ |
| 364 /P, T/HH, F/*/ | =/P/bn/#/ |
| 365 /P, T/b_s_V/*/ | =/P/NG/#/ |
| 366 /P, T/S, Z/*/ | =/P/T/#/ |
| 367 /P, T/L/./ | =/P bn/VG/#/ |
| 368 /./P, T/L, W/ | =/#/bn// |
| 369 /P, T/L, W/v_*_*/ | =/P bn/g/#/ |
| 370 /K/*_m_*/v_*_*/ | =/GP b/MG/#/ |
| 371 /K/*_m_*/*/ | =/GP b/vm/#/ |
| 372 /K/*_d_*/*/ | =//GNV/#/ |
| 373 /*/K/SH, ZH/ | =/#/GP/%/ |
| 374 /*/K/CH, JH/ | =/#/GP/%/ |
| 375 /K/TH/./ | =/GP/N/#/ |
| 376 /K/TH, DH/*/ | =/GP/bn/#/ |
| 377 /K/F/./ | =/GP/BN/#/ |
| 378 /K/HH, F/*/ | =/GP/bn/#/ |
| 379 /K/b_s_V/*/ | =/GP/NG/#/ |
| 380 /K/S, Z/*/ | =/GP/T/#/ |
| 381 /K/L/./ | =/GP bn/VG/#/ |
| 382 /./K/L, W/ | =/#/bn// |
| 383 /K/L, W/v_*_*/ | =/GP bn/g/#/ |
| 384 /./P, K/R,r/ | =/#/bn/#/ |
| 385 /./T/R,r/ | =/#B%/#/ |
| 386 /*/P, K/R,r/ | =/#/P bn/#/ |
| 387 /*/T/R,r/ | =/#/P B%/#/ |
| 388 /./P, K/Y/ | =/#/bn// |
| 389 /./T/Y/ | =/#/B%// |
| 390 /*/P, K/Y/ | =/#/P/bn/ |
| 391 /*/T/Y/ | =/#/P/B%/ |

Rules for B, D, G

| Phones | Acoustic Equations |
| --- | --- |
| 392 /B, D, G/*_m_*/v_*_*/ | =/MG/b/#/ |
| 393 /B, D, G/*_d_*/v_*_*/ | =/GP/bn/#/ |
| 394 /B, D, G/*_m_*/./ | =/G b/VM/#/ |
| 395 /*/B, D, G/SH, ZH/ | =/#/GP/%/ |
| 396 /B, D, G/TH, DH/*/ | =/GP/bn/#/ |
| 397 /B, D, G/F/./ | =/GP/BN/#/ |
| 398 /B, D, G/HH, F/*/ | =/GP/bn/#/ |
| 399 /B, D, G/b_s_V/*/ | =/GP/ng/#/ |
| 400 /B, D, G/S, Z/*/ | =/GP/T/#/ |
| 401 /B, D, G/L/./ | =/GP bn/VG/#/ |
| 402 /./B, D, G/L, W/ | =/#/gb/ |
| 403 /B, D, G/L, W/v_*_*/ | =/GP bn/g/#/ |
| 404 /./B, G/R,r/ | =/#/gb/#/ |
| 405 /./D/R,r/ | =/#/v g B%/#/ |
| 406 /*/B, G/R,r/ | =/#/GP bn/#/ |
| 407 /*/D/R,r/ | =/#/GP B%/#/ |
| 408 /./B, G/Y/ | =/#/gb/#/ |
| 409 /./D/Y/ | =/#/v g/B%/ |
| 410 /B, G/Y/v_*_*/ | =/GP/bn/#/ |
| 411 /D/Y/v_*_*/ | =/GP/B%/#/ |

The last group of the rough rules is applied to the single intervocalic, word-initial and word-final consonants and vowels:

Rules for single consonants

| | Phones | Acoustic Equations |
|---|---|---|
| 412 | /./*__m__*/v__1__*, v__2__*/ | =/#/MG b/#/ |
| 413 | /./*__m__*/v__0__*/ | =/#/mg/#/ |
| 414 | /*/*__m__*/./ | =/#/md/#/ |
| 415 | /*/*__m__*/ v__1__*, v__2__*/ | =/#/M/#/ |
| 416 | /*/*__m__*/ v__0__*/ | =/#/mg/#/ |
| 417 | /*/S/*/ | =/#/S/#/ |
| 418 | /v__*__*/Z/v__*__*/ | =/#/ZN/#/ |
| 419 | /*/Z/*/ | =/#/Z/#/ |
| 420 | /*/SH/*/ | =/#/C/#/ |
| 421 | /*/ZH/*/ | =/#/CN/#/ |
| 422 | /./CH/*/ | =/#/%/#/ |
| 423 | /./JH/*/ | =/#/g %/#/ |
| 424 | /*/CH/*/ | =/#/p %/#/ |
| 425 | /*/JH/v__*__*/ | =/#/G %/#/ |
| 426 | /*/JH/*/ | =/#/g %/#/ |
| 427 | /./TH/*/ | =/#/bn/#/ |
| 428 | /./DH/*/ | =/#/VGN/#/ |
| 429 | /*/TH/./ | =/#/n/#/ |
| 430 | /*/DH/./ | =/#/gnv/#/ |
| 431 | /*/TH/*/ | =/#/PN/#/ |
| 432 | /*/DH/*/ | =/#/GP bn/#/ |
| 433 | /./F/*/ | =/#/bn/#/ |
| 434 | /*/F/./ | =/#/n/#/ |
| 435 | /*/F/*/ | =/#/PN/#/ |
| 436 | /./b__s__V/*/ | =/#/gn/#/ |
| 437 | /*/b__s__V/./ | =/#/n/#/ |
| 438 | /*/b__s__V/*/ | =/#/GN/#/ |
| 439 | /*/TX/*/ | =/#/GP/#/ |
| 440 | /*/DX/*/ | =/#/G/#/ |
| 441 | /./K/v__1__*/ | =/#/BN/#/ |
| 442 | /./K/*/ | =/#/bn/#/ |
| 443 | /./P/*/ | =/#/bn/#/ |
| 444 | /*/P/./ | =/#/p-bn/#/ |
| 445 | /*/K/./ | =/#/GP bn/#/ |
| 446 | /*/P/v__1__*, v__2__*/ | =/#/P BN/#/ |
| 447 | /*/K/v__1__*, v__2__*/ | =/#/GP BN/#/ |
| 448 | /*/K/*/ | =/#/GP bn/#/ |
| 449 | /*/P/*/ | =/#/P bn/#/ |
| 450 | /./T/*/ | =/#/t/#/ |
| 451 | /*/T/./ | =/#/p-t/#/ |
| 452 | /*/T/*/*/ | =/#/P t/#/ |
| 453 | /./B, G/*/ | =/#/gb/#/ |
| 454 | /*/B, G/./ | =/#/gnv/#/ |
| 455 | /*/B, G/v__1__*, v__2__*/ | =/#/GP BN/#/ |
| 456 | /*/B, G/*/ | =/#/GP bn/#/ |
| 457 | /./D/v__1__*, v__2__*/ | =/#/g BN/#/ |
| 458 | /./D/*/ | =/#/g bn/#/ |
| 459 | /*/D/./ | =/#/gnv/#/ |
| 460 | /*/D/*/ | =/#/GP t/#/ |
| 461 | /./HH/*/ | =/#/bn/#/ |
| 462 | /*/HH/*/ | =/#/gn/#/ |
| 463 | /*__1__*/*__1__*/v__*__*/ | =/#/w/#/ |
| 464 | /v__*__*/*__1__*/v__*__*/ | =/#/w/#/ |
| 465 | /v__0__v/*__1__*/./ | =/V/#/ |
| 466 | /*/*__1__*/*/ | =/#/#/ |

Rules for vowels

| | Phones | Acoustic Equations |
|---|---|---|
| 467 | /v__1__*,v__2__*/v__0__v/*/ | =/#//#/ |
| 468 | /v__1__*,v__2__*/v__0__V/*/ | =/#//#/ |
| 469 | /*/v__0__v/v__1__*,v__2__*/ | =/#//#/ |
| 470 | /*/v__0__V/v__1__*,v__2__*/ | =/#//#/ |
| 471 | /*/v__0__v,v__0__V/v__0__v,v__0__V/ | =/#/V// |
| 472 | /*/v__0__v/*/ | =/#/v/#/ |
| 473 | /*/v__0__V/*/ | =/#/V/#/ |
| 474 | /*/v__0__VR/*/ | =/#/VJ/#/ |
| 475 | /*/v__0__Vr/*/ | =/#/VJ/#/ |
| 476 | /*/v__1__I/*/ | =/#/I/# |
| 477 | /*/v__1__IE/*/ | =/#/IE/#/ |
| 478 | /*/v__1__E/*/ | =/#/E/#/ |
| 479 | /*/v__1__A/*/ | =/#/A/#/ |

—continued

| | Phones | Acoustic Equations |
|---|---|---|
| 480 | /*/v__1__AO/*/ | =/#/AO/#/ |
| 481 | /*/v__1__AU/*/ | =/#/AU/#/ |
| 482 | /*/v__1__AI/*/ | =/#/AI/#/ |
| 483 | /*/v__1__O/*/ | =/#/O/#/ |
| 484 | /*/v__1__OI/*/ | =/#/OI/#/ |
| 485 | /*/v__1__OU/*/ | =/#/OU/#/ |
| 486 | /*/v__1__VR/*/ | =/#/J/#/ |
| 487 | /*/v__2__I/*/ | =/#/I/#/ |
| 488 | /*/v__2__IE/*/ | =/#/IE/#/ |
| 489 | /*/v__2__E/*/ | =/#/E/#/ |
| 490 | /*/v__2__A/*/ | =/#/A/#/ |
| 491 | /*/v__2__AO/*/ | =/#/AO/#/ |
| 492 | /*/v__2__AU/*/ | =/#/AU/#/ |
| 493 | /*/v__2__AI/*/ | =/#/AI/#/ |
| 494 | /*/v__2__O/*/ | =/#/O/#/ |
| 495 | /*/v__2__OI/*/ | =/#/OI/#/ |
| 496 | /*/v__2__OU/*/ | =/#/OU/#/ |
| 497 | /*/v__2__VR/*/ | =/#/J/#/ |
| 498 | /*/v__1__V/*/ | =/#/V/#/ |
| 499 | /*/v__2__V/*/ | =/#/V/#/ |
| 500 | /*/v__1__IU/*/ | =/#/IU/#/ |
| 501 | /*/v__2__IU/*/ | =/#/IU/#/ |
| 502 | /*/v__1__OU/*/ | =/#/OU/#/ |
| 503 | /*/v__2__OU/*/ | =/#/OU/#/ |
| 504 | /*/r__r__R/*/ | =/#/R/#/ |
| 505 | /*/r__r__r/*/ | =/#/r/#/ |

Application of the foregoing rules to the phonetic transcriptions results in an augmented acoustic event equivalents ("Acoustic Equ.") of the phonetic words, illustrated in FIG. 7B. Each acoustic word represents a sequence of possible acoustic events described in terms of simple, compound and complex symbols. Simple symbols mean that only one event is possible, while compound and complex symbols stand for the disjunction of possibilities. Compound symbols consist of two elements and mean that just one of the two possibilities is actually expected, while complex symbols typically consist of three elements and mean that several possible (usually more than three) sequences of events are expected in these cases. The actual decomposition of the complex symbols is not derived directly from the symbol itself, but is given declaratively.

Examples of the application of the rough rules to the words "absolute" and "agreement" are shown in FIG. 7C. The phonetic transcription of the word absolute is [AE1 B S ah0 L UW2 T]. First, the vowel [AE1] is replaced by RAT symbol /v__1__E/, then applying the rough rule for vowels (that /v__1__E/=/#/E/#/), the phonetic sound [AE1] is translated to the detectable acoustic event "E". The other rough rules are applied in as similar fashion as follows:

| Phone | RAT Symbol | Rough Rules | Acoustic Equivalent |
|---|---|---|---|
| AE1 | v__1__E | 478 | E |
| B | b__d__B | 400 | GP |
| S | d__s__S | 400 | T |
| ah0 | v__0__v | 472 | v |
| L | b__1__L | 464 | w |
| UW2 | v__2__UW | 10, 496 | OU |
| T | d__t__T | 451 | p-t |

In the foregoing example, the phone [AE1] is translated to the detectable vocalic sound "E", the phone [B] has been translated to a gap or a pause, the phone [S] has been translated to an "S-noise", the unstressed vowel [ah0] has been translated to a reduced vowel which may disappear, the [L] phone has been translated to a glide, the [UW2] phone has been translated to an OU-vowel, and the [T] phone has been translated to a weak pause or an S-noise (that may disappear), or both. Acoustic transcriptions for the other words in FIG. 7B are likewise generated by applying the rough rules described above to the phonetic transcriptions of the baseform orthographic words generated during step 74.

8.5 Classify Acoustic Words Into Orbits

Once a vocabulary acoustic event transcription is assigned to every word in the dictionary, step 78 is performed involving ordering the acoustic event transcriptions into sets according to prevalence of certain features in the acoustic event transcriptions. These ordered sets are referred to as "orbits" having an order based upon the lexicographic order of the corresponding characteristic vectors; the order of elements within orbits is the lexicographic order of the names of the sequences of the corresponding acoustic events. While two words may have very different phonetic transcriptions, if they have similar acoustic event transcriptions, they will be classified into the same orbit, as described hereinafter. Of course, because many words may have certain phonemes omitted and yet remain admissible pronunciations, most are classified into a number of different orbits. For a vocabulary of approximately 70,000 words, approximately 11,000 orbits may be identified.

As implemented in the preferred embodiment, the dictionary 40 of the present invention comprises several dictionaries of almost similar structure interrelated by indices. The dictionary containing information about the pronunciation of the vocabulary words is referred to as the "main dictionary." As described with respect to steps 74 and 76, the main dictionary is generated on the basis of two text files, a first (the "pronunciation dictionary") containing a number of line groups of similar format, bearing the information on the phonetic transcriptions corresponding to each orthographic (spelled) word, and a compressed record of the set of event transcriptions corresponding to the permissible phonetic transcriptions. The second text file contains information enabling the compressed record of event transcriptions to be expanded into a full set.

When the main dictionary is generated, the set of acoustic event transcriptions is reconstructed from the compressed record. In the compressed record, each name of a set of acoustic event sequences is, one by one, substituted by the next acoustic event sequence of the corresponding set. Each sequence substituting for the set name is recorded by characters of the same case (upper or lower) as was used to record the set name in the initial compressed record. The acoustic event sequences substituting for the neighboring set names are recorded one after another.

Thus, construction of the main dictionary involves: a) reading and processing the initial file containing spelled words, phonetic transcriptions and compressed records of acoustic event transcriptions; b) on the basis of each compressed record, constructing a set of acoustic event transcriptions; c) fixing the correspondence between spelled words, their phonetic transcriptions and their acoustic event transcriptions; d) generating indices and index references; e) creating and recording the main dictionary records in a file; and f) partitioning the dictionary into orbits.

During the partitioning process, the set of the dictionary records is partitioned into disjoint subsets, the union of which coincides with the whole set of records. This partitioning, according to both phonetic and acoustic features, results in the identification of subsets or "orbits" containing phonetically resembling words, as described above, in which each word of such a subset is a representative of the subset as a whole.

Looking at a phonetic transcription of a word there are some acoustic events (e.g. noises, if the word contains sibilants and/or affricates) that can be detected in the input speech signal, while some others, despite the ability to detect them, might not be found, because those acoustic events are not present in the word. It is also apparent that some phonemes (for example, certain stressed vowels) will be recognized in the input speech signal, while some other phonemes might not, again because those vowels are not present in the word. On the other hand, because there are cases in which it cannot be predicted whether a certain acoustic event will occur and be detected, it is uncertain whether the phoneme will be recognized.

The above observations implies that for a phonetic transcription and/or acoustic event transcription a certain predicate (i.e., feature) can be defined, which adopts either "TRUTH" or "FALSE"" values, or an undefined value, depending upon whether the presence or absence of a certain event can be detected, or (in the undefined case) different answers are obtained each time detection of the event is attempted. Such a feature is referred to as "elementary" if it determines the presence or absence of one and only one event.

A feature determined for a phonetic transcription and/or acoustic event transcription is called a "complex" if it corresponds to a logical predicate adopting "TRUTH" or "FALSE" values, or an undefined value, when two or more simple phonetic/acoustic features participate in creating its values. An example of a complex feature is the feature corresponding to question: "Is there phoneme AA before phoneme S in this word?" or question "Will a burst, preceding (not necessarily immediately preceding) a noise, be detected in this word?" Another example is the feature corresponding to question: "What is the number of syllables of this word located in the defined interval?"

In view of the foregoing considerations, the features used to partition the dictionary preferably comply with two main conditions. First, the features should be capable of being reliably detected both by the phonetic information used to construct the dictionary and by the acoustic information analyzed in the course of recognition. Second, the features should be "significant," that is, they should adopt indefinite values as seldom as possible, and in the remaining cases should adopt "TRUTH" and "FALSE" values approximately an equal number of times.

Failure to comply with the first condition decreases the reliability of recognition, while failure to comply with the second condition decreases the efficiency of the operations related to the primary selection of words from the dictionary for further analysis.

The reliability of a complex feature entirely depends upon the reliability with which values of the simple features that participate in determining the complex one are determined during the recognition process. The significance of each feature is determined by the statistical characteristics of the language (in a preferred embodiment, English) and the degree of coordination between these characteristics and the methods employed in the lexical access phase of the system, described hereinafter.

The partitioning of the dictionary into various orbits is performed as follows, starting with a definite set of phonetic and acoustic features. For each main dictionary record corresponding to a certain pair "phonetic transcription/ acoustic transcription", a value for each phonetic/acoustic feature in the pair is found, and the result is saved as a vector whose coordinate values are 1, 0, or −1 depending on what value ("TRUTH", indefinite value, or "FALSE") the corresponding predicates adopt for this pair. Two main dictionary records are considered as belonging to one orbit if they have the same vectors.

The procedure for defining the orbits is as follows: For each dictionary word, A, a transcription $\{a_1, \ldots, a_k\}$ is defined as a sequence of acoustic events $a_i$ detected during the recognition stage. In $\{a_1, \ldots, a_k\}$ some of the events are labeled as necessary (the absence of such events in the spoken utterance or failure to detect them in the utterance during the recognition phase leads to the conclusion that the word can not be matched with A); other events are labeled as only possible. For the sequence $\{a_1, \ldots, a_k\}$ a predicate $P=P(b_1, \ldots, b_1)$ is defined which corresponds with some fixed sequence $(b_1, \ldots, b_1)$. The predicate $P=P(b_1, \ldots, b_1)$ on a word $A=A(a_1, \ldots, a_k)$ has a meaning of:

"True" if the sequence $\{b_1, \ldots, b_1\}$ can be embedded into the sequence of necessary events from $\{a_1, \ldots, a_k\}$;

"False" if the sequence $\{b_1, \ldots, b_1\}$ can not be embedded into the sequence of events from $\{a_1, \ldots, a_k\}$;

"Undecided" if neither of the above are true.

If the set M of ternary predicates is defined, then each word in the dictionary will have a naturally corresponding characteristic vector with number of dimensions equal to the power of the set M. The elements of these vectors will have 1, −1 or 0 that correspond to the values "True", "False" and "Undecided". Two words A and B will belong to the same orbit if their characteristic vectors coincide. Predicate P can be defined not only as the embedding of two sequences by straight equivalence of the elements of the sequences but occasionally by requiring, for example, the equivalence of individual pairs of successive acoustic events. In other cases it may be necessary to take into account the possibility of a merger of several separate events into one during the recognition phase. For example, the predicate that checks for existence of two Vocals has to return an "Undecided" value on a word that has two Vocals and a glide in between; since the Vocal, Glide, Vocal may be detected during the recognition phase as just one vocal fragment. Finally, some of the predicates may be determined without using embedding at all, e.g. the predicate that corresponds to the question "Are there two syllables in the word?".

8.5.A The Set of Features

The set of features used to divide the dictionary into orbits includes in one embodiment of the present invention, features of the following three classes: (1) syllabic features; (2) acoustic features; (3) phonemic features. The features of the first of these classes involve establishing the number of vocal parts in the wave fragment recognized as one word, whereas the features of the second and third classes are based on detecting certain acoustic or phonetic sequences in this fragment. In this context, the phonemic features to be specified acoustically are assumed (e.g., phoneme /s/ is realized acoustically as strong noise), so that the features of the second and third classes differ only in the mechanisms used for their detection (in the former case it is segmentation, in the latter one, the procedures of recognition). Since, this distinction holds only with respect to elementary features (described below), the difference between the features of the second and third classes are rather small.

Syllabic Features

Analysis of fine and rough pronunciation of each dictionary word makes it possible to predict the interval covering the number of vocal parts that will be detected in the wave when recognizing the word. Indirectly, this interval depends on the number of syllables in the word (hence the term "syllabic features"), but its determination should also take into account various parasite vocals occurring in the initial and final parts of some words, as well as of the instances where two vocals, though separated, say, by a glide, may be recognized as one.

The system preferably uses 4 syllabic features $p_1, p_2, p_3, p_4$. For any word, the value of $p_i$ is 1 if the number of vocal parts detected in the fragment of the wave representing this word during the recognition process is j=i (for i=4, j≧4). The set of the values of all the features $p_i, \ldots, p_4$ specifies the interval $[a_1, a_2]$, including the number of the vocal parts detected when recognizing the word in question.

During the recognition process, the system also determines some interval $[b_1, b_2]$ that includes the actual number of the vocal parts, and selection of the subset of dictionary words for further analysis is governed by the principle that word $w_i$ is added to this subset only on condition that the intervals $[a_1^i, a_2^i]$ and $[b_1, b_2]$ for $w_i$ overlap.

Elementary Acoustic and Phonemic Features

An acoustic or a phonemic feature is designated as "elementary" if its definition mentions exactly one acoustic event or one phoneme. Thus, e.g., the features corresponding to the questions: "Does the word have a burst?" or "Does the word contain a phoneme (i.e., a segment, if we consider the fragment of the wave) which can be recognized as phoneme A or phoneme O?" are elementary.

The following features are treated as elementary:
(i) acoustic features related to:

ea1) noise;

ea2) burst;

ea3) pause;

ea4) burst with a prothetic schwa at the end of the word;

(ii) phonemic features related to:

ep1) phoneme Z or S;

ep2) phoneme CH or SH;

ep3) phoneme R;

ep4) phoneme I or E;

ep5) phoneme E;

ep6) phoneme A;

ep7) phoneme I;

ep8) phoneme A or O;

ep9) phoneme O;

ep10) phoneme O or U;

ep11) phoneme A or U;

ep12) phoneme U or I;

ep13) phoneme AI.

As discussed above, elementary features are assigned the values "True", "False " or "Don't Know", meaning respectively, that the corresponding acoustic event or phoneme definitely occurs in the word under scrutiny; that it definitely does not occur in this word (or in the wave fragment); or that one cannot say anything definite about its occurring or not.

The value of each elementary feature $t_i$ is computed separately for each rough phoneme, for rough pronunciation of each word of the dictionary (during its compilation), and for each segment of a split (during the recognition process). Then the value of this feature for the whole word or for the wave fragment corresponding to one word is assumed to be: "True", if $t_i$="True" for some i; "False", if $t_i$="False" for all I; and "Don't Know", if neither of the previous conditions holds.

Complex Acoustic and Phonetic Features

An acoustic or a phonemic feature is designated as "complex", if its definition mentions more than one event or phoneme. An example of a complex feature is the feature corresponding to the question: "Does the word has a burst after a noise (not necessarily immediately after, but after anyway)?" One preferred embodiment of the system contemplates using the following complex features:

(i) acoustic features:
    ca1) noise, vocal;
    ca2) vocal, noise;
    ca3) noise, vocal, noise;
    ca4) noise, vocal, pause;
    ca5) vocal, noise, vocal;
    ca6) vocal, gap, vocal (following one another);

(ii) phonemic features:
    cp1) R, Z or S;

(iii) mixed features:
    cm1) Z or S, vocal, Z or S;
    cm2) Z or S, vocal, noise;
    cm3) Z or S, vocal;
    cm4) R, noise;
    cm5) R, pause;
    cm6) R, noise or pause, vocal;
    cm7) noise, vocal, Z or S;
    cm8) noise, R;
    cm9) vocal, Z or S;
    cm10) I or E, noise;
    cm11) E, noise;
    cm12) R, noise or pause, I or E;
    cm13) I or E, noise or pause, R;
    cm14) R, noise or pause, E;
    cm15) E, noise or pause, R;
    cm16) R, noise or pause, A or O;
    cm17) A or O, noise or pause, R;
    cm18) R, noise or pause, O or U;
    cm19) O or U, noise or pause, R;
    cm20) R, noise or pause, AI;
    cm21) AI, noise or pause, R;

The value of a complex feature is "True", if for some subsequence of the sequence P of rough phonemes (or wave segments) all corresponding elementary features assume the value "True". The value of a complex feature is "False", if for each subsequence of P there is at least one elementary feature that is assigned the value "False". The value of a complex feature is "Don't Know", if neither of the two above conditions holds.

8.6 Construction of the Dictionary

The partitioning of the main dictionary is performed during its construction. A vector of 0's, 1's and −1's is generated for each record in the dictionary, and then compared, coordinate by coordinate, with previously constructed vectors for other words in the dictionary. If no equivalent vector is found among them, the current vector is added to a set of accumulated dissimilar vectors, and a new orbit is generated (in which the current record is the first and so far the only element). If the current vector is equal to a previously constructed one, the current record is added to the already existing orbit.

From the implementation point of view, since the main dictionary may contain many orbits (from tens to hundreds of thousands, depending, for example, on the dictionary size, the set of features, and the set of elementary acoustic events), and each orbit has a corresponding ternary vector, the construction of the dictionary may take considerable time unless special measures, described hereinafter, are taken.

First, only packed vectors are stored and compared. Two bits are employed to store the value of each feature, so a vector of n coordinates can be recorded in $(n+3)/4$ bytes. In addition, the search time for vector comparison may be substantially decreased by ordering the storage of the set of vectors. For example, new vectors may be recorded in a buffer according to a data structure by which references to the buffer correspond to one and only one orbit. These data structures comprise another buffer, which is ordered according to the lexicographic order of the binary vectors to which they point.

By means of logarithmic search in the ordered part of the buffer assigned to the data structures, a structure corresponding to the least of the vectors higher than the current one or equal to it (such will be always found if a fictitious structure is added pointing at the binary vector of all ones) is sought. If the found structure points at a vector equal to the current one, the search is over (that orbit already exists); otherwise the search continues.

Further searching takes the form of consecutively scanning those binary vectors that are pointed at by the structures interconnected by a bi-directional list, whose root is the structure found at the first stage, and ordered in this list according to lexicographic descending order of vectors at which they point. If the list is empty, or has been exhausted, or the next comparison shows that the desired vector became higher than that with which it was compared, then the current set does not contain the desired vector. The current vector is therefore recorded in the vector buffer and a new data structure is added to the bi-directional list. If a comparison operation finds equality with one of previously constructed vectors, the comparing work is finished.

If it is necessary to add a new data structure and the resulting number of structures becomes equal to $2^n$, or if in the course of dictionary construction the last structure was processed, then the buffer must be reordered. By means of $O(2^n)$ operations, the structures lying in the buffer are reordered according to the lexicographic order of binary vectors which are pointed at by those structures. At the same time, the above-mentioned bi-directional lists, connected with those structures, become empty.

If the processing of the dictionary records is not complete, then, since the length of the ordered part of the buffer has doubled, and algorithmic search is applied to it, and the efficiency of the search, as a whole, increases. Although the above described method increases, theoretically, with the square of the number of the vectors being ordered, applicants experiments have shown a reduction in ordering time about one hundred fold over working with a single list.

9.0 LEXICAL ACCESS

Figure 8:
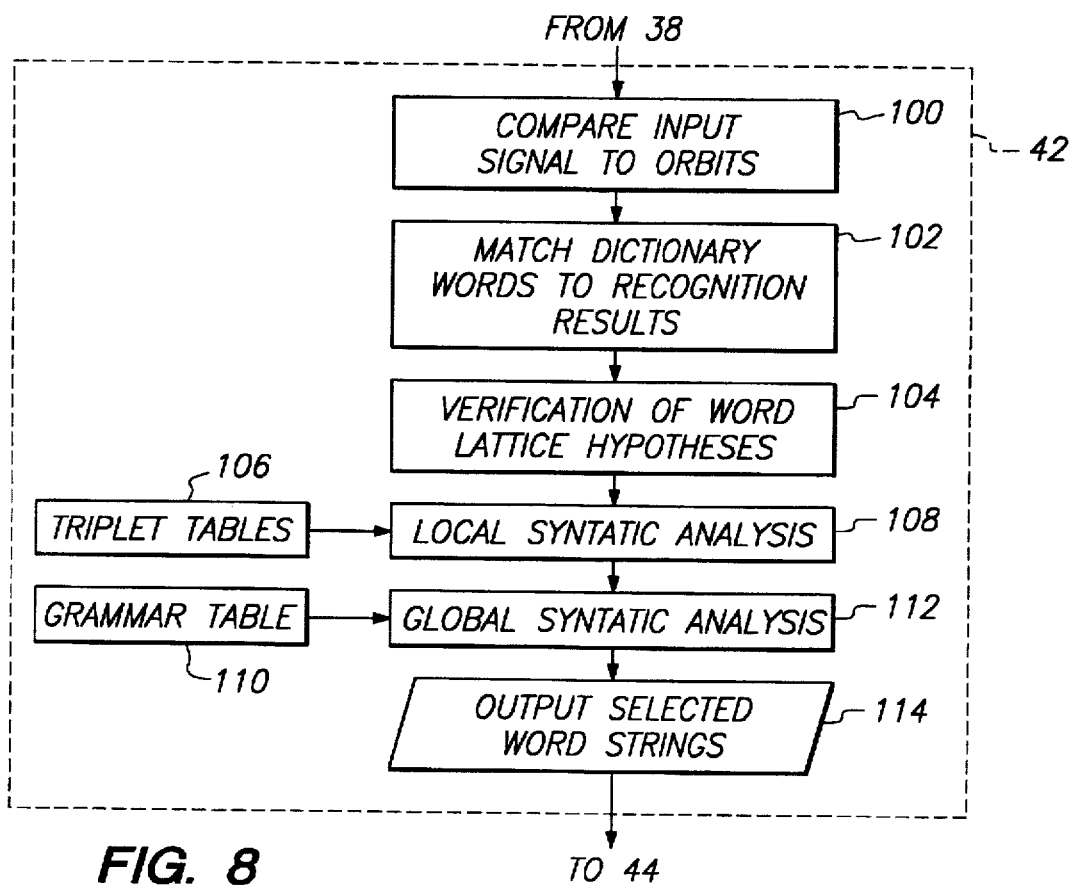
FIG. 8 is an illustrative flow diagram of the lexical access method steps of the speech recognition system of the present invention.

Referring now to FIGS. 3 and 8, the lexical access step of the recognition system of the present invention is described. An initial phase of lexical access employs as its inputs (1) a vector including: the rough acoustic events transcription of the input signal and the frame spectral characteristics computed during rough split step 34, the formant tracks generated during step 35, certain positively identified phonemes such as fricative noises, retroflex /r/ and the phoneme garland hypotheses from fine split step 38 and (2) the orbits defined by phonetic/acoustic event transcriptions.

9.0.A Calculation Of Acoustic Features

The smoothed spectrum and its characteristic points are analyzed to form a number of features used for preliminary filtering of the words selected for recognition. The features reflect the presence or absence of vowels and the glide /r/ in vocal segments, and the presence or absence of the phonemes /s/, /z/, /ch/, and /sh/ in noise segments.

Features of Vocal Segments

The vocals segments under consideration are those having relatively great length and sufficient relative energy. Such a segment may indicate the presence of a vowel or the glides /r/ or /l/. The vowel features are formed for the "phonemic classes" u, o, a, e, i approximately corresponding to the phonemes /uw/, /ao/, /aa/, /ae(eh)/ and /ih(iy)/. These features make it possible either to assume that a certain phoneme (or one of those adjacent to it in $F_1, F_2$ plane) is present in the segment in question, or, contrariwise, to negate the presence of a certain phoneme in the given position. Such features are formed based on an estimate of the position of the first and the second formants. As glide /l/ is difficult to distinguish at this stage from the vowels /uw/ and /ow/, there is no separate feature for /l/. The glide /r/ and the vowel /er/ differ from the usual vowels in the behavior of the third formant (it is located low and is close to the second formant). For these phonemes, the feature R is formed.

When forming features for a vocal segment, the height of the first and second formants is estimated, based on characteristic points. For the estimate of the first formant, we take the set of characteristic points of type $F_1$ in the given segment is used to compute the median $iF_1$ of the coordinates i of these points. Similarly, for the second formant, $iF_2$ is computed. The values of $iF_1$ and $iF_2$ are integer numbers of units, and one unit corresponds approximately to 43 Hz at the input frequency 22050 Hz.

For each feature, a region on the plane ($iF_1$, $iF_2$) is determined where this feature assumes the value "Yes", and boundaries are established beyond which it assumes the value "No". As these regions overlap for adjacent features, there are special features, like AO (A or O), formed for the areas of their overlapping.

The feature R is formed separately and its formation precedes that of the vowel features, because if judged by the first two formants only, this feature could be mistaken for one of the features indicating vowels. Analysis of the feature R involves considering the set of characteristic points of type $F_3$ in the given segment and computing a number of parameters. One of these is the median of the differences $iF_3-iF_2$, computed for the frames where both $iF_2$ and $iF_3$ exist. If a sufficient number of points of type $F_3$ are located below the threshold 2153 Hz, while the median of the differences $iF_3-iF_2$ is less than the threshold 430 Hz, and, moreover, the point ($iF_1, iF_2$) is located within the region (430–689, 1033–1722), the feature R is assigned the value "Yes". In this case the vowel features are not analyzed and all of them are assigned (for this segment) the value "No". If some of these conditions hold, while some others hold only for reduced values of the thresholds, the feature R can be assigned the "DontKnow" value. In this case the analysis of the vowel features may also be performed.

Features of Noise Segments

To form the features for the phonemes /s/, /z/, /ch/, and /sh/ in a noise segment, the distribution of the spectrum energy by frequencies is analyzed. For each segment, the values of five variables are computed: $F_{10}, F_{25}, F_{50}, F_{75}, F_{90}$, where $F_p$ is defined as the frequency such that p% of the spectrum energy in the segment is located below that frequency. On the whole, the features in question are formed based on the analysis of $F_{50}$: for the phonemes /s/ and /z/ its value is high, while for the phonemes /ch/ and /sh/ it is low. As it is not always that similar phonemes can be distinguished in this way, there are also such features as S, S or Z, CH or SH.

For each of the features in question, an additional check is performed on the remaining four of the five variables, ascertaining whether some of them (and, in some cases, their pairwise differences) are located within the following limits:

Feature /s/ is assigned the value "Yes" if:
$F_{50} \geq 6287, F_{25} > 3100, (F_{50}-F_{25}) < 3445;$ Feature /s/or /z/ is assigned the value "Yes" if:
$4306 < F_{50} < 6287, F_{25} > 3100;$ Feature /ch/ or /sh/ is assigned the value "Yes" if:
$2153 < F_{50} < 3359, (F_{50}-F_{25}) < 1291, F_{90} < 7751, 1550 < (F_{75}-F_{25}) < 2583.$

9.1 Comparison of the Input Speech Signal to Orbits

In this initial lexical access stage, step 100, the rough acoustic event transcription for the input speech signal is compared to one or more orbits of vocabulary acoustic event transcriptions. Only the words in those orbits for which the rough acoustic transcription either matches the acoustic event transcription (or it is uncertain whether it does) are considered in the next stage of lexical access; words in orbits for which there is no match are not considered further. In particular, during recognition of the input speech segment corresponding to a current word, the acoustic information related to each feature is analyzed and a feature value is calculated. If this information indicates that a particular feature is present, the value of the vector coordinate corresponding to that feature becomes 1 or −1, respectively. If the information is ambiguous, i.e., can be interpreted as either the presence or absence of the feature, the value of the feature is considered indefinite and the vector coordinate becomes 0.

With the constructed vector $v=(v_i)$ for the input speech signal, the set of vectors (orbits) obtained during the main dictionary construction may be addressed. The words selected as possible candidates corresponding to the input speech signal are only those words which belong to orbits whose vectors: (a) have any i-th coordinate value equal to 1 or 0, if $v_i=1$; (b) have any i-th coordinate value equal to −1 or 0, if $v_i=-1$; or (c) have an arbitrary value of any i-th coordinate, if $v_i=0$. If a word has an acoustic word vector not meeting the above criteria, then that word is not considered further.

Since the vectors characterizing the orbits have fixed attributes, it is possible to organize the calculations for orbit selection so that the overwhelming majority of the orbits is not even considered during each selection. From the implementation point of view, this is accomplished in a preferred embodiment of the invention by creating an additional index array when loading the dictionary index into the memory. In this additional array, every i-th feature is characterized by two corresponding sequences of references: one for each possible value of this feature, i.e., 1 or −1. The length of each such sequence is equal to the number of orbits in the dictionary, while the value $p_j$ of its j-th element is equal to the number of orbits to be skipped before reaching the nearest orbit having a vector whose i-th coordinates comply with the conditions discussed hereinabove, or to some large number (for example, the total number of dictionary orbits) if there is no such nearest orbit. Thus, if $p_j=0$, then the j-th orbit already complies with those conditions.

Using the above index array, the selection of the necessary orbits proceeds as follows. In the constructed index array, chains corresponding to non-zero values of coordinates of the input speech signal vector $v=(v_i)$ are marked. Then, by examining the marked chains, the j-th element of the next chain is added to the current orbit number. (When searching for the first orbit, the initial j=0; when searching for an orbit following the k-th selected one, the initial j=k+1). This cycle is repeated as long as it changes the value of j, and this value remains less than the total number of dictionary orbits. If, at the conclusion of the cycle, j remains less than the total number of dictionary orbits, j is considered the number of the next orbit; otherwise no further orbits are needed.

Applicants have also developed some methods of assessing the efficiency of the above-described system in extracting out of the dictionary of the shortest possible list of transcriptions for further analysis containing at least one transcription of a "correct" word choice corresponding to the input speech signal. In particular, this evaluation technique looks at the contribution of the phonetic and acoustic in this process, since these features play a major role in partitioning the dictionary into orbits. To construct this evaluation for a feature, the following numbers are defined:

- $a_i$ (i=1,−1,0) is the share of dictionary records for which the feature adopts "TRUTH" or "FALSE" values, or an undefined value;
- $b_i$ (i=1,−1,0) is the share of "PRESENT" or "ABSENT" answers or indefinite answers, that the recognition system gives during repeated use, in the course of processing a large body of test material to determine whether a feature is present.

Then by definition:

$$a_1+a_0+a_{-1}=b_1+b_0+b_{-1}=1,$$

and $a_1$(or $a_{-1}$) is the share of dictionary records that are rejected when the feature is deemed present (or absent). Given the empirical probabilities $b_{-1}$ and $b_1$, respectively, the rejected share of the main dictionary will be, in the average, $M_j=a_1b_{-1}+a_{-1}b_1$. Thus, $M_j$ may be considered a "feature efficiency measure" and therefore taken into account when deciding whether or not to include an additional feature into the list of features which determines the partitioning of the dictionary, for example, when revising the list of above-described phonetic/acoustic features modeled by the recognition system, by deleting some features and adding some new ones.

9.2 Matching Dictionary Words To Recognition Results

A candidate word list results from comparison of the input speech signal acoustic vector to the orbits in step 100, with every word in a selected orbit representing a possible word choice. In step 102, a comparison between the phonetic transcription and the input speech signal acoustic vector (referred to hereinafter as "the recognition results") is then used to select words from the list which have maximum correspondence to the input speech signal.

Let S be a sound wave fragment corresponding to one pronounced word. As a result of the segmentation procedure, this fragment will be cut into segments $\{s_i\}$, each representing an i-th phoneme-related acoustic segment (PRAS). The result of the recognition of an i-th PRAS in the current word is an ordered list of phoneme-related acoustic segments $\{p_j^i\}$ with their scores $\{v_j^i\}$. Let $W=\{w_k\}$ be a list of words obtained by implementing the procedure described in Section 9.1 above as candidates for the recognition of a wave fragment. Each word $w_k$ is given a score $t_k$ so that in the list W of words ranked by their scores, the correct word is as close to the beginning as possible. The score $t_k$ of a word $w_k$ is compiled from several items (bonuses or penalties) which are given, in one preferred embodiment of the invention, by matching, formant weighing, and verification procedures or "oracles".

Matching is a procedure which, according to certain rules ("Matching Rules"), establishes the correspondence between each dictionary phoneme $a_k$ participating in the phonemic transcription of the word w, and some of the phonemes belonging to the set $\{p_j^i\}$.

The "Matching Rules" contain:

1. a rule of existence: any dictionary phoneme $a_k$ will be matched to at least one PRAS from one of the $p^i$ sets;
2. a rule of uniqueness: each dictionary phoneme $a_k$ will be matched to one and only one string of phoneme-related acoustic segments $p_a^{i^0}, p_a^{i^1}, \ldots, p_a^{i^l}$ in which $p_a^n \epsilon p^{i^*+n}$ for some $i^*$ if $1 \leq n \leq l$ (this rule is based on a natural assumption of continuous articulation of an $a_k$ phoneme);
3. a rule of sequence: if phonemes $a_k$ and $b_{k+1}$ are matched to recognized phonemes $p_a^i$ and $p_b^j$, then $i \leq j$ (natural assumption of ordered articulation of phonemes in a word).

The above-described matching procedure may be represented graphically. Suppose, a sound wave fragment S has been segmented into m phoneme-related acoustic segments, and it is to be matched it with a word w consisting of n dictionary phonemes. After complementing, formally, both the dictionary phonemic string and the string of phoneme-related acoustic segments with the signs of beginning and end of word, a graph G=(V,E) may be specified with a set of vertices $V=\{v_{ij}\}$ marked by pairs (i,j): $0 \leq i \leq n+1, 0 \leq j \leq m+1$ and a set of directed edges E connecting only pairs of vertices:

$(v_{ij}, v_{ij+1})$—horizontal edges $(v_{ij}, v_{i+1,j})$—vertical edges $(v_{ij}, v_{i+1,j+1})$—diagonal edges Each matching complying with the above mentioned matching rules will correspond to a path in that graph from vertex $v_{0,0}$ to vertex $v_{n+1,m+1}$, and each edge of this path will emerge from a vertex having at least one index less by one than the corresponding index of the vertex to which this edge comes. Each path from $v_{0,0}$ to $v_{n+1,m+1}$ will also correspond to a matching.

A penalty (matching penalty) is imposed on each mapping of the phonemes $\{a_1, \ldots, a_n\}$ of a word w on the set $\{p_j^i\}$ according to the above-described matching rules. The optimal mapping for each word will correspond to a minimum penalty for that word, or in terms of graph theory, the minimal cost path in the graph G is sought. The penalty for the whole path is defined as the sum of the penalties for passing across certain vertices of the graph. However, for clarity, it is supposed that the penalty for passing across each vertex depends, generally, on both by which edge to this vertex was arrived at and by which edge the path departed. It also depends upon the recognition score $v_j^i$ of the PRAS to which the current dictionary phoneme is matched.

The procedure of forming penalties for passing across vertices $v_{ij}$ of graph G consists of two stages. On the first stage, all 9 penalties (corresponding to all possible ways of passing across the vertex: coming by three edges and leaving by three edges) are equal to the minimum of $t(a_i, p_k^j)+v_0^j-v_k^j$ when $1 \leq k \leq K$, while the value of K is predetermined (phonemes beyond the K-th place are not considered). The number $t(a_i, p_k^j)$ determines the measure of resemblance between phonemes $a_i$ and $p_k^j$, and depends, generally, on objective circumstances such as the articulatory resemblance of the phonemes and subjective circumstances such as the frequency of misrecognition of one phoneme for the other by the recognition mechanisms.

The above-mentioned penalties neither depend on the articulatory context nor on the recognition context (particularly on the phonemic segmentation). To account for these contexts, before undertaking the search for the minimal cost path in the graph, some penalties for passing across a vertex are corrected by lowering them in order to compensate for split diphthongs, for bursts separated from their closures, and for interphonemic transitions misrecognized as separate phonemes.

Some context-independent penalties are raised in order to account for the influence of some robust boundaries (horizontal penalties), and to avoid non-feasible paths. For example, paths going through long vertical branches correspond to matching several dictionary phonemes to one PRAS. If the segmentation process always finds the boundary between two certain acoustic phonemes, then the corresponding penalty should be made very big so that many erroneous recognition solutions be rejected.

The search algorithm for the minimal cost path is a one-pass efficient algorithm with the working time of O(mn). For any pair of phonemes $P_1$ and $P_2$, the basic (context-independent) penalty for matching phoneme $P_1$ to phoneme $P_2$ is defined as the distance $d(v_1, v_2)$ between the corresponding vectors from Table 2 (below). Table 2 shows phonemes as feature vectors based on the features given in Table 1. This distance is calculated by the following formula:

$$d(v_1, v_2) = \sum_{i=1}^{37} c_i * \mu(v_1^i, v_2^i),$$

where $$\mu(v_1^i, v_2^i) = \begin{cases} 0 & \text{if } v_1^i = v_2^i \\ \gamma & \text{if } v_1^i = * \text{ or } v_2^i = * \text{ and } v_1^i \neq v_2^i \\ 1 & \text{otherwise} \end{cases}$$

$c_1, \ldots, c_{37}$ and $\gamma$ are subject to further optimization. The initial value of $\gamma$ is set to 0.1. Initial values of $c_i$ are defined in Table 1. Then, by using the results of the whole recognition system testing, corresponding optimal values for $c_1$ to $c_{37}$ and $\gamma$ can be found by means of maximizing th following function $$F(C,N) = \frac{1}{n} \sum_{i=1}^{n} \lambda_i$$

where n is the number of pronounced words submitted to recognition; $\lambda_i$ is equal to 1 if at the given i the correct word is found among the first N words in the list of the recognized words; otherwise it is equal to 0.

TABLE 1

| Phonemic and Acoustic Features |
|---|
| A. Phonemic Features |
| 1. Voicing |
|     1.1 Vocal |
|     1.2 Vowel |
|     1.3 Voiced |
| 2. Manner of articulation |
|     2.1 Stop |
|     2.2 Flap |
|     2.3 Fricative |
|     2.4 Affricate |
|     2.5 Nasal |
|     2.6 Glide |
| 3. Place of articulation |
|     3.1 Labial |
|     3.2 Alveolar |
|     3.3 Dental |
|     3.4 Palato-alveolar |
|     3.5 Velar |
|     3.6 Retroflex |
|     3.7 Palatal |
| 4. Height |
|     4.1 High |
|     4.2 Middle |
|     4.3 Low |
| 5. Backness |
|     5.1 Front |
|     5.2 Middle |
|     5.3 Back |
| 6. Length |
|     6.1 Long |
| 7. Labialization |
|     7.1 Labialized |
| 8. Diphthongs |
|     8.1 Diphthongs |
|     8.2 Monophthongs |
|     8.3 Ascending diphthongs |
|     8.4 Descending diphthongs |
| B. Acoustic features |
|     9.1 Voice |
|     9.2 Bad Voice |
|     9.3 Pause |
|     9.4 Gap |
|     9.5 Burst |
|     9.6 Noise |
|     9.7 High-frequency vocal |
|     9.8 High-frequency noise |
|     9.9 Strong noise |

TABLE 2

TABLE 2-continued

TABLE 2-continued

Phoneme Vectors

| NN | 1 1 | 1 2 | 1 3 | 2 1 | 2 2 | 2 3 | 2 4 | 2 5 | 2 6 | 3 1 | 3 2 | 3 3 | 3 4 | 3 5 | 3 6 | 3 7 | 4 1 | 4 2 | 4 3 | 4 5 | 5 2 | 5 3 | 6 1 | 7 1 | 8 1 | 8 2 | 8 3 | 8 4 | 9 1 | 9 2 | 9 3 | 9 4 | 9 5 | 9 6 | 9 7 | 9 8 | 9 9 |
|---|---|---|---|---|---|---|---|---|---|---|---|---|---|---|---|---|---|---|---|---|---|---|---|---|---|---|---|---|---|---|---|---|---|---|---|---|---|
| iy | 1 | 1 | * | 0 | 0 | 0 | 0 | 0 | * | 0 | 0 | 0 | 0 | 0 | 0 | * | 1 | 0 | 0 | 1 | 0 | 0 | 0 | 0 | * | * | 1 | 0 | 1 | * | 0 | 0 | 0 | 0 | 1 | 0 | 0 |
| ih | 1 | 1 | * | 0 | 0 | 0 | 0 | 0 | 0 | 0 | 0 | 0 | 0 | 0 | 0 | * | 1 | * | 0 | 1 | 0 | 0 | 0 | 0 | 0 | 1 | 0 | 0 | 1 | * | 0 | 0 | 0 | 0 | * | 0 | 0 |
| eh | 1 | 1 | * | 0 | 0 | 0 | 0 | 0 | * | 0 | 0 | 0 | 0 | 0 | 0 | * | * | 1 | * | 1 | 0 | 0 | 0 | 0 | 1 | 1 | 1 | 0 | 1 | * | 0 | 0 | 0 | 0 | * | 0 | 0 |
| ey | 1 | 1 | * | 0 | 0 | 0 | 0 | 0 | * | 0 | 0 | 0 | 0 | 0 | 0 | 0 | 1 | 0 | 0 | 1 | 0 | 0 | 0 | 0 | 0 | 1 | 0 | 0 | 1 | * | 0 | 0 | 0 | 0 | 1 | 0 | 0 |
| ae | 1 | 1 | * | 0 | 0 | 0 | 0 | 0 | 0 | 0 | 0 | 0 | 0 | 0 | 0 | 0 | 0 | * | 1 | 0 | 1 | * | 0 | 0 | 0 | 1 | 0 | 0 | 1 | * | 0 | 0 | 0 | 0 | 0 | 0 | 0 |
| ah | 1 | 1 | * | 0 | 0 | 0 | 0 | 0 | * | 0 | 0 | 0 | 0 | 0 | 0 | 0 | 0 | * | 1 | 0 | 1 | * | 0 | 0 | 1 | * | 0 | 0 | 1 | * | 0 | 0 | 0 | 0 | 0 | 0 | 0 |
| aa | 1 | 1 | * | 0 | 0 | 0 | 0 | 0 | * | 0 | 0 | 0 | 0 | 0 | 0 | 0 | 0 | * | 1 | 0 | 1 | * | 0 | 0 | 0 | * | 1 | 1 | 1 | * | 0 | 0 | 0 | 0 | 0 | 0 | 0 |
| aw | 1 | 1 | * | 0 | 0 | 0 | 0 | 0 | * | 0 | 0 | 0 | 0 | 0 | 0 | 0 | * | * | * | 0 | * | 1 | * | * | 1 | 0 | 0 | 0 | 1 | 0 | 0 | 0 | 0 | 0 | 0 | 0 | 0 |
| ay | 1 | 1 | * | 0 | 0 | 0 | 0 | 0 | * | * | 0 | 0 | 0 | 0 | 0 | 0 | 0 | * | 1 | 0 | 1 | 1 | 1 | 1 | 1 | 0 | 1 | 0 | 1 | 0 | 0 | 0 | 0 | 0 | 0 | 0 | 0 |
| ao | 1 | 1 | * | 0 | 0 | 0 | 0 | 0 | * | * | 0 | 0 | 0 | 0 | 0 | 0 | * | * | * | 0 | * | 1 | * | 1 | 0 | 1 | 0 | 0 | 1 | 0 | 0 | 0 | 0 | 0 | 0 | 0 | 0 |
| oy | 1 | 1 | * | 0 | 0 | 0 | 0 | 0 | * | * | 0 | 0 | 0 | 0 | 0 | 0 | 0 | 0 | 1 | 0 | * | 1 | 1 | 1 | 0 | 1 | 0 | 0 | 1 | 0 | 0 | 0 | 0 | 0 | 0 | 0 | 0 |
| ow | 1 | 1 | * | 0 | 0 | 0 | 0 | 0 | * | * | 0 | 0 | 0 | 0 | 0 | 0 | 1 | 1 | 1 | * | 0 | 1 | 0 | 1 | 0 | 1 | 0 | * | 1 | 0 | 0 | 0 | 0 | 0 | 0 | 0 | 0 |
| uh | 1 | 1 | * | 0 | 0 | 0 | 0 | 0 | 0 | * | 0 | 0 | 0 | 0 | 0 | 0 | 0 | * | * | * | * | * | * | * | * | 0 | 1 | * | 1 | * | 0 | 0 | 0 | 0 | 0 | 0 | 0 |
| uw | 1 | 1 | * | 0 | 0 | 0 | 0 | 0 | 0 | * | 0 | 0 | 0 | 0 | 0 | 0 | 0 | * | 0 | 0 | 0 | 0 | 0 | 0 | * | 1 | 0 | * | 1 | 0 | 0 | 0 | 0 | 0 | 0 | 0 | 0 |
| ux | 1 | 1 | * | 0 | 0 | 0 | 0 | 0 | * | * | 0 | 0 | 0 | 0 | 0 | 0 | 0 | 1 | 0 | 0 | 0 | * | 1 | * | * | * | 0 | * | 1 | * | 0 | 0 | 0 | 0 | 0 | 0 | 0 |
| er | 1 | 1 | * | 0 | 0 | 0 | 0 | 0 | * | 0 | 0 | 0 | 0 | 0 | 0 | 0 | 0 | * | 0 | * | * | 0 | 1 | 1 | * | 1 | 0 | 0 | 1 | * | 0 | 0 | 0 | 0 | 0 | 0 | 0 |
| ax | 1 | 1 | * | 0 | 0 | 0 | 0 | 0 | 0 | 0 | 0 | 0 | 0 | 0 | 0 | 0 | 0 | * | 0 | 0 | * | * | 0 | 0 | 0 | 1 | 0 | 0 | 1 | 0 | 0 | 0 | 0 | 0 | 0 | 0 | 0 |
| ix | 1 | 1 | * | 0 | 0 | 0 | 0 | 0 | 0 | 0 | 0 | 0 | 0 | 0 | 0 | 0 | 0 | * | 0 | 0 | * | * | 0 | 0 | 0 | 1 | 0 | 0 | 1 | 0 | 0 | 0 | 0 | 0 | 0 | 0 | 0 |
| axr | 1 | 1 | * | 0 | 0 | 0 | 0 | 0 | * | 0 | 0 | 0 | 0 | 0 | 0 | 0 | 0 | 1 | 0 | 0 | * | 0 | 0 | 0 | 0 | 1 | 0 | 0 | 1 | 0 | 0 | 0 | 0 | 0 | 0 | 0 | 0 |
| ax–h | * | * | * | 0 | 0 | * | 0 | 0 | 0 | 0 | 0 | 0 | 0 | 0 | 1 | 0 | 0 | * | * | 0 | * | * | 0 | 0 | 0 | 1 | 0 | 0 | 1 | 0 | 0 | 0 | 0 | 0 | 0 | 0 | 0 |

LEGEND FOR TABLE 2:
NN - numbers of features as given in Table 1
pau - pause
bew - sign of beginning or end of a word
Upper case letters - dictionary phonemes
Lower case letters - acoustic phonemes (PRAS - phoneme-related acoustic segments)

As a result of the word sieve, it is expected that the candidate word list output from the comparison of the recognition results to the dictionary orbits will have been reduced at least by an order of magnitude for some words, while only one word choice will remain for other words. The output of the word sieve is thus a string of words ("word garland") with one or more word choices specified for each word of the garland.

9.3 K-Best Recognizer for Frequent Words

A special word recognizer, referred to as a "K-best word recognizer," is used in addition to the regular lexical access to decrease the error rate for frequent words. This recognizer takes as its input a signal representative of the input speech signal, builds a 70-dimensional vector including 70 spectral features of the utterance (similar to the phoneme recognizer) and finds the K-best points (nearest to the given one) in the space of precalculated vectors. The output of the special recognizer is a sequence of the words which correspond to these K-best vectors.

9.3.A Creation of the K-Best Recognizer Oracle

A database of isolated speech, containing 5000 sentences uttered by 15 speakers, was used to create the oracle for this recognizer. First, each sentence in the speech database was automatically split into words. Words that have been pronounced less than ten times in this corpus were discarded. For each word a 70-dimensional feature vector was calculated comprising the following features: 14 melcepstrum coefficients for the first third of the word averaged over its frames; 14 melcepstrum coefficients of the second third of the word averaged over its frames; 14 melcepstrum coefficients of the last third of the word averaged over its frames; 13 delta melcepstrum coefficients of the first frame of the word; 13 delta melcepstrum coefficients of the last frame of the word; phoneme duration; and zero crossings. This makes a codebook of named points in 70-dimensional space, where the names correspond to lexical words.

9.3.B Recognition Stage

The calculation of a 70-dimensional vector for an utterance in the input speech signal is performed using features described below. Using the Euclidean distance between the vector constructed for the input speech signal and the vectors in the oracle as a metric, the K nearest (K-best) vectors from oracle are found, where K=20. The word hypotheses are those words which correspond to these K-best vectors. The weight of each word is the number of vectors for this word plus a possible bonus if the nearest vector in the space corresponds to this word. The final step of this word recognizer applies the comparison of the acoustic features of the utterance to the dictionary orbits which contain the words from the result. A word is rejected if its weight is less then (K+1)/2 and no one of the orbits containing it corresponds to the acoustic features of the utterance.

9.3.C Using of Results of K-best Word Recognizer

A special procedure is used to join results of the K-best word recognizer and the regular word recognizer. The penalties for the words from the regular word recognizer are shifted so that the penalty for the best word is equal to 1. The penalties for the words from the K-best word recognizer are calculated using formula c+a/(x+b), where x is weight given by the K-best word recognizer. Coefficients a,b,c are selected so that the penalty 1 corresponds to weight K, penalty 2 corresponds to K/2−1, and penalty 6 corresponds to 1. If a word belongs to one of the two sources, it takes the weight from that source. If a word belongs to both sources, its weight is calculated as:

(weight1*weight2)/(weight1+weight2).

10. VERIFICATION

The previous steps of the recognition process create a word garland for every considered acoustic word and a mapping of the sequence of the dictionary phonemes to the sequence of segments created during the fine split step. The goal of verification step 104 is to estimate the correctness of the mappings. Five independent methods for performing this evaluation are employed:

1. An estimator of the mapping with respect to the comparative duration of the mapped phonemes and their energy parameters;
2. An estimator of the presence of a burst at the beginning the word;
3. An formant analysis based on triphon statistics;
4. An formant analysis based on the behavior of the formants; and
5. An phoneme per frame image mechanism.

Every method gives its own estimation weight for each of the mappings. The resulting total estimation weight is a function of the five weights given by the individual methods and the weight that was assigned to the mapping during its creation. The total estimation weighting function is chosen in accordance with the quality of estimation of each of the methods and parameters derived for the function based upon the individual methods accuracy as observed the statistics of using a large set of testing material. The word garlands are then reordered with respect to the resulting estimation weights and given as input to the grammatical subsystem.

10.1 Estimator of the Mapping

The word mapping procedure may erroneously map an unstressed vowel in a dictionary word to a stressed vowel in the actually pronounced word and vice versa. On average, however, the length of a stressed vowel in a word is longer than the length of an unstressed one and the energy of the former is greater than the energy of the latter. Accordingly, an additional penalty is assigned to words which violate this rule.

First, the longest and the shortest vowels in the word are detected. Because in a word that is extremely long the above-mentioned rule is more likely to be incorrect, generally words having no more than four vowels or at most ten phonemes are analyzed. There also exist some special cases:

(i) if a phoneme before or immediately after a stressed vowel is a glide, then the length of the stressed vowel may be too short. Moreover, in this case the boundary between the vowel and the glide may not be evident. So, in this case, the glide is included into the length of the vowel. (ii) the final unstressed /i/ and /er/ in the word are excluded from consideration because in the words like "cases" or "manager" the last syllables may be prolongated and the unstressed vowel may be too long. The words with a final unstressed /I/ are not considered, while words with a final /er/ are considered, but with a larger penalty.

If an unstressed vowel is at least two times longer than a stressed vowel length and the energy of the unstressed vowel is larger than the energy of the stressed vowel by 0.5 dB then the mapped word is penalized.

Two additional checks may also be employed: 1) for an unstressed vowel preceding a stressed one the conditions are released by setting the thresholds of relative length and relative energy to 1; and 2) for a word ending in "-ing," if the length of /i/ is less than 1.5 of the length of /ng/ then the word is penalized.

10.2 Estimator of the Presence of Bursts

Unlike previously known speech recognition systems, which analyze bursts in a frequency domain, the method of the present invention analyzes bursts in the time domain.

Determining the burst type and its existence at the beginning of a word is based on the analysis of the proximity of the corresponding interval of the waveform to one of six possible "model bursts". Applicants have devised a classification of all bursts according to some distiguishing, detectable, characteristics specific to bursts. A subsequent weighting is based on how well the parameters calculated from the signal can be matched with those of the "model bursts".

The possible burst types used in applicants' classification scheme include:

"b"—Bursts of this type begin with a prolonged voiced pause and end with one, two or three triangles (half-periods of a pseudo-sinosoid) of a frequency in a range of 150–500 Hz. The frequency should not be less than that of the pitch or more than double the pitch.

"d"—D-bursts differ from b-bursts only in the frequency of the signal at the location of the burst itself. For d bursts, the frequency lies in an interval between 800 and 2700 Hz.

"g"—A g-burst is very similar to d-burst, but differs from the d-burst and b-burst, in the frequency and structure of the burst part of the signal. G-bursts occur with frequency in a range of 600–1700 Hz, and are distinguishable by a periodicity in the envelope of the waveform, i.e. the amplitude of the signal first makes a high jump, then it smoothly goes down, then jumps again, etc.

"p"—A p-burst may be of two types. The first type is characterized by the presence of a very powerful rise of energy at its beginning (as if the speaker sneezes before the microphone), and by a rather long pause of an indeterminate nature after the burst part of the signal. The burst in this interval may by so strong that its amplitude exceeds that of the vocal interval that follows. Sometimes intervals similarly notable for their energy level occur with t- or k-bursts, but in these cases the bursts are always accompanied with intervals characterized by noise and high energy levels having the frequency specific to these burst types. With p-bursts this is almost impossible. The second type of p-burst is distinguished by the presence of one or two "triangles" having a frequency in a range of 20–250 Hz (the upper boundary should not be more than 2.5 times higher than the frequency of the pitch) and followed by a pause. Very frequently, these low frequency/pause features are preceded by another one or two triangles with a frequency in a range of 1000–2000 Hz, which are usually comparable in amplitude with the main triangles of the burst.

"t"—A t-burst is characterized by a sufficiently long signal of a very high frequency, where the burst segment is followed by an obligatory pause. Generally, the envelope of the signal approximately parabolic. This pause is followed by compact groups of "triangles" having a frequency in a range of 2000–8000 Hz, each group including several or several dozens of triangles. This feature distinguishes a t-burst from the usual noise which often occurs in pauses after unvoiced bursts.

"k"—A k-burst is similar to a t-burst, with the exception that the frequency of its triangles is generally in a range of to 800–2500 Hz and the envelope is generally hyperbolic bears more resemblance to the function 1/x, because the energy of the first half of the burst part significantly exceeds that of its second half. For the k-burst, as well as for all the other voiceless bursts having an obligatory pause after the burst interval, the ratio of the energy of the signal in the burst interval of the segment to its energy over the segment as a whole is calculated without taking into account the last part of the segment, equal in length to the first vocal frame. The reason for this rule is that the boundary between the vocal segment and the one preceding it may be established with an error of one frame.

To determine burst type, it is first necessary to find the segment where the burst is to be detected. The burst is searched for over the span beginning from the first segment of the word, inclusive, up to the first vocal segment given by the segmentation procedure. While this procedure is not error-free, applicants have developed the following rules to minimize errors.

1) If a segment is too short (1–2 frames) and the following vocal segment is also short (3–5 frames), and the waveform within the vocal segment intersects zero less than 3 times per frame, then the vocal segment is added to the preceding segment, and it is assumed that a p-burst with a high energy level was mistaken for a vocal segment;

2) If a segment turns out to be very long (over 100 msec), and there is a sufficient number of segments (more than 2) in it, at least one of which represents a vocal pause with a high energy level or a glide, it is supposed that the segment is a vocal segment that was represented as a glide or a vocal pause (this occurs in words like "conditions" or "combined" where the speaker omits the initial schwa).

3) If (a) the energy of the signal in a pause before a word and (b) the energy of the signal between the rough word of the segmentation and the first segment are greatly different, and the pause has a lower energy level, it may be assumed that if the segment is short (1–2 frames), the segmentizer is likely to have misidentified, for example, a weak vocal pause before a voiced burst.

After the segment where a burst is to be searched for has been determined, the burst interval of the segment is located. This is done by selecting all triangles of the signal which correspond to specified frequency bands and have an amplitude no less than x% of the amplitude of the first three frames of the vocal segment following this burst. For b- and p-bursts, x is equal to 5, for other burst types it is equal to 2. All triangles that do not meet this requirement are set to zero. Then for the k- and t-bursts all triangles located separately are set to zero.

The resulting groups of triangles are then merged into one group constituting the burst part of the segment. The merging procedure is performed as follows: If the first and the second groups are not very far apart, i.e. the distance between them does not exceed the length of the larger one multiplied by a coefficient C determined by frequency, these groups are merged into one. The coefficient C is determined in the following way:

| Frequency F | Coefficient C |
| --- | --- |
| if F <= 1000 Hz, | then C = 2 |
| if 1000 Hz < F < 3000 Hz, | then C = 5 |
| if F >= 3000 Hz, | then C = 6 |

If the criterion for this merging step is not met, succeeding groups are considered two at a time (e.g., second and third and fourth, etc.). If, on the other hand, some groups have been merged, the process is repeated from the beginning until at least some groups have been. The remaining groups are those located too far apart, so the one having the greatest length and energy is chosen among them. This group is designated as the burst interval of the segment which is then selected for further analysis.

Next, for each of the bursts a comparison is made of their general parameters, such as the length of the pauses preceding and following the burst segment, the ratio of the energy level of the burst part of the segment to the energy level of the segment as a whole, the number of the triangles detected, etc., with the mean values of these parameters for each type of burst. The results of the comparison are used to form a weight for each burst. At this stage the individual peculiarities of the bursts are also taken into account. A complex modification of weights is then performed that is based on the following notions and rules.

Let it be assumed that the pseudo-sinusoid within a burst segment is a sequence of triangles (half-periods of the pseudo-sinusoid), and introduce the following symbols:

| | |
|---|---|
| WIPS | word-initial prevocalic segment |
| $L_{1,i}$, $i \in \{b,d,g,p,t,k\}$ | length of respective burst segment |
| $L_{bcl}$ | length of "bcl" segment |
| For any case, $0 \leq L \leq 1$, considering the WIPS as 1. | |
| $N_{i}, i \in \{b,d,g,p,t,k,bcl\}$ | number of triangles within a respective burst segment |
| $INT_{i}, i \in \{\text{"b-d"}, \text{"b-g"}, \text{etc.}\}$ | intersection in time of each pair out of "b,d,g,p,t,k,bcl" |
| $W_i, i \in \{b,d,g,p,t,k,bcl\}$ | weight of a respective burst |
| $A_i, i \in \{b,d,g,p,t,k,bcl\}$ | ratio between the amplitude of the highest triangle in a respective burst segment to the amplitude of the highest triangle in the first three frames of the following vocalic segment |
| $D_{1i}, i \in \{b,d,g,p,t,k,bcl\}$ | distance between the beginning of WIPS and the beginning of burst segment |
| $D_{2i}, i \in \{b,d,g,p,t,k,bcl\}$ | distance between the end of burst segment and the end of WIPS |

For each hypothetical burst ("b,d,g,p,t,k"), its location (boundaries) within WIPS are determined by taking all possible pairs out of the six in accordance with the following rules:

Rule 1 for the pair "t-k":

a)

if $W_t > W_i, i \in \{b,d,g,p,k\}$, and $N_t > 2N_k$
then $W_t = W_t + 1$ and $W_k = W_k - 1$;

if $W_t > W_i, i \in \{b,d,g,p,k\}$, and $N_t > 4N_k$
then $W_k = 0$ b)

if $W_k > W_i, i \in \{b,d,g,p,k\}$, and $N_k > 2N_t$
then $W_k = W_k + 1$ and $W_t = W_t - 1$;

if $W_k > W_i, i \in \{b,d,g,p,k\}$, and $N_k > 4N_t$
then $W_t = 0$

Rule 2 for the pair "b-d", or "d-g", or "b-g":

if $L_b > 2L_d$, and $INT_{b-d} > 0.7$
then $W_d = W_d - 1$

Rule 3 for the pair "b-p", or "d-p", or "b-p":

if $L_p < L_{bcl}/2$, and $INT_{b-d} > 0.7$, and $N_{bcl} > 5$
then $W_p = W_p - 1$ Rule 4 for the pair "t-b", or "k-b":

if $L_t > 0.5$, or $L_k > 0.5$
then $W_b = 0$

Rule 5 for the pair "k-p" or "t-p":

a)

if $A_p > 0.7$, and $INT_{k-p} = 0$, and $D_{2p} > 1 - D_{1k} - L_k$
then $W_k = 0$ b)

if $A_p > 0.7$, and $INT_{t-p} = 0$, and $D_{2p} > 1 - D_{1t} - L_t$
then $W_t = 0$ c)

if $L_k > 3L_p$, and $A_k = 1$
then $W_p = 0$ d)

if $L_t > 3L_p$, and $A_t = 1$
then $W_p = 0$

Rule 6 for the pair "d-t", or "d-k", or "g-t", or "g-k":

a)

if $N_t > 20$, and $N_t > 3 N_k$
then $W_g = 0$ b)

if $N_k > 10$, and $N_k > 2 N_t$
then $W_d = 0$ c)

if $W_g > 0$, and $2N_g/3 > N_k$
then $W_k = 0$ d)

if a short "t" (i.e., "t" or "k" at the end of WIPS are "short" if $N \geq 5$, $D_1 > 0.7$, $D_2 < 0.15$, $A \geq 0.6$) is located at the end of WIPS, and $N_t > N_k$
then $W_t = W_d + 1$, and $W_b = 0$ e)

if a short* "t" is located at the end of WIPS, and $N_t > 1.5 N_k$
then $W_d = W_d + 2$, and $W_g = W_g - 1$ f)

if a short* "k" is located at the end of WIPS, and $N_k > N_t$
then $W_g = W_g + 1$, and $W_b = 0$ g)

if a short* "k" is located at the end of WIPS, and $N_k > 1.5 N_t$
then $W_g = W_g + 2$, and $W_d = W_d - 1$ These weights are treated as corrections to the previously calculated weights of mapped words.

10.3 Formant Analysis Based on Triphon Statistics 10.3.A Triphon Construction Scheme The formant evaluation step receives as an input: (1) a mapping of a sequence of the dictionary phonemes onto the segments created during the fine split step (where one dictionary phoneme may correspond to one or several segments); (2) formant tracks created during the formant analysis step. The coordinates of the phonemes in the sequence are originally given with respect to the segments of the fine split, step 38. For the purpose of the formant evaluation step, these coordinates are recalculated with respect to the frames. Dummy phonemes (phonemes of zero length) are detected; their formant tracks are not considered. However, since these phonemes may influence the formant picture in the neighboring phonemes they are not discarded.

For the non-dummy vocal phonemes possible formant pictures are constructed; where a formant picture contains three formant tracks F1, F2, F3. Nasal formant tracks, if any, are not considered. Let $Fi_{aver}$, $Fi_{min}$ and $Fi_{max}$ be average, maximum, and minimum frequency values, respectively, of the track that is a candidate for a Fi formant. Formants should comply with the following conditions:

a) They should lie within certain frequency ranges:

$Fi_{aver}^{min} < Fi_{aver} < Fi_{aver}^{max}$;

$Fi_{min} > Fi_{min}^{min}$; $Fi_{max} < Fi_{max}^{max}$.

where $Fi_{aver}$, $Fi_{max}$, $Fi_{min}$ stand for the average, maximum and minimum values of the frequency of a formant within a phoneme segment.

For F1 the values are:
$F1_{aver}^{min}=190$ Hz; $F1_{aver}^{max}=1200$ Hz;
$F1_{min}^{min}=100$ Hz; $F1_{max}^{max}=1300$ Hz.
For F2 the values are:
$F2_{aver}^{min}=500$ Hz; $F2_{aver}^{max}=2800$ Hz;
$F2_{min}^{min}=200$ Hz; $F2_{max}^{max}=2900$ Hz.
For F3 the values are:
  for rhotic contexts:
$F3_{aver}^{min}=1200$ Hz; $F3_{aver}^{max}=3300$ Hz;
$F3_{min}^{min}=900$ Hz; $F3_{max}^{max}=3400$ Hz.
  for contexts with central phoneme IY, or IH, or Y:
$F3_{aver}^{min}=1700$ Hz; $F3_{aver}^{max}=3300$ Hz;
$F3_{min}^{min}=1500$ Hz; $F3_{max}^{max}=3400$ Hz.
  for other contexts:
$F3_{aver}^{min}=1200$ Hz; $F3_{aver}^{max}=3000$ Hz;
$F3_{min}^{min}=1100$ Hz; $F3_{max}^{max}=3400$ Hz.

b) The distance between neighboring formants (F1 and F2, F2 and F3) is limited by a certain threshold which is, in a preferred embodiment, 200 Hz for both distances. However, the distance below this threshold is still permissible between formants F1 and F2 if the corresponding phoneme is AO or OW; and between F2 and F3 if the corresponding phoneme is rhotic.

c) A formant track should cover a portion of the phoneme segment no less than the following: for vocal phonemes F1, F2, F3—60% of the phoneme segment; for Y,W,L,R, F1, F2—45% of the phoneme segment; for Y,W,L,R, F3—25% of the phoneme segment; and for a recovered formant (see below)—35% of the phoneme segment.

If the formant tracks comply with the above three conditions, they are considered a "formant picture" and included in the set of possible formant pictures for the current phoneme. Formant F3 is optional in the case of Y,W,L,R. Several formant pictures can be constructed for a phoneme.

During the construction of a formant picture, an attempt is made to expand tracks beyond the phoneme boundary where phoneme boundaries have been determined unreliably. In particular, an attempt to extend the formant tracks is made for all formants in case of a boundary with a vocal or rhotic phoneme and for formant F2 in case of a boundary with a phoneme Y,W,L,R. If a formant, beyond a phoneme boundary, moves in the same direction as within the phoneme in question, then the boundary of the track is shifted to the corresponding extremum point, but not beyond the middle of the adjacent phoneme.

If no formant picture has been successfully constructed (for example, because of the failure to extract F3); it is assumed that formant F3 is not extracted and an attempt is made to recover F3 by means of spectral maxima not belonging to any of the previously extracted formant tracks. Spectral maxima are looked for in the range determined by the type of the phoneme. These ranges are the following:

| | |
|---|---|
| for rhotic phonemes | 1100–2000 Hz |
| for IY, IH, Y | 2400–3200 Hz |
| for OW, AO, UH, UW, AE, AH, AA, AW | 1400–2800 Hz |
| for EH | 1800–2900 HZ |
| for other phonemes | 1600–2900 Hz |

If a spectral maximum point lies farther than 120 Hz from each of the previously extracted formant tracks, it is included into the track being recovered. If the number of the points in the formant being recovered exceeds half of the phoneme length, the recovery process is considered successfully completed and an attempt is made to construct formant picture variants including the recovered formant.

If not a single formant picture variant has been successfully constructed for a certain phoneme, the phoneme is penalized as follows, according to the phoneme's identity:

| | |
|---|---|
| schwa between consonants | –0.33 |
| schwa next to a vowel | –1.0 |
| other phonemes | –0.66 |

In order to allow for different pronunciations, several closely related acoustic phonemes are considered in the place of each dictionary phoneme (e.g., in place of the dictionary phoneme TX the acoustic phonemes /t/ and /dx/ are considered; in place of the dictionary phoneme AA the acoustic phonemes /aa/ and /ah/ are considered). Vowels that are substituted exactly (e.g., AA to /aa/) are not penalized; vowels that are not substituted exactly (e.g., AA to /ah/) are penalized. Table 3 gives the full list of the rules of substitutions and the penalties associated with them.

TABLE 3

Rules of substitutions and their penalties

| Dictionary Phoneme | Acoustic Phoneme | Penalty | Dictionary Phoneme | Acoustic Phoneme | Penalty |
|---|---|---|---|---|---|
| B | b | 0 | IH0 | ix | 0 |
| D | d | 0 | | ax | 1 |
| G | g | 0 | | ih | 1 |
| P | p | 0 | | iy | 10 |
| T | t | 0 | IY0 | ix | 0 |
| K | k | 0 | | ax | 1 |
| TX | t | 0 | | ih | 1 |
| | dx | 0 | | iy | 5 |
| DX | d | 0 | EH0 | ix | 0 |
| | dx | 0 | | ax | 0 |
| JH | jh | 0 | | eh | 1 |
| CH | ch | 0 | | ih | 5 |
| S | s | 0 | EY0 | ix | 0 |
| SH | sh | 0 | | ax | 0 |
| Z | z | 0 | | ey | 0 |
| ZH | zh | 0 | AE0 | ax | 0 |
| F | f | 0 | | ae | 1 |
| TH | th | 0 | | eh | 1 |
| V | v | 0 | AH0 | ax | 0 |
| DH | dh | 0 | | ah | 1 |
| M | m | 0 | | ix | 5 |
| N | n | 0 | AA0 | ax | 0 |
| NG | ng | 0 | | ah | 1 |
| L | l | 0 | | aa | 5 |
| R | r | 0 | AW0 | ax | 0 |
| W | w | 0 | | ah | 1 |
| Y | y | 0 | | aw | 5 |
| HH | hh | 0 | AY0 | ax | 0 |
| | hv | 0 | | ah | 1 |
| IH | ih | 0 | | ay | 2 |
| | iy | 1 | OY0 | ax | 0 |
| IY | iy | 0 | | oy | 0 |
| | ih | 1 | AO0 | ax | 0 |
| | ey | 2 | | ux | 1 |
| EH | eh | 0 | | ao | 1 |
| | ae | 5 | OW0 | ax | 0 |
| EY | ey | 0 | | ux | 1 |
| AE | ae | 0 | | ao | 1 |
| | eh | 5 | UH0 | ux | 0 |
| AH | ah | 0 | | ax | 1 |
| | aa | 1 | | uh | 1 |
| AA | aa | 0 | UW0 | ux | 0 |
| | ah | 1 | | ax | 1 |
| AW | aw | 0 | | uh | 1 |
| AY | ay | 0 | | uw | 2 |
| OY | oy | 0 | ER0 | axr | 0 |
| AO | ao | 0 | | er | 3 |
| OW | ow | 0 | PCL | pcl | 0 |
| UH | uh | 0 | TCL | tcl | 0 |
| | uw | 1 | KCL | kcl | 0 |

TABLE 3-continued

Rules of substitutions and their penalties

| Dictionary Phoneme | Acoustic Phoneme | Penalty | Dictionary Phoneme | Acoustic Phoneme | Penalty |
|---|---|---|---|---|---|
| UW | uw | 0 | BCL | bcl | 0 |
|    | uh | 1 | DCL | dcl | 0 |
| ER | er | 0 | GCL | gcl | 0 |
|    | axr | 1 |     |     |   |

At this point of the process each dictionary phoneme in a sequence of phonemes has a corresponding set of formant pictures and a set of acoustic phonemes. Every possible pair of acoustic phonemes and formant pictures, referred to herein as a "PF duo," for every phoneme in the sequence is considered. Two extra phonemes are introduced: one before the first and one after the last dictionary phoneme in the sequence; a single dummy PF duo is created for each of this extra phonemes.

A directed n-graph G is constructed with nodes corresponding to pairs of PF duos that belong to adjacent phonemes. If both of the phonemes in the pair are vocal their formant pictures should correspond to each other; i.e. the formants of the second phoneme should be the continuation of the corresponding formants of the first phoneme. Two nodes of the graph G are connected if the right-hand PF duo of the first node is identical to the left-hand PF duo of the second node. Graph G consists of n "levels" where n−1 is the number of the dictionary phonemes in the sequence; there are no edges between nodes of the same level and each level corresponds to a pair of adjacent phonemes. If a single pair of PF duos has not been successfully constructed for a certain pair of phonemes, no further evaluation is made, and a high penalty is imposed on the given sequence of dictionary phonemes.

Based on every possible triplet of PF duos (two nodes and an edge between them) a triphone is formed. The triphone consists of the three acoustic phonemes (left, central and right) and the formant picture of the central phoneme.

10.3.B Statistical Approach to the Estimation of the Triphone Correctness

Every triphone is evaluated based on the estimation of the compliance of the formant picture with the template formant picture of the corresponding central phoneme. The weight of each formant reflects the similarity of the template and the frequencies in the beginning, the middle and the end of each formant. The total weight of the triphone is determined by adding up the weights of the parts of the formants, each multiplied by context-dependent weighting factors. In addition, the first and second differences also may be considered; the two differences reflect the general form of the trajectory of the formants and also participate in determining the total weight assigned to the formant picture.

The template formant picture consists of three formants (F1, F2, F3), each being described by frequency values in the three points: in the middle $F_{iM}$, at the beginning $F_{iL}$ and at the end $F_{iR}$ of the formant. In addition each frequency value is accompanied by deviation measure, computed as the mean square deviation, $D_{iM}$, $D_{iL}$ and $D_{iR}$, respectively. Accordance of the obtained formant picture to the template is estimated by the following weighting function:

$$W = W_{SCALE} \cdot \sum_{i=1}^{3} \sum_{t=L,M,R} K_{it} \cdot$$

$$|\exp(-((F_{it}^* - F_{it})/D_{it})^2) - W_{SHIFT}|/ \sum_{i=1}^{3} \sum_{t=L,M,R} K_{it}$$

where t indicates L, M or R, referring to the left, middle or right part of the formant;

$F_{it}^*$ are the frequency values in the observed formant picture;

$F_{it}$ are values describing the template formant picture, $K_{it} = K_{it}^0 * K_{it}^D$ are the following weighing factors:

$K_{it}^0$ is the starting factor determined by the formant number and the triphon context:
For all of contexts $K_{1t}^0 = 0.7$ and $K_{2t}^0 = 1.0$;
For most of contexts $K_{3t}^0 = 0.5$;
but for the rhotic context (/r/, /er/, /axr/) $K_{3t}^0 = 2.0$.

$K_{it}^D$ is an adjustment factor derived from the mean square deviation of the corresponding frequency value: each mean square deviation should be in the range of 0.8–2 Bark, if it exceeds this range it is assigned a corresponding boundary. $K_{it}^D$ linearly decreases from $K_{it}^{D-Max}$ to $K_{it}^{DMin}$ when $D_{it}$ increases in the range:

$$K_{it}^D = ((D_{it} - D_{it}^{Min}) * K^{DMax} + (D_{it}^{Max} - D_{it}) * K^{DMin})/(D_{it}^{Max} - D_{it}^{Min})$$

$$K_{it}^{DMax} = 1.0$$

$$K_{it}^{DMin} = 0.25$$

$W_{SHIFT}$ is shift factor equal to 0.45 that is used to balance weights above zero;

$W_{SCALE}$ is a scale factor equal to 6 that is used to balance weights with the weights used in other algorithms.

The description of the formant picture may involve two additional parameters derived from the frequency values in the three points:

$$D1_i = (F_{iR} - F_{iL})/2 \text{—1st difference}$$

$$D2_i = F_{iM} - (F_{iR} + F_{iL})/2 \text{—2-nd difference}$$

For these parameters, a deviation measure is taken as follows:

$$D\_D1_i = (D_{iR} + D_{iL})^{*0.5}$$

$$D\_D2_i = (D_{iR} + D_{iL})^{*0.75}$$

where the weighing factors are:

$K_{1D1} = K_{1D2} = 0.3$;

$K_{2D1} = K_{2D2} = 0.5$;

$K_{3D1} = K_{3D2} = 0.2$ for non-rhotic (/r/, /er/, /axr/) contexts; and $K_{3D1} = K_{3D2} = 2.0$ for rhotic contexts.

When using these parameters, the range of the sum (by index t in Equation (1)) is extended to include D1 and D2. The triphone weight consists of the formant picture weight, a penalty for the absence of certain formants, and a a penalty for inexact dictionary-to-acoustic phoneme substitution.

On the basis of the resulting triphone weights, the best path in graph G and weight of this path are determined by a dynamic programming scheme. The weight of the path is the sum of the weights on its edges (the weights of the participating triphones). This weight is the result of the formant evaluation of a given dictionary transcription mapped onto the segmentation determined during the fine split step. The weight may undergo additional normalization, either according to the number of vocal phonemes, or according to the relative energy of each vocal phoneme, and is considered as one of the features used in the word mapping verification step.

10.4 Formant Analysis Based on Formants Behavior

During the verification step, values of $F_1$, $F_2$, and $F_3$ at several important points, rather than the whole formants tracks, are used. Those points are at the beginning and end of a vocal segment ($J_{beg}$ and $J_{end}$) and the three points dividing the segment in three equal pieces and in half ($J_{33}$, $J_{50}$, $J_{66}$). In addition, a line is constructed between the ends of each of $F_1$ and $F_2$ and all extrema of deviation of $F_1$ (or $F_2$, respectively) from this line larger than the threshold of 86 Hz are added.

For each point the following parameters are calculated:

values of $F_1$, $F_2$ and, optionally, $F_3$;

the value of the nasal formant, if it exists;

a sum of the values of $F_1$, $F_2$, and the frame energy from the beginning of the vocal segment until the point;

a sum of the positive values of the first derivative and a sum of the negative values of the first derivative of $F_1$ and $F_2$ from the beginning of the vocal segment until the point.

Once the foregoing information is computed, the verification step is performed by assigning each consonant-vowel-consonant triphon a likelihood weight that the dictionary triphon is the correct one. This weight is a sum of three weights each for the beginning, end and middle of the triphon:

$$W = W_{left} + W_{middle} + W_{right}$$

$W_{middle}$ shows whether the middle vowel is correct. If both $F_1$ and $F_2$ are horizontal in the middle of the central vowel, the middle value can be taken anywhere within the central third of the central vowel, and the the vowel can be assessed by comparing values of $F_1$ and $F_2$ to the template values. If formants are significantly non-horizontal, it may not be possible to assess the vowel in its center. For example, for the words "well" (vowel /eh/) and "will" (vowel /ih/), the center of the vowel is not representative; but it is possible to differentiate these words based upon $F_1$ and $F_2$ calculated at the point where $F_2$ has a maximum. That is why several rules are used for defining which point should be taken for measurements. The measurements of values $F_1$ and $F_2$ are corrected depending on at which point these measurements are taken.

For some vowels (especially for diphthongs) additional checks are made depending on the vowel itself as well as neighboring vowels. Thus, the diphthong /ey/ can be characterized by monotonic increase of $F_1$ in the central part of the vowel, while for the diphthong /ay/ $F_1$ decreases, $F_2$ has a minimum in the central part of the vowel is significantly convex. Results of such analyses give an additional weight (positive or negative) which is added to $W_{middle}$.

To calculate $W_{left}$ and $W_{right}$ tables showing loci of $F_2$ for these consonants in the triphon are employed. To assess the penalty of deviation from these loci a function is used that is parabolic within an interval around the loci and hyperbolic outside the interval. Occasionally it may be desirable to correct or even reject this function, for example, in the case where formants break off or in the case of the diphone (/w/, /iy/), where $F_2$ almosts jumps from bottom to top. Special tables are used for the phonemes /r/ and /l/ in a postvocalic position.

Furthermore for some consonants several additional features are analyzed. For example, nasals have an additional (nasal) track; the phoneme /r/ has very low value of $F_3$; and the phoneme /y/ has a very low value of $F_1$ at the beginning and rises quickly afterwards. For some triphons, additional estimation is based on the first derivative and the presence or absence of some known extrema.

10.5 PFI Mechanism for Mapping Verification

This procedure consists of two steps: (i) calculation and cleaning of Phoneme per Frame Image ("PFI") data; and (ii) word mapping verification using the data. The PFI consists of a table with columns corresponding to the frames of an input speech signal and rows corresponding to the acoustic phonemes. In one preferred embodiment of the present invention, the TIMIT acoustic alphabet, described hereinabove, is used. All of the acoustic phonemes are arranged in a specific order, with neighboring phonemes (in an acoustic sense) placed close to each other. As will of course be appreciated, while no such arrangement is absolute, it does provide useful framework for practical purposes. The following phonetic order is used:

g, d, b, k, t, p, jh, ch, zh, sh, z, s, w, l, r, axr, er, el, oy, y, ix, ax, ay, ey, iy, ih, eh, ae, ah, aa, aw, ao, ow, uh, uw, ux, eng, en, em, ng, n, m, gcl, dcl, bcl, nx, dx, dh, v, f, th, h#, pau, epi, tcl, kcl, pcl, hh, hv, q, ax-h.

First, the table is filled out with data received from frame recognition mechanism described hereinabove in section 5. Given a frame of the input utterance, the recognizer returns a set of acoustic phonemes together with their recognition weights (i.e., the possibility of a frame being a part of a particular phoneme). The recognition weight of a phoneme at a given frame determines the grayscale level of the corresponding point in the image—the larger the weight value, the darker the point.

Cleaning of the image takes place next. The cleaning mechanism is intended to address the possibility of misrecognition of neighboring phonemes by detecting necessary recognition clouds in the image. For example, if the word to test is "OUR" there will be a cloud on the image that starts with AA, an opening phoneme of the word, and goes in the direction of the phoneme UH through the sequence of phonemes AA, AO, OW, UH. So, considering a specific frame, it cannot be determined absolutely what phoneme is, but at least the correct phoneme exists in the cloud.

Practical conditions for the cleaning are:

1. There must be an element (cell of the table) in the cloud that has a recognition weight that is above a predetermined threshold.

2. All elements of a cloud are "connected" to each other. That is, for all pair of elements within cloud, there is a path that connects the elements of the pair and consists of the elements with recognition weight above another (lower) threshold.

Once the clouds are found the table is "cleaned up" by discarding all gray points that do not belong to any of the clouds. Given a cloud, a possible range of acoustic phonemes corresponding to the wave segment may then be determined. The intensity of the cloud's grayscale level may be used as a measure of the reliably of the list of phonemes (i.e., is it likely that one of the phonemes on the list is the actual phoneme).

Having the data of the whole image (for every phoneme in all of the frames of the input utterance, the set of dictionary words that have to be verified as possible interpretations of the acoustic word are then considered. For each word from the set, a smaller image is constructed that represents a mapping of an acoustic word to a given dictionary word. At this step, the table is considered with the columns corresponding to the frames of the input utterance acoustic word and the rows corresponding to the sequence of the phonemes in the dictionary word transcription.

The best path from the bottom left corner to the top right corner of the image is determined using a dynamic programming scheme. The weight of the path is determined as the sum of the grayscale levels of the points on the path. If a jump over a significant phoneme occurs in the path (where a significant phoneme is defined as a phoneme that must be present in the acoustic word recognition list) the weight of the path is dramatically decreased. Another penalty is applied to the weight of the path when the length of the interval is not comparable to the possible length of the corresponding phoneme. The weight of the path is considered as one of the features used in the word mapping verification step.

The structure of the path may also be used as a feature in the word mapping verification. Where the mapping of the word is correct, the path should appear as a "ladder". Otherwise, if the acoustic utterance does not correspond to the sequence of phonemes, than typically there is no determined order in the picture. The presence of a ladder and its "acceptability" is determined by applying several criteria, which relate to the relevant lengths of a word's phonemes with respect to each other.

11. GRAMMAR

The main purpose of the grammar component of the speech recognition system of the present invention is to take into account the grammatical and lexical properties of the words in the garlands in order to transform the garlands into a set of word strings as tentative representations of the utterance and to form a complex plausibility estimate for each of these strings at steps 108 and 112. The grammatical and lexical properties considered in the grammatical analysis are: (i) the grammatical features of words and collocations; (ii) the grammatical structure of each string as a whole and/or of the phrases that the string might contain; (iii) the grammatical "events" found to be present in the strings, i.e., the occurrence in them of certain grammatical phenomena, such as ellipsis, anaphora, deviant forms, lack of agreement, etc.; and (iv) the frequency of words, collocations and lexical pairs.

The grammatical analysis is based on a natural language knowledge base (NLKB) specifically designed for this purpose. The general scheme of the grammatical analysis contemplates two levels of processing: local grammatical analysis, step 108, provides a preliminary filtering of the word garlands along with their transformation into word strings; and global grammatical analysis, step 112, grades these strings by their preferability and chooses the ones that are more plausible as representations of the utterance in question.

To choose the best of the plausible strings, a special meta-level is introduced dealing with a multi-criterion choice problem, described hereinbelow. An important distinctive feature of the solution of this problem by the techniques of the present invention is that the best string does not necessarily have to be a grammatical one.

The natural language knowledge base used in the analysis process includes a number of grammatical dictionaries, tables of admissible and inadmissible sequences of syntactic classes for local analysis, a grammar table for global analysis, and a dependency co-occurrence dictionary.

11.0.A Grammatical Dictionaries

The grammatical dictionaries employed are the following ones: (i) the grammatical dictionary of separate words; (ii) the grammatical dictionary of phrasal verbs; (iii) the grammatical dictionary of collocations; and (iv) the grammatical dictionary of "segments".

Entries in any of the grammatical dictionaries contain the symbols of syntactic classes assigned to the entry units (Noun, Verb, Conjunction, etc.), more particular grammatical features of these units (Number, Person, Transitivity, etc.), their semantic features (Human, PhysObject, InfoObject, etc.), and a frequency tag.

The formal syntax of an entry for each of the dictionaries in question is as follows:

<entry> is defined as: <EntryName> <EntryContent>
<EntryName> is defined as: <word> | <string> | <segment>
<EntryContent> is defined as: <GrClassIndex> <GrFeature1><GrFeature2> <SemFeature> <FreqFeature> <AddFeature>
where:
<GrClassIndex> is an integer having a value from 1 to 28 selected from the following index of grammatical class:

1—Noun, nominative case,
2—Adjective,
3—Verb (finite form),
4—Verb (ing-form),
5—Verb (past participle)
6—Preposition
7—Conjunction
8—Article
9—Adverb
10—Verb to do
11—Verb to have
12—Copula
13—Modal verb
14—Proper pronoun, nominative case
15—Proper pronoun, objective case
16—Determiner/Predeterminer
17—Possessive pronoun
18—Reflexive pronoun
19—Verb to be
20—Interrogative Wh-word
21—Noun, possessive case
22—Indefinite pronoun
23—Numeral
24—Interjection
25—Verb particle to
26—Negation not
27—Beginning of the sentence,
28—End of the sentence.

<GrFeature1> is a first integer having values dependent upon the grammatical class, e.g. for GrClassIndex=1:
4—singular,
5—plural.

<GrFeature2> is a second integer having values dependent upon the grammatical class, e.g. for GrClassIndex=2:
10—used only as a predicative, with no complement,
12—used only as a predicative, often with a prepositional complement,
13—used only as a predicative, often with an infinitive phrase,
14—used only as a predicative, often with a 'that'-phrase,
15—used only as a predicative, often with a prepositional complement or an infinitive phrase, etc.

<SemFeature> is an integer having a value selected from an index of semantic class.

<FreqFeature> is an integer having a value from 1 to 4 selected from an index of frequency cluster, where 1 corresponds to a frequently used word and 4 corresponds to a rarely used word.

<AddFeature> is an integer having an interpretation that varies depending on the dictionary type.

A zero value for any of the above features corresponds to an absence of restrictions on this feature.

Examples of entries in the Grammatical dictionary of separate words are as follows:

| account | 1 4 20 0 2 1 | Noun, countable/ uncountable, sing., nom.case |
| account | 3 6 20 3 0 | Verb, transitive, main form |
| account's | 21 4 0 0 3 0 | Noun, sing., poss.case |
| accounted | 3 8 20 3 0 | Verb, transitive, past tense |
| accounted | 5 20 0 3 0 | Verb, transitive, past part. |
| accounting | 4 20 0 3 0 | Verb, transitive, ing-form |
| accounts | 1 5 17 0 2 1 | Noun, plural, nom.case |
| accounts | 3 7 20 3 0 | Verb, transitive, s-form |

Examples of entries in the Grammatical dictionaries of phrasal verbs and collocations are as follows:

| Microsoft Word | 1 4 21 0 2 3 nom. case | Proper Noun, sing., |
| enter key | 1 4 17 0 2 1 | Noun, countable, sing., nom.case |
| except for | 6 0 0 0 2 1 | Preposition |
| get back | 3 6 1 0 2 2 | Verb, intransitive, main form |
| give up | 3 6 2 0 2 2 | Verb, intransitive, main form |

Examples of entries in the Grammatical dictionary of segments:

| aren't | 19 33 35 1900 1 0 Verb TO_BE, pl., present, SemClass number=1900 | 26 0 0 0 1 0 Negation NOT |

It should be noted that the same phonetic representation may correspond to more than one lexical representation and each of these could correspond to more than one grammatical representation. For example, the phonetical representation /.b oy1 z./ corresponds to the following lexical and grammatical representations:

| boys | 1 5 18 102 2 0 | Noun, animated, countable, pl., nom.case, SemClass = 102 ("human being"), FrequencyCluster - 2 |
| boys' | 21 5 0 102 3 0 | Noun, animated, countable, pl., poss.case, SemClass = 102 ("human being") FrequencyCluster - 3 |
| boy's | 21 4 0 102 2 0 | Noun, animated, countable, sing., poss.case, SemClass=102 ("human being"), FrequencyCluster - 2 |

-continued

| boy's for segment: "boy is" | | |
| boy | 1 4 18 102 2 0 | Noun, animated, countable, sing., nom.case, SemClass=102, FrequencyCluster - 2 |
| is | 19 31 35 1900 1 0 | Verb TO_BE, sing., simple present, 3rd person, SemClass - 1900, FrequencyCluster - 1) |
| boy's for segment: "boy has" ("has" - Aux. only) | | |
| boy | 1 4 18 102 2 0 | Noun, animated, countable, sing., nom.case, SemClass=102, FrequencyCluster - 2 |
| has | 11 27 34 1100 1 0 | Verb TO_HAVE-Aux, sing., simple present, 3rd person, SemClass - 1100, FrequencyCluster - 1 |

It will be appreciated that the foregoing description of the grammatical dictionaries is given by way of illustration only, and that other such dictionaries may be readily compiled by those skilled in the linguistic aspects of the English language.

11.0.B Local Analysis Tables

Local analysis tables, listing admissible and inadmissible sequences of syntactic classes, are used to describe local syntactic relations in the local grammatical analysis step. They include three tables of admissible triplets 106, one for each of the three main sentence types: declarative, interrogative, imperative, and a table of inadmissible quadruplets, the so-called "anti-quadruplets".

Triple tables 106 contain information on admissible triplets of syntactic classes, on the grammatical features to be checked when instantiating the corresponding triplet during grammatical analysis of a word string, the triplet frequency tag, and the "grammatical events" marker ("GE-marker") for this triplet.

The syntactic classes are represented in the triplet tables by integer indices. The grammatical features restricting the possibilities of the triplet instantiation are referred to by the index of the corresponding operator (a "daemon") that is an attached procedure verifying the features in question during the instantiation process. The frequency tag is the same as in the grammatical dictionaries. The GE-marker contains information on certain specific grammatical phenomena (such as anaphora, ellipsis, deviant forms, lack of agreement, and the like) that are considered to be present in the sentence if the triplet with the corresponding GE marker is found to be instantiated in it. GE-markers are coded numerically.

More specifically, each line in the triplet table is a sequence of the form:

c1 c2 c3 D F E, where c1, c2, c3 are the grammatical class indices,

D is the index of the daemon associated with the triplet,

F is the triplet frequency tag,

E is the GE-index of the triplet.

For example, the triplet [27 14 19 11 3 0] corresponds to the sequence of classes: Beginning of Sentence [27]+ Personal pronoun, nominative case [14]+Form of TO_BE [19]-, with the daemon's index [11], frequency tag [3] (meaning that the triplet is of regular occurrence), and no grammatical events established in the case of its successful instantiation [0].

In the table of "anti-quadruplets" each line contains four elements, each formed by an index of a grammatical class supplemented, if necessary, by one or more additional features, e.g.:

{300000 7317000 100000 2800000}

Such an anti-quadruplet represents an inadmissible sequence of grammatical classes and features. Thus, the above anti-quadruplet serves to reject the following sequence:

"Finite form of a verb+the conjunction WHAT +Noun+End of Sentence"

Notice that with a different right-hand context the triplet:
Finite form of a verb+the conjunction WHAT+Noun is admissible.

11.0.C Global Analysis Grammar Table

Referring still to FIG. 8, grammar table 110 employed in the global analysis constitutes a description of English syntax in the form of an augmented recursive transition network ("ATN") used to determine grammatical compatibility of distantly located parts of the sentence and to find all admissible variants of the sentence's syntactic structure. Network grammars are, simultaneously, a tool for the description of a language system, and a tool for determining the sentence analysis procedure on a finite-state automaton basis. Accordingly, the grammar table consists of two parts: the description of ATN itself, and the description of operators in a certain interpretable procedure language.

The syntax of a natural language can be described in this framework by a set of FSAs (finite state automata) such that: (i) one of the FSAs in this set is specified as the main one (the one from which the analysis of a word string may begin); and (ii) the transition from one state to another is allowed not only by a terminal symbol, but also by a non-terminal one. The result is a grammar description called recursive transition network ("RTN"). This model has a constraint common to all context-free grammars, namely, it cannot account for context restrictions on the compatibility of non-adjacent words and phrases and therefore may create superfluous incorrect structures.

To override this constraint, applicants have adopted in their global grammatical analysis technique the Augmented Transition Network framework, as described, for example, in T. Winograd, LANGUAGE AS A COGNITIVE SCIENCE, MIT (1983). The ATN framework is derived from the concept of recursive transition networks, but includes special means for controlling the analysis process. Namely, it is possible within this framework to associate restrictions with the network's arcs. The analysis process is then controlled by verifying these restrictions during transition from one state to another and by forming, on the basis of this analysis, some direction concerning how further to proceed in the network. These means are represented by a system of operators shown on the arcs of the network. The main role of the operators is thus that of filters.

The ATN version employed in applicants' recognition system is composed of FSA's that have the following internal representation.

<FSA> defined as: $ <FSA name> <<stacked fields>> <states>)
<states> defined as: <state 0> <state 1> . . . <state i> . . . <state N>,
where
for $N \geq 0$ <FSA name> is any sequence of letters and/or figures; and <stacked fields> are the names (separated by commas) of specially structured fields characterizing certain syntactic properties of the word string. The values of the stacked fields are determined upon entry to a given FSA, and erased upon the exit.

Each <state i> ($0 \leq i \leq N$) is represented by a number of alternatives:
<state i> defined as: <alternatives>
<alternatives> defined as: <alternative 1> <alternative 2> . . . <alternative j> . . . <alternative K>, where $K \geq 1$ Each <alternative i> ($1 \leq j \leq K$) assumes the following form:

<alternative j> defined as: $ <FSA name><number of transition state>{<operators>} | <word> <number of transition state> {<operators>} | <N1 N2 N3> <number of transition state> {<operators>},
where
<N1 N2 N3> are the first three grammatical values from the system dictionary,
<number of transition state> is the number of the state from 0 to N, or the symbol * (indicating a final state, i.e. exit from the given FSA) and
<operators> are defined as: {<preoperators>} <postoperators>}
where
<preoperators> are a sequence of operators executed before the entry into the given alternative,
<postoperators> are a sequence of operators executed after successful exit from the given alternative
Every operator has the form: @<name of operator>

As an example of the foregoing, the noun phrase, where the head noun is in the possessive case, is described by the following FSA:

```
$POS_NP SUB ALIVE DET
(
    0: "the" 1
       16 –0 11 1              @sing
       16 –0 10 1
       16 –0 12 1              @pl
       21 ANY ANY *
       $C_ADJ 6
       $NUM 2 ;
    1: $C_ADJ 6
       $NUM 2
       21 4 ANY *              @nopl
       21 5 ANY *              @nosing ;
    2: $C_ADJ 6
       21 4 ANY *              @nopl
       21 5 ANY *              @nosing ;
    6: 21 4 ANY *              @nopl
       21 5 ANY *              @nosing )
```

The above example uses the notations described in Section 11.0.A above.

11.0.D Dependency Co-occurrence Dictionary

The dependency co-occurrence dictionary combines features of case-based descriptions with features of syntactic valency-oriented approaches, but differing from these previously known techniques in important aspects. Primarily, the dependency co-occurrence dictionary employed in the present invention contains entries both for the lexical units and for the various types of grammatical features (e.g., for syntactic and semantic markers). Entries for units of different types that can be instantiated by the same elements of a word string are related by some special types of inheritance mechanisms.

The dictionary is constructed within an object-oriented framework. The inheritance mechanisms are more versatile than in previously known techniques that include inheritance by default, and include newly developed mechanisms such as the summing-up inheritance and inheritance by substitution.

An entry for each lexical or grammatical unit specifies its predictions for the structural elements (dependents and/or governors) that may be co-occurrent with the instantiation of this unit in a sentence, and lists the possible variants of their mutual location in the corresponding word string.

Examples of entries for the lexical unit abdicate and for the syntactic marker vi (intransitive verb). entry are as follows:

```
entry_type: Lexeme
entry_name: abdicate
    meaning: 1
        sem_markers: action.negation
    synt_markers: vi/vt/vp
        co-occurrent_elements:
            E-identifier: A1
                E-sem_interpretation: agent
                E-obligatoriness: 9
                E-sem_restrictions:
                    sem_permissions: human
            E-identifier: A2
                E-sem_interpretation: performance
                E-obligatoriness: 4
                E-sem_restrictions:
                    sem_permissions: status/status-
                        symbol/duty
            surface_realizations:
                SR-identifier: 1(A2(vp))
                SR-frequency: 2
                SR-formant:
                    F-lex_markers: from
entry:
entry_type: Synt-marker
entry name: vi
    co-occurrent_elements:
        E-identifier: A1
            E-obligatoriness: 9
            surface_realizations:
                SR-identifier:1
                    SR-dependency_direction: d
                    SR-type: Subj
                    SR-frequency: 6
                    SR-formant:
                        F-synt_class: 0
                    SR-synt/morph_restrictions:
                        synt/morph_permissions: N
                SR-identifier: 1
                    SR-dependency_direction: g
                    SR-type: Mdf
                    SR-frequency: 3
                    SR-formant:
                        F-synt_class: 0
                    SR-synt/morph_restrictions:
                        synt/morph permissions: NP
        co-occurrent_elements_localization:
            loc_variant: 1
                LV-frequency: 6
                LV-pattern: R1(A1) C0:fin.ind
            loc_variant: 2
                LV-frequency: 2
                LV-pattern: R2(A1) F(who/that)
                    C0:fin.ind
            loc_variant: 3
                LV-frequency: 2
                LV-pattern: R2(A1) C0:ing
            loc_variant: 4
                LV-frequency: 2
                LV-pattern: C0:inf
            loc_variant: 5
                LV-frequency: 2
                LV-pattern: C0:imper
```

11.1 Local Grammatical Analysis

Local grammatical analysis of the word garland associates grammatical features with the candidate word choices in the garland using triplet and anti-quadruplet tables. The information from both types of the tables is used to reject those of the candidate strings which are considered to be absolutely inadmissible, and to sort the remaining strings by their weight.

The process of local grammatical analysis involves the following series of steps:

1. Grammatical attribution of words, including extraction of collocations (which are treated as complex words). This serves to create a list of grammatically attributed candidate words for each word position, and to reorder these lists according to the frequencies of certain grammatically attributed words ("GAWs").

2. Pairing up adjacent GAWs (all with all) to create lists of candidate pairs for each position.

3. Constructing the K best links (where K is a parameter) for each Nth pair (where N is the word-position number) with the preceding pairs. These links can be constructed if:
    a) the second word of the (N−1)th pair coincides with the first word of the Nth pair;
    b) there exists a grammatical triplet corresponding to the pairs under analysis;
    c) the features of words (in the pairs) are admissible for the given triplet (admissibility is verified by the demons).

4. By means of the constructed links, K admissible word strings are created.

5. Word strings containing inadmissible features are rejected. The inadmissible features are:
    anti-quadruples (especially in the beginning and in the end of a sentence)
    lack of mandatory "global" characteristics (e.g., absence of a finite verb in a string known to be a full sentence, etc.)

The functions of daemons can be illustrated by the operation of the daemon 11 included in the triplet (mentioned in the local analysis tables discussion) [27 14 19 11 3 0]. This daemon checks the agreement between a personal pronoun [14] and a form of the verb TO_BE [19] in person and number. So, for example, the strings "I am" and "I was" would be rated as absolutely correct, while the strings "I be," "I are" and "I were" would be given a very significant grammatical penalty.

In a different context (e.g., for the triplet [7 14 19 11 3 0]) the same daemon 11 would accept the string "If I were," where "were" is the subjunctive form of the verb TO_BE. The occurrence of subjunctive in this case would be considered as a grammatical event and reflected in the GE-marker. The output of the local grammatical analysis phase is a set of word strings, each string individually ranked and weighted.

11.2 Global Grammatical Analysis

The global grammatical analysis that follows the local analysis phase takes as its input the candidate word strings produced by the local analysis, and establishes the non-local syntactical relations structure for each string using the grammar table and the dependency co-occurrence dictionary.

As discussed hereinabove, the grammar table is an augmented recursive transition network comprising descriptions of structural phrases possible in a sentence and a set of operators providing access to the dependency co-occurrence dictionary. This table is used in two kinds of analysis procedures: a top-down procedure and a combined top-down and bottom-up procedure of a special type, the so-called "cascade island analysis". The top-down procedure is based on the classical backtracking mechanism.

The cascade analysis is arranged as a sequence of several phases, or cascades; in a preferred embodiment, it has 3 levels. The first cascade is reduces the terminal nodes of the sentence to non-terminal nodes of a first level representing the simpler phrases contemplated for inclusion in the grammar. The result is a system of structural "islands"; i.e. phrases which have been analyzed as to their internal structure but are not yet related with each other. At the second cascade, the analysis tries to establish relations between the islands resulting from the first cascade, to obtain simple sentences. The final cascade forms a connected structure for the entire input sentence.

This technique of traversing the grammar has the following advantages: (i) it makes possible the analysis of non-sentential word strings (e.g., of newspaper headings); (ii) it is instrumental in determining and using some structural properties of the string under consideration without waiting for the conclusion of its analysis as a whole; (iii) it affords search with cuttings when traversing the grammar; and (iv) it allows introduction of criteria for accepting certain structural variants in spite of their being rejected by the full analysis procedure (the procedure reducing the word string to the final sentence symbol).

The syntactical relations structure associated with a word string at each phase of its global analysis is used to form the grammatical descriptor of the string, comprising information on the properties of its structure as a whole, as well as of the structure of the phrases it contains within the corresponding analysis variant. The structural properties reflected in this descriptor are, e.g., the number of participle clauses established within the string, the penalties associated with some "undesirable" structural characteristics of it, the sentence type (if it has already been determined), etc.

During the analysis process, the grammatical descriptor of the word string being analyzed is used to verify certain contextual requirements (e.g. the subject-predicate concord). When the analysis of the word string has been completed, the resultant grammatical descriptor serves to weigh its plausibility as a representation of the input utterance.

11.3 Meta-level

The meta-level uses the results of all the previous steps of processing the input utterance to choose the best of the candidate word strings for its representation. It deals with a multi-criterion choice problem, the criteria involved being of three types: (1) criteria resulting from the recognizer's weighting of various word choices; (2) criteria based on the results of the local grammatical analysis of the word garlands; and (3) criteria based on the structural descriptors of the candidate word strings constructed by the global analysis.

An important asset of the meta-level procedures as contemplated for use in the present invention is that the best string chosen does not necessarily have to be a full and grammatical sentence. More precisely, the analyzer can accept both non-sentential strings, like newspapers headings, and ungrammatical expressions, for example, those often found in spontaneous speech.

Meta-level procedures are described by means of production rules representing statements that can be illustrated by the following example:

"If the given choice for word N violates sentence grammaticality requirement of type 7 (i.e. a noun phrase located after a copula does not have a determiner in it), but this choice is characterized by the recognizer as absolutely reliable, then this choice is considered to be correct notwithstanding the violation mentioned".

The set of such production rules may be changed at will, so that the system can be tuned in to recognize different speech styles: on the one hand, it can be made to accept only strictly grammatical sentences, on the other, the meta-level rules may be added to make acceptable various types of ungrammatical structures.

12.0 OUTPUT SELECTED WORD STRINGS

As described above, a word garland is processed by the local grammatic analysis, then by the global grammatic analysis, then by the meta-level analysis. The results are output at step 114 as a series of candidate sentence choices including the following information:

1. An answer to the question whether or not the input string is a syntactically correct English sentence (from the point of view of this grammar).

2. For correct sentences, one or more syntactic structures of the given sentence, represented as "immediate constituents" and/or dependencies.

3. Additional information characterizing the syntactic structure of the sentence, including:
   a) presence of participle clauses;
   b) sentence type (declarative, interrogative, imperative, compound, complex); and
   c) penalty imposed on sentences containing rarely used syntactic structures.

At step 114, after conclusion of the global syntactic analysis, it is expected that in most cases all words of the sentence will be defined with a confidence level exceeding a predetermined threshold value. This sentence will therefore be presented to the user as the correct transcription of the input signal utterance. As shown illustratively in FIG. 2, those words for which the confidence level falls below the predetermined threshold may be presented on the screen of display 16 in a flagged format (e.g., reverse video) to attract the user's attention.

While preferred illustrative embodiments of the present invention are described above, it will be obvious to one skilled in the art that various changes and modifications may be made therein without departing from the invention and it is intended that the appended claims cover all such changes and modifications which fall within the true spirit and scope of the invention.

What is claimed is:

1. A knowledge-based speech recognition system for recognizing an input speech signal comprising vocalic and non-vocalic intervals, each of the vocalic intervals having a pitch period, the system comprising:

means for capturing the input speech signal;

means for segmenting the input speech signal into a series of segments including vocalic intervals and non-vocalic intervals, the vocalic intervals having a frame length computed based on an estimation of the pitch period of the vocalic intervals of the input speech signal;

means for characterizing the series of segments based upon acoustic events detected within the input speech signal to obtain an acoustic feature vector;

means for storing a dictionary having a multiplicity of words, each one of the multiplicity of words described by a phonetic transcription and at least one acoustic event transcription; and means for selecting a word choice by comparing the acoustic feature vector to the acoustic event transcriptions of the multiplicity of words.

2. The system as defined in claim 1 further comprising means for analyzing the input speech signal to determine a sequence of word choices based upon syntactic and semantic attributes of the selected word choices.

3. The system as defined in claim 1 wherein the dictionary further comprises at least one orthographic word corresponding to each one of the multiplicity of words and display means for displaying the word choice.

4. The system as defined in claim 1 wherein the non-vocalic intervals are computed based upon a frame length corresponding to a mean value of the estimations of the pitch periods for preceding vocalic intervals in the input speech signal.

5. The system as defined in claim 1 further comprising means for computing formant tracks for the segments including vocalic intervals.

6. The system as defined in claim 5 wherein the means for computing formant tracks analyzes the series of segments to determine a plurality of maxima within the vocalic intervals of the segments and constructs polyline representations of the formant tracks for each vocalic interval based on spectral amplitude characteristics of the vocalic interval.

7. The system as defined in claim 5 wherein the means for computing formant tracks analyzes the series of segments to determine a plurality of maxima within the vocalic intervals of the segments and constructs polyline representations of the formant tracks for each vocalic interval based on both spectral amplitude and phase characteristics of the vocalic interval.

8. The system as defined in claim 1 wherein the means for storing further includes grammatical attributes for at least some of the multiplicity of words, the means for selecting further comprising means for employing the grammatical attributes to determine the word choice.

9. The system as defined in claim 1 wherein the means for storing further includes semantic attributes for one or more of the multiplicity of words, the means for selecting further comprising means for employing the semantic attributes to determine the word choice.

10. A knowledge-based speech recognition system for recognizing an input speech signal, the input speech signal including a sequence of phonemes, the system comprising:

means for capturing the input speech signal;

means for segmenting the input speech signal into a series of segments including vocalic intervals and non-vocalic intervals, the vocalic intervals having a frame length computed based on an estimation of the pitch period of the vocalic intervals of the input speech signal, the series of segments approximately corresponding to the sequence of phonemes;

means for characterizing the series of segments based upon acoustic events detected within the input speech signal to obtain an acoustic feature vector;

means for storing a dictionary having a multiplicity of words, each one of the multiplicity of words described by a phonetic transcription and an acoustic event transcription, the acoustic event transcription comprising a lattice of acoustic events corresponding to a plurality of pronunciations; and means for selecting a word choice by comparing the acoustic feature vector to selected lattices of acoustic event transcriptions.

11. The system as defined in claim 10 further comprising means for analyzing the input speech signal to determine a sequence of word choices based upon syntactic and semantic attributes of the selected word choices.

12. The system as defined in claim 10 wherein the dictionary further comprises at least one orthographic word corresponding to each one of the multiplicity of words and display means for displaying the word choice.

13. The system as defined in claim 10 wherein one or more of the multiplicity of words are described by a baseform phonetic transcription, the means for storing the dictionary further comprising means for generating a cloud of phonetic transcriptions by applying phonological rules to the baseform phonetic transcription.

14. The system as defined in claim 13 wherein, for one or more of the multiplicity of words, each member of a cloud of phonetic transcriptions has an acoustic event transcription including a lattice of acoustic events.

15. The system as defined in claim 10 wherein one or more of the multiplicity of words are organized into orbits corresponding to a degree of similarity between the acoustic event transcriptions, the means for selecting including means for comparing the acoustic feature vector to selected orbits.

16. The system as defined in claim 15 wherein the acoustic feature vector includes a plurality of acoustic events and the means for comparing the acoustic feature vector to selected orbits compares individual ones of the acoustic events of the acoustic feature vector to respective ones of the lattice of acoustic events of the selected orbits using three-way logic.

17. The system as defined in claim 15 wherein the multiplicity of words represents potential candidates for the word choice, the means for comparing reducing the number of potential candidates by about two orders of magnitude.

18. The system as defined in claim 10 wherein for one or more of the multiplicity of words, the acoustic transcriptions include information relating to the behavior of formants occurring within the one or more words.

19. The system as defined in claim 10 wherein the means for storing further includes grammatical attributes for one or more of the multiplicity of words, the means for selecting further comprising means for employing the grammatical attributes to determine the word choice.

20. The system as defined in claim 10 wherein the means for storing further includes semantic attributes for one or more of the multiplicity of words, the means for selecting further comprising means for employing the semantic attributes to determine the word choice.

21. The system as defined in claim 10 wherein the means for storing further includes syntactic attributes for one or more of the multiplicity of words, the means for selecting further comprising means for employing the syntactic attributes to determine the word choice.

22. The system as defined in claim 10 wherein phonetic transcription includes a lattice of phonemes and the means for selecting further comprises means for comparing the series of segments of the input speech signal to the lattice of phonemes using dendrograms.

23. The system as defined in claim 22 wherein the means for storing includes, for each one of the multiplicity of words, a series of values representative of the spectral characteristics and formants behavior for the word, the means for characterizing the series of segments computing a plurality of values representative of the spectral characteristics for the segments, the means for selecting comparing the series of values for selected ones of the multiplicity of words to the plurality of values for the segments.

24. A knowledge-based speech recognition system for recognizing an input speech signal, the input speech signal including a sequence of phonemes, the system comprising:

means for capturing the input speech signal;

means for segmenting the input speech signal into a series of segments including vocalic intervals and non-vocalic intervals, the vocalic intervals having a frame length computed based on an estimation of the pitch period of the vocalic intervals of the input speech signal, the series of segments approximately corresponding to the sequence of phonemes;

means for characterizing the acoustic and spectral characteristics of the input speech signal:

means for storing a dictionary having a multiplicity of words, each one of the multiplicity of words described by a series of acoustic events, spectral characteristics and a series of grammatical, semantic and syntactic attributes; and means for selecting a word choice from amongst the multiplicity of words by weighing, for one or more of the multiplicity of words, correspondence between the acoustic events and the acoustic characteristics, between the spectral characteristics of the words and the input speech signal, and the grammatical, semantic and syntactic attributes of the words.

25. The system as described in claim 24 further comprising means for analyzing the input speech signal to determine a sequence of word choices based upon syntactic and semantic attributes of the selected word choices.

26. The system as defined in claim 24 wherein the dictionary further comprises at least one orthographic word corresponding to each one of the multiplicity of words and display means for displaying the word choice.

27. A method of applying knowledge-based rules in a processor-based system to recognize an input speech signal as a word in a natural language, the input speech signal comprising vocalic and non-vocalic intervals, each of the vocalic intervals having a pitch period, the method comprising steps of:

capturing and storing the input speech signal;

segmenting the input speech signal into a series of segments including vocalic intervals and non-vocalic intervals, the vocalic intervals having a frame length computed based on an estimation of the pitch period of the vocalic intervals of the input speech signal;

generating an acoustic feature vector by characterizing the series of segments based upon acoustic events detected within the input speech signal;

retrieving from a store a dictionary having a multiplicity of words, each one of the multiplicity of words described by a phonetic transcription and at least one acoustic event transcription; and comparing the acoustic feature vector to the acoustic event transcriptions of the multiplicity of words to select a word choice.

28. The method as defined in claim 27 further comprising a step of analyzing the input speech signal to determine a sequence of word choices based upon syntactic and semantic attributes of the selected word choices.

29. The method as defined in claim 27 wherein the dictionary further comprises at least one orthographic word corresponding to each one of the multiplicity of words and the method further comprises a step of displaying the word choice.

30. The method as defined in claim 27 wherein the step of segmenting further comprises computing a frame length for non-vocalic intervals as a mean value of the estimations of the pitch periods for preceding vocalic intervals in the input speech signal.

31. The method as defined in claim 27 further comprising the step of computing formant tracks for the segments including vocalic intervals.

32. The method as defined in claim 31 wherein the step of computing formant tracks comprises analyzing the series of segments to determine a plurality of maxima within the vocalic intervals of the segments and constructing polyline representations of the formant tracks for each vocalic interval based on spectral amplitude characteristics of the vocalic interval.

33. The method as defined in claim 31 wherein the means for computing formant tracks analyzes the series of segments to determine a plurality of maxima within the vocalic intervals of the segments and constructs polyline representations of the formant tracks for each vocalic interval based on both spectral amplitude and phase characteristics of the vocalic interval.

34. The method as defined in claim 27 wherein the dictionary further includes grammatical attributes for one or more of the multiplicity of words, the step of comparing further comprising employing the grammatical attributes to determine the word choice.

35. The method as defined in claim 27 wherein the dictionary further includes semantic attributes for one or more of the multiplicity of words, the step of comparing further comprising employing the semantic attributes to determine the word choice.

36. A method of applying knowledge-based rules in a processor-based system to recognize an input speech signal as a word in a natural language, the input speech signal including a sequence of phonemes, the method comprising steps of:

capturing and storing the input speech signal;

segmenting the input speech signal into a series of segments including vocalic intervals and non-vocalic intervals, the vocalic intervals having a frame length computed based on an estimation of the pitch period of the vocalic intervals of the input speech signal, the series of segments approximately corresponding to the sequence of phonemes;

generating an acoustic feature vector by characterizing the series of segments based upon acoustic events detected within the input speech signal;

retrieving from a store a dictionary having a multiplicity of words, each one of the multiplicity of words described by a phonetic transcription and an acoustic event transcription, the acoustic event transcription comprising a lattice of acoustic events corresponding to a plurality of pronunciations; and comparing the acoustic feature vector to selected lattices of acoustic event transcriptions to select a word choice.

37. The method as defined in claim 36 further comprising a step of analyzing the input speech signal to determine a sequence of word choices based upon syntactic and semantic attributes of the selected word choices.

38. The method as defined in claim 36 wherein the dictionary further comprises at least one orthographic word corresponding to each one of the multiplicity of words and the method further comprises a step of displaying the word choice.

39. The method as defined in claim 36 wherein one or more of the multiplicity of words are described by a baseform phonetic transcription, the method further comprising a step of generating a cloud of phonetic transcriptions by applying phonological rules to the baseform phonetic transcription.

40. The method as defined in claim 39 wherein, for one or more of the multiplicity of words, each member of a cloud of phonetic transcriptions has an acoustic event transcription including a lattice of acoustic events.

41. The method as described in claim 36 wherein one or more of the multiplicity of words are organized into orbits corresponding to a degree of similarity between the acoustic event transcriptions, the step of comparing comprising comparing the acoustic feature vector to selected orbits.

42. The method as defined in claim 41 wherein the acoustic feature vector includes a plurality of acoustic events and the step of comparing the acoustic feature vector to selected orbits compares individual ones of the acoustic events of the acoustic feature vector to respective ones of the lattice of acoustic events of the selected orbits using three-way logic.

43. The method as defined in claim 41 wherein the multiplicity of words represents potential candidates for the word choice, the step of comparing reducing the number of potential candidates by about two orders of magnitude.

44. The method as defined in claim 36 wherein for one or more of the multiplicity of words, the acoustic transcriptions include information relating to the behavior of formants occurring within the one or more words.

45. The method as defined in claim 36 wherein the dictionary further includes grammatical attributes one or more of the multiplicity of words, the step of comparing further comprising employing the grammatical attributes to determine the word choice.

46. The method as defined in claim 36 wherein the dictionary further includes semantic attributes for one or more of the multiplicity of words, the step of comparing further comprising employing the semantic attributes to determine the word choice.

47. The method as defined in claim 36 wherein the dictionary further includes syntactic attributes for one or more of the multiplicity of words, the step of comparing further comprising employing the syntactic attributes to determine the word choice.

48. The method as defined in claim 36 wherein phonetic transcription includes a lattice of phonemes and the step of comparing further comprises comparing the series of segments of the input speech signal to the lattice of phonemes using dendrograms.

49. The method as defined in claim 48 wherein the dictionary includes, for each one of the multiplicity of words, a series of values representative of the spectral characteristics and formants behavior for the word, the step of segmenting the input speech signal into a series of segments comprises computing a plurality of values representative of the spectral characteristics for the segments, and the step of comparing comprises comparing the series of values for selected ones of the multiplicity of words to the plurality of values for the segments.

50. A method of applying knowledge-based rules in a processor-based system to recognize an input speech signal as a word in a natural language, the input speech signal including a sequence of phonemes, the method comprising steps of:

capturing and storing the input speech signal;

segmenting the input speech signal into a series of segments including vocalic intervals and non-vocalic intervals, the vocalic intervals having a frame length computed based on an estimation of the pitch period of the vocalic intervals of the input speech signal, the series of segments approximately corresponding to the sequence of phonemes;

computing acoustic and spectral characteristics representative of the input speech signal;

retrieving from a store a dictionary having a multiplicity of words, each one of the multiplicity of words described by a series of acoustic events, spectral characteristics and a series of grammatical, semantic and syntactic attributes; and selecting a word choice from amongst the multiplicity of words by weighing, for one or more of the multiplicity of words, correspondence between the acoustic events and the acoustic characteristics, between the spectral characteristics of the words and the input speech signal, and the grammatical, semantic and syntactic attributes of the words.

51. The method as defined in claim 50 further comprising a step of analyzing the input speech signal to determine a sequence of word choices based upon syntactic and semantic attributes of the selected word choices.

52. The method as defined in claim 50 wherein the dictionary further comprises at least one orthographic word corresponding to each one of the multiplicity of words and the method further comprises a step of displaying the word choice.

* * * * *